US011414523B2

(12) United States Patent
Kimura et al.

(10) Patent No.: US 11,414,523 B2
(45) Date of Patent: Aug. 16, 2022

(54) POLYCARBONATE-POLYDIORGANO-SILOXANE COPOLYMER, RESIN COMPOSITION OF POLYCARBONATE-POLYDIORGANO-SILOXANE COPOLYMER, AND PRODUCTION METHOD FOR RESIN COMPOSITION OF POLYCARBONATE-POLYDIORGANO-SILOXANE COPOLYMER

(71) Applicant: TEIJIN LIMITED, Osaka (JP)

(72) Inventors: Taichi Kimura, Osaka (JP); Kazushi Tando, Osaka (JP); Koji Oda, Osaka (JP)

(73) Assignee: TEIJIN LIMITED, Osaka (JP)

(*) Notice: Subject to any disclaimer, the term of this patent is extended or adjusted under 35 U.S.C. 154(b) by 213 days.

(21) Appl. No.: 16/956,041

(22) PCT Filed: Dec. 21, 2018

(86) PCT No.: PCT/JP2018/047367
§ 371 (c)(1),
(2) Date: Jun. 19, 2020

(87) PCT Pub. No.: WO2019/124556
PCT Pub. Date: Jun. 27, 2019

(65) Prior Publication Data
US 2021/0108033 A1    Apr. 15, 2021

(30) Foreign Application Priority Data

Dec. 21, 2017  (JP) .............................. JP2017-245048
Mar. 26, 2018  (JP) .............................. JP2018-058148

(51) Int. Cl.
| *C08G 77/448* | (2006.01) |
| *C08K 3/016* | (2018.01) |
| *C08F 2/14* | (2006.01) |
| *C08K 3/08* | (2006.01) |
| *C08K 5/00* | (2006.01) |
| *C08K 5/49* | (2006.01) |

(52) U.S. Cl.
CPC .............. *C08G 77/448* (2013.01); *C08F 2/14* (2013.01); *C08K 3/016* (2018.01); *C08K 3/08* (2013.01); *C08K 5/005* (2013.01); *C08K 5/0066* (2013.01); *C08K 5/49* (2013.01)

(58) Field of Classification Search
CPC .... C08G 77/04; C08G 77/448; C08G 64/186; C08F 2/14; C08K 3/016; C08K 3/00; C08K 5/005; C08K 5/0066; C08K 5/42; C08K 5/49; C08L 83/10; C08L 69/00; C09D 183/10
See application file for complete search history.

(56) References Cited

U.S. PATENT DOCUMENTS

| 5,502,134 | A | 3/1996 | Okamoto et al. |
| 6,072,011 | A | 6/2000 | Hoover |
| 2012/0271009 | A1 | 10/2012 | Higaki et al. |
| 2014/0106208 | A1 | 4/2014 | Ishikawa et al. |
| 2014/0323623 | A1 | 10/2014 | Miyake et al. |
| 2014/0357809 | A1 | 12/2014 | Miyake et al. |
| 2016/0017102 | A1 | 1/2016 | Yamada |
| 2017/0335100 | A1 | 11/2017 | Miyake et al. |

FOREIGN PATENT DOCUMENTS

| EP | 0 524 731 | 1/1993 |
| JP | 5-186675 | 7/1993 |
| JP | 5-189975 | 7/1993 |
| JP | 5-247195 | 9/1993 |
| JP | 2662310 | 6/1997 |
| JP | 2004-27113 | 1/2004 |
| JP | 2005-263908 | 9/2005 |
| JP | 2006-523243 | 10/2006 |
| JP | 2008-101117 | 5/2008 |
| JP | 2011-46913 | 3/2011 |
| JP | 2011-159340 | 8/2011 |
| JP | 2011-173989 | 9/2011 |
| JP | 2012-246430 | 12/2012 |
| JP | 2014-080496 | 5/2014 |
| JP | 2014-231561 | 12/2014 |
| JP | 2015-163722 | 9/2015 |
| JP | 2016-138195 | 8/2016 |
| WO | 91/00885 | 1/1991 |
| WO | 2004/076541 | 9/2004 |
| WO | 2013/073709 | 5/2013 |
| WO | 2016/088861 | 6/2016 |

OTHER PUBLICATIONS

International Search Report dated Mar. 26, 2019 in International (PCT) Patent Application No. PCT/JP2018/047367.

*Primary Examiner* — Robert S Jones, Jr.
(74) *Attorney, Agent, or Firm* — Wenderoth, Lind & Ponack, L.L.P.

(57) ABSTRACT

A polycarbonate-polydiorganosiloxane copolymer or a resin composition thereof having excellent impact resistance, and, in particular, excellent impact resistance at extremely low temperatures, as well as excellent chemical resistance; and a production method for the resin composition are provided. This copolymer or resin composition thereof includes a polycarbonate-polydiorganosiloxane copolymer and an optional polycarbonate resin. The copolymer includes a polycarbonate block (A-1) and a polydiorganosiloxane block (A-2). The polydiorganosiloxane block (A-2) content of the copolymer or resin composition thereof is 2.5-8.0 wt %. The copolymer or resin composition thereof satisfies (i) and (ii): (i) in a cross-sectional observation image of the copolymer or resin composition thereof that is generated using an electron beam microscope, there are 1-20 domains that have a longest diameter of at least 80 nm in an area that is 850 nm square (722,500 nm$^2$); and (ii) average domain size is 30-100 nm.

17 Claims, 2 Drawing Sheets

POLYCARBONATE-POLYDIORGANO-SILOXANE COPOLYMER, RESIN COMPOSITION OF POLYCARBONATE-POLYDIORGANO-SILOXANE COPOLYMER, AND PRODUCTION METHOD FOR RESIN COMPOSITION OF POLYCARBONATE-POLYDIORGANO-SILOXANE COPOLYMER

FIELD

The present invention relates to a polycarbonate-polydiorganosiloxane copolymer (hereinafter, sometimes abbreviated as "PC-POS copolymer") or a resin composition thereof, and a method of producing the resin composition. More particularly, the present invention relates to a PC-POS copolymer or a resin composition thereof, which has an excellent impact resistance, particularly, impact resistance at a very low temperature, and an excellent chemical resistance, and a method of producing the resin composition.

BACKGROUND

Polycarbonates are widely used in the fields of optical components, electric and electronic devices, and automobiles, because of their excellent impact resistance and high heat resistance. To cope with the expansion of application fields in recent years, the development of polycarbonate copolymers obtained by introducing various comonomer units into commonly used monomer raw materials, such as bisphenol A (hereinafter abbreviated as "BPA"), is now underway. In particular, it is known that PC-POS copolymers composed of BPA and a polydiorganosiloxane comonomer have an excellent flame retardancy and impact resistance, and such copolymers are disclosed in a number of literatures (PTLs 1 to 3).

As an attempt to improve the impact resistance, particularly, impact resistance at a low temperature, of PC-POS copolymers, methods have been disclosed which focus on the chain length in the polydiorganosiloxane structure to be used, and in which a polydiorganosiloxane having a long chain length is used (PTLs 4 to 5).

Further, PTL 6 focuses on the size of siloxane domains formed in a molded article, and discloses a method in which both a certain degree of transparency and impact resistance are achieved, by appropriately incorporating two types of PC-POS copolymers varying in light transmittance.

PTL 7 discloses a method of producing a resin composition containing a PC-POS copolymer, in which a polydiorganosiloxane having a lone chain length and a polydiorganosiloxane having a short chain length are used as raw materials, and in which both a certain degree of transparency and impact resistance are achieved, as with the case of PTL 6.

However, all of conventional PC-POS copolymers or resin compositions containing PC-POS copolymers have an insufficient impact resistance, particularly, impact resistance at a very low temperature when they are expected to be used in high altitude regions, such as high-latitude areas and mountain areas. Further, PC-POS copolymers or resin compositions containing PC-POS copolymers which also have a high chemical resistance and coating durability, in addition to a high impact resistance, are yet to be obtained.

In addition, a PC-POS copolymer by itself alone cannot provide a high level of flame retardancy, such as V-0 as defined in UL Standard 94. To obtain a high flame retardancy, there are methods in which a flame retardant is incorporated into a PC-POS copolymer (PTLs 2 and 8).

However, it cannot be said that these methods provide a sufficient thin-wall flame retardancy. On the other hand, methods are known in which polytetrafluoroethylene particles and a flame retardant are added to a polycarbonate (PTLs 9 and 10). These documents, however, are silent about whether the selection of a specific PC-POS copolymer as the polycarbonate resin enables to provide a very high flame retardancy and low-temperature impact resistance properties.

CITATION LIST

Patent Literature

[PTL 1] Japanese Unexamined Patent Publication (Kokai) No. H5-186675
[PTL 2] Japanese Unexamined Patent Publication (Kokai) No. H5-247195
[PTL 3] Japanese Patent No. 2662310
[PTL 4] WO 91/00885
[PTL 5] Japanese Unexamined Patent Publication (Kokai) No. 2012-246430
[PTL 6] Japanese Translation of PCT International Application Publication No. JP-T-2006-523242
[PTL 7] Japanese Unexamined Patent Publication (Kokai) No. 2015-163722
[PTL 8] Japanese Unexamined Patent Publication (Kokai) No. H5-189975
[PTL 9] Japanese Unexamined Patent Publication (Kokai) No. 2005-263908
[PTL 10] Japanese Unexamined Patent Publication (Kokai) No. 2004-27113

SUMMARY

Technical Problem

An object of the present invention is to provide a polycarbonate-polydiorganosiloxane copolymer or a resin composition thereof, which has an excellent impact resistance, particularly, impact resistance at a very low temperature, and an excellent chemical resistance.

Solution to Problem

As a result of intensive studies to achieve the above described object, the present inventors have found out that the above described problems can be solved by the following constitutions, thereby arriving at the present invention.

<<Constitution 1>>

A polycarbonate-polydiorganosiloxane copolymer, or a resin composition thereof including the copolymer and an optional polycarbonate resin;

wherein the copolymer contains a polycarbonate block (A-1) and a polydiorganosiloxane block (A-2);

wherein the polydiorganosiloxane block (A-2) is contained in the copolymer or the resin composition thereof in an amount of from 2.5 to 8.0% by weight; and wherein the copolymer or the resin composition thereof satisfies the following (i) and (ii):

(i) 1 to 20 domains having a maximum long diameter of 80 nm or more are present in a region of 850 nm square (722,500 $nm^2$), in a cross-sectional observation image of the copolymer or the resin composition thereof obtained using an electron beam microscope; and (ii) the average domain size is from 30 to 100 nm.

<<Constitution 2>>

The copolymer or the resin composition thereof according to Constitution 1, wherein the polycarbonate block (A-1) is represented by the following general formula [1]:

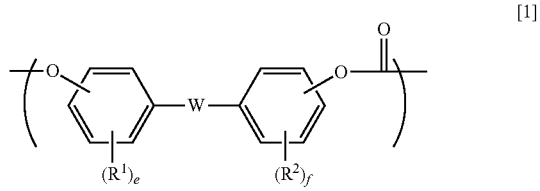

[1]

wherein, in the general formula [1], each of $R^1$ and $R^2$ independently represents a hydrogen atom, a halogen atom or a group selected from the group consisting of an alkyl group containing from 1 to 18 carbon atoms, an alkoxy group containing from 1 to 18 carbon atoms, a cycloalkyl group containing from 6 to 20 carbon atoms, a cycloalkoxy group containing from 6 to 20 carbon atoms, an alkenyl group containing from 2 to 10 carbon atoms, an aryl group containing from 3 to 14 carbon atoms, an aryloxy group containing from 3 to 14 carbon atoms, an aralkyl group containing from 7 to 20 carbon atoms, an aralkyloxy group containing from 7 to 20 carbon atoms, a nitro group, an aldehyde group, a cyano group and a carboxyl group; when a plurality of $R^1$s and $R^2$s are present, they may be the same or different; each of e and f independently represents an integer from 1 to 4; and W represents a single bond or at least one group selected from the group consisting of groups represented by the following general formulae [2]:

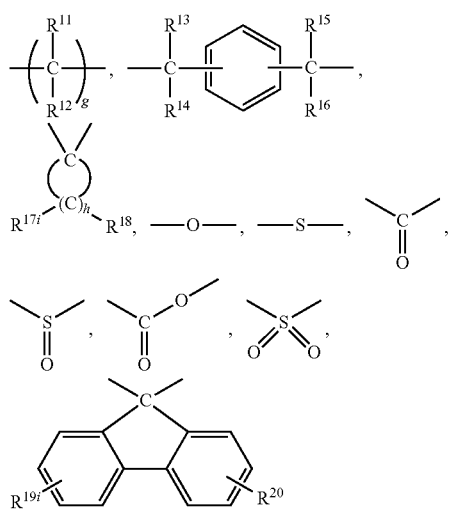

[2]

wherein, in the general formula [2], each $R^{11}$, $R^{12}$, $R^{13}$, $R^{14}$, $R^{15}$, $R^{16}$, $R^{17}$ and $R^{18}$ independently represents a hydrogen atom or a group selected from the group consisting of an alkyl group containing from 1 to 18 carbon atoms, an aryl group containing from 3 to 14 carbon atoms and an aralkyl group containing from 7 to 20 carbon atoms; each of $R^{19}$ and $R^{20}$ independently represents a hydrogen atom, a halogen atom or a group selected from the group consisting of an alkyl group containing from 1 to 18 carbon atoms, an alkoxy group containing from 1 to 10 carbon atoms, a cycloalkyl group containing from 6 to 20 carbon atoms, a cycloalkoxy group containing from 6 to 20 carbon atoms, an alkenyl group containing from 2 to 10 carbon atoms, an aryl group containing from 3 to 14 carbon atoms, an aryloxy group containing from 6 to 10 carbon atoms, an aralkyl group containing from 7 to 20 carbon atoms, an aralkyloxy group containing from 7 to 20 carbon atoms, a nitro group, an aldehyde group, a cyano group and a carboxyl group; when a plurality of each of these atoms and groups are present, they may be the same or different; g represents an integer from 1 to 10; and h represents an integer from 4 to 7.

<<Constitution 3>>

The copolymer or the resin composition thereof according to Constitution 2, wherein the polydiorganosiloxane block (A-2) is represented by the following general formula [3]:

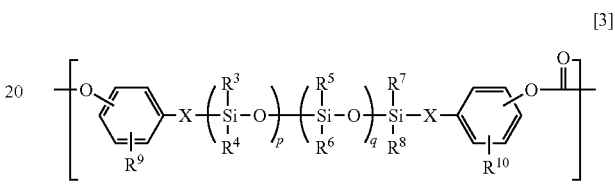

[3]

wherein, in the general formula [3], each of $R^3$, $R^4$, $R^5$, $R^6$, $R^7$ and $R^8$ independently represents a hydrogen atom, an alkyl group containing from 1 to 12 carbon atoms, or a substituted or non-substituted aryl group containing from 6 to 12 carbon atoms; each of $R^9$ and $R^{10}$ independently represents a hydrogen atom, a halogen atom, an alkyl group containing from 1 to 10 carbon atoms or an alkoxy group containing from 1 to 10 carbon atoms; p is a natural number; q is 0 or a natural number; p+q, as the average chain length, is a natural number from 30 to 100; and X represents a divalent aliphatic group containing from 2 to 8 carbon atoms.

<<Constitution 4>>

The copolymer or the resin composition thereof according to any one of Constitutions 1 to 3, further satisfying the following (iii):

(iii) no domain having a maximum long diameter of 400 nm or more is present in a region of 850 nm square (722,500 $nm^2$), in a cross-sectional observation image of the copolymer or the resin composition thereof obtained using an electron beam microscope, of any one of five pieces of sample sections.

<<Constitution 5>>

The copolymer or the resin composition thereof according to any one of Constitutions 1 to 4, which has a viscosity average molecular weight of from 11,000 to 30,000.

<<Constitution 6>>

The copolymer or the resin composition thereof according to any one of Constitutions 1 to 5, wherein the polycarbonate block (A-1) is derived from 2,2-bis(4-hydroxyphenyl)propane; and wherein the polydiorganosiloxane block (A-2) is derived from a (2-allylphenol)-terminated polydiorganosiloxane or a (2-methoxy-4-allylphenol)-terminated polydiorganosiloxane.

<<Constitution 7>>

The copolymer or the resin composition thereof according to any one of Constitutions 1 to 6, including: from 100 to 1% by weight of the copolymer; and from 0 to 99% by weight of the polycarbonate resin.

<<Constitution 8>>

The resin composition according to Constitution 7, wherein the polycarbonate resin is represented by the following general formula [1]:

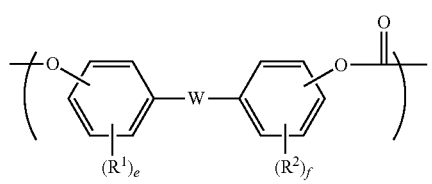

[1]

wherein, in the general formula [1], each of $R^1$ and $R^2$ independently represents a hydrogen atom, a halogen atom or a group selected from the group consisting of an alkyl group containing from 1 to 18 carbon atoms, an alkoxy group containing from 1 to 18 carbon atoms, a cycloalkyl group containing from 6 to 20 carbon atoms, a cycloalkoxy group containing from 6 to 20 carbon atoms, an alkenyl group containing from 2 to 10 carbon atoms, an aryl group containing from 3 to 14 carbon atoms, an aryloxy group containing from 3 to 14 carbon atoms, an aralkyl group containing from 7 to 20 carbon atoms, an aralkyloxy group containing from 7 to 20 carbon atoms, a nitro group, an aldehyde group, a cyano group and a carboxyl group; when a plurality of $R^1$s and $R^2$s are present, they may be the same or different; each of e and f independently represents an integer from 1 to 4; and W represents a single bond or at least one group selected from the group consisting of groups represented by the following general formulae [2]:

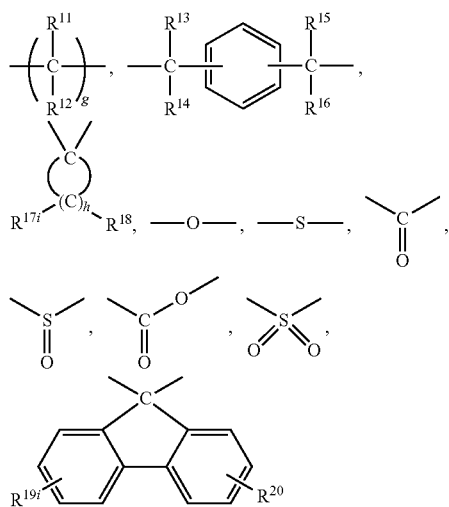

[2]

wherein, in the general formula [2], each of $R^{11}$, $R^{12}$, $R^{13}$, $R^{14}$, $R^{15}$, $R^{16}$, $R^{17}$ and $R^{18}$ independently represents a hydrogen atom or a group selected from the group consisting of an alkyl group containing from 1 to 18 carbon atoms, an aryl group containing from 3 to 14 carbon atoms and an aralkyl group containing from 7 to 20 carbon atoms; each of $R^{19}$ and $R^{20}$ independently represents a hydrogen atom, a halogen atom or a group selected from the group consisting of an alkyl group containing from 1 to 18 carbon atoms, an alkoxy group containing from 1 to 10 carbon atoms, a cycloalkyl group containing from 6 to 20 carbon atoms, a cycloalkoxy group containing from 6 to 20 carbon atoms, an alkenyl group containing from 2 to 10 carbon atoms, an aryl group containing from 3 to 14 carbon atoms, an aryloxy group containing from 6 to 10 carbon atoms, an aralkyl group containing from 7 to 20 carbon atoms, an aralkyloxy group containing from 7 to 20 carbon atoms, a nitro group, an aldehyde group, a cyano group and a carboxyl group; when a plurality of each of these atoms and groups are present, they may be the same or different; g represents an integer from 1 to 10; and h represents an integer from 4 to 7.

<<Constitution 9>>

A resin composition including:
the copolymer or the resin composition thereof according to any one of Constitutions 1 to 8; and
a flame retardant (B) in an amount of from 0.001 to 20 parts by weight with respect to 100 parts by mass of the copolymer or the resin composition thereof.

<<Constitution 10>>

The resin composition according to Constitution 9, wherein the flame retardant (B) is as metal salt-based flame retardant and/or an organic phosphorus-based flame retardant.

<<Constitution 11>>

The resin composition according to Constitution 9 or 10, further including a fluorine-containing anti-dripping agent (C) and/or an ultraviolet absorber (D).

<<Constitution 12>>

A molded article formed from the copolymer or the resin composition thereof according to any one of Constitutions 1 to 7, or from the resin composition according to any one of Constitutions 8 to 11.

<<Constitution 13>>

The molded article according to Constitution 12, wherein the molded article having a thickness of 2 mm has a total light transmittance, as measured in accordance with ASTM D 1003 (ISO 13468), of 80% or less.

<<Constitution 14>>

A method of producing the copolymer or the resin composition thereof according to Constitution 3, the method including the following steps (a) and (b):

(a) allowing a dihydric phenol (I) represented by the following formula [4]:

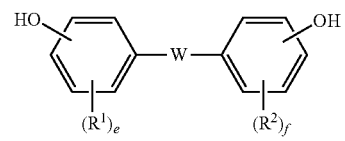

[4]

(wherein $R^1$, $R^2$, e, f and W are the same as defined above) to react with phosgene in a mixed liquid of a water-insoluble organic solvent and an aqueous alkaline solution, to prepare a solution containing a carbonate oligomer containing a terminal chloroformate group; and (b) adding a hydroxyaryl-terminated polydiorganosiloxane (II) represented by the following formula [5]:

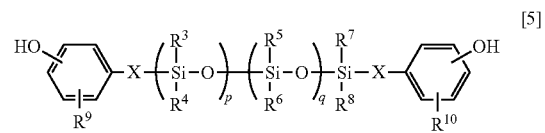

[5]

(wherein $R^3$, $R^4$, $R^5$, $R^6$, $R^7$, $R^8$, $R^9$, $R^{10}$, p, q and X are the same as defined above) to the resulting solution, while stirring, to carry out interfacial polymerization of the hydroxyaryl-terminated polydiorganosiloxane (II) and the carbonate oligomer;

wherein the water-insoluble organic solvent is used in an amount of 8 moles or more and less than 11 moles per mole of the total amount of the dihydric phenols represented by formula [4] and formula [5].

<<Constitution 15>>

The method according to Constitution 14, wherein the water-insoluble organic solvent is used in an amount of moles or more and less than 9.5 moles per mole of the total amount of the dihydric phenols represented by formula [4] and formula [5] to initiate an interfacial polycondensation reaction, and then the water-insoluble organic solvent is further added in an amount of 2 moles or more per mole of the total amount of the dihydric phenols represented by formula [4] and formula [5].

Advantageous Effects of Invention

The PC-POS copolymer or the resin composition thereof according to the present invention has an excellent impact resistance, particularly, impact resistance at a very low temperature, and an excellent chemical resistance as well as has a high coating durability, and thus provides exceptional industrial effects.

DESCRIPTION OF EMBODIMENTS

Figure 1:
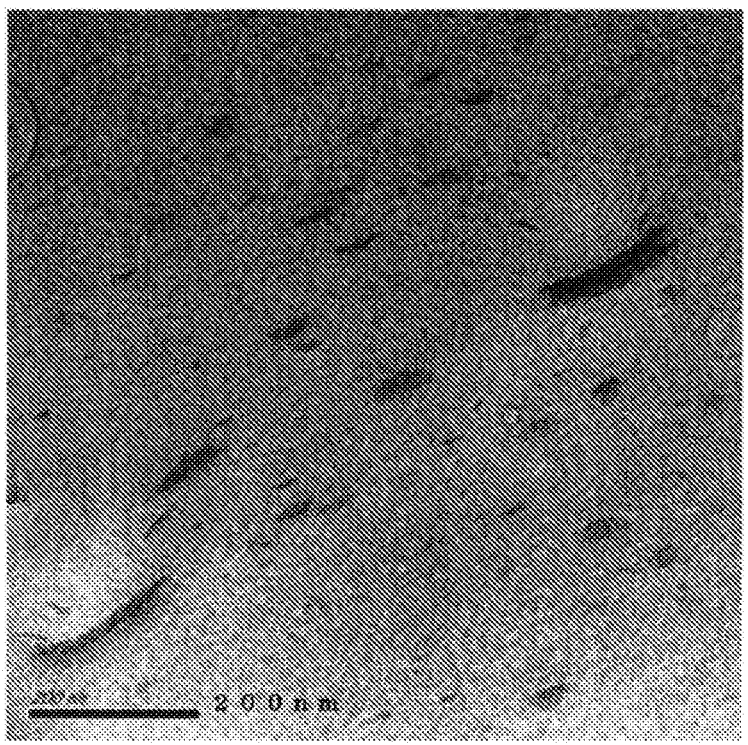
FIG. 1 is a transmission electron microscope image (magnification: 20,000-fold) of a molded piece observed in Example 4 and having a width of 10 mm, a length of 80 mm and a thickness of 4.0 mm, which is taken at the intersection 15 mm from the gate and 5 mm from the side edge, and at a depth of 2 mm, of the molded piece.
Figure 2:
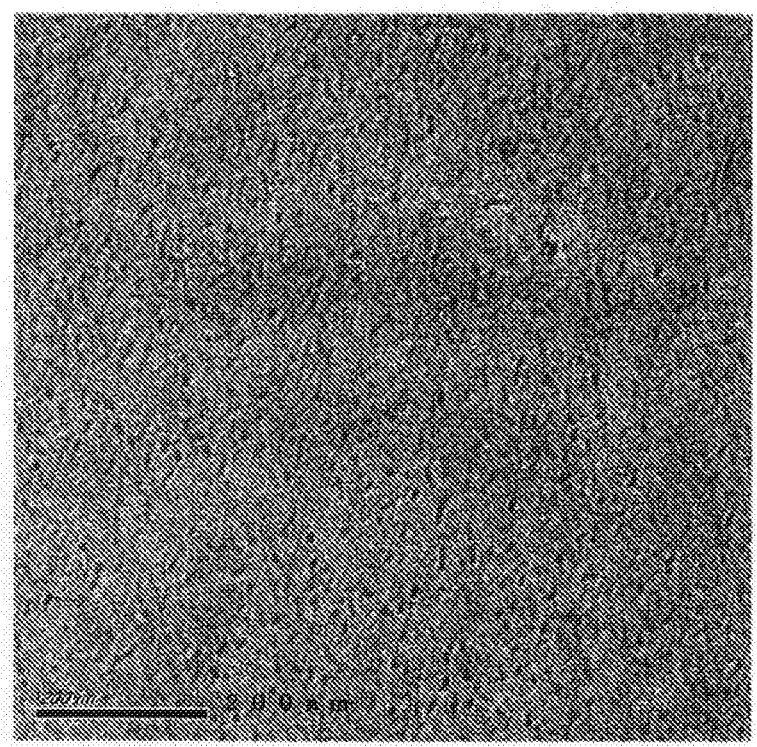
FIG. 2 is a transmission electron microscope image (magnification: 20,000-fold) of a molded piece observed in Comparative Example 7 and having a width of 10 mm, a length of 80 mm and a thickness of 4.0 mm, which is taken at the intersection 15 mm from the gate and 5 mm from the side edge, and at a depth of 2 mm, of the molded piece.

The present invention will now be described in further detail.

<<Polycarbonate Copolymer or Resin Composition>>

The PC-POS copolymer according to the present invention contains a polycarbonate block (A-1) and a polydiorganosiloxane block (A-2). The resin composition according to the present invention is a resin composition containing the above described copolymer, and preferably composed of from 100 to 1% by weight of a PC-POS copolymer and from 0 to 99% by weight of a polycarbonate resin. The copolymer or the resin composition thereof according to the present invention contains from 2.5 to 8.0% by weight of the polydiorganosiloxane block (A-2), and satisfies the following (i) and (ii):

(i) 1 to 20 domains having a maximum long diameter of 80 nm or more are present in a region of 850 nm square (722,500 $nm^2$), in a cross-sectional observation image of the resin composition obtained using an electron beam microscope; and (ii) the average domain size is from 30 to 100 nm.

The present inventors have discovered that, by allowing an unprecedentedly high concentration of a polydiorganosiloxane to react with a carbonate oligomer containing a terminal chloroformate group, in a solvent, it is possible to form coarse domains having a maximum long diameter of 80 nm or more, while forming domains having a specific average size, in the resulting PC-POS copolymer. The present inventors have also discovered that such a state of dispersion of domains is highly advantageous for improving the impact resistance (particularly, impact resistance at a very low temperature) and the like of the PC-POS copolymer.

In the present specification, the combination of a PC-POS copolymer and a polycarbonate resin is sometimes abbreviated as "component A".

<Polycarbonate-Polydiorganosiloxane (PC-POS) Copolymer>

In the present invention, the PC-POS copolymer contains a polycarbonate block (A-1) and a polydiorganosiloxane block (A-2), and preferably contains a polycarbonate block (A-1) represented by formula [1] and a polydiorganosiloxane block (A-2) represented by formula [3].

<PC-POS Copolymer-Polycarbonate Block (A-1)>

In the present invention, the polycarbonate block (A-1) is a polycarbonate-based portion contained in the PC-POS copolymer, and the type thereof is not particularly limited. For example, such a polycarbonate-based portion may be an aromatic polycarbonate-based portion.

The polycarbonate block (A-1) is represented, for example, by the following formula [1].

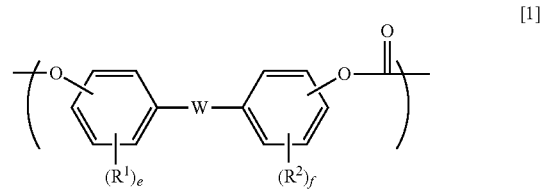

In the general formula [1], each of $R^1$ and $R^2$ independently represents a hydrogen atom, a halogen atom or a group selected from the group consisting of an alkyl group containing from 1 to 18 carbon atoms, an alkoxy group containing from 1 to 18 carbon atoms, a cycloalkyl group containing from 6 to 20 carbon atoms, a cycloalkoxy group containing from 6 to 20 carbon atoms, an alkenyl group containing from 2 to 10 carbon atoms, an aryl group containing from 6 to 14 carbon atoms, an aryloxy group containing from 6 to 14 carbon atoms, an aralkyl group containing front 7 to 20 carbon atoms, an aralkyloxy group containing from 7 to 20 carbon atoms, a nitro group, an aldehyde group, a cyano group and a carboxyl group. When a plurality of $R^1$s and $R^2$s are present, they may be the same or different.

Examples of the halogen atom include fluorine atom, chlorine atom and bromine atom. Examples of the alkyl group containing from 1 to 18 carbon atoms include methyl group, ethyl group, propyl group, butyl group, pentyl group, hexyl group, heptyl group, octyl group, nonyl group, decyl group, dodecyl group and tetradecyl group. An alkyl group containing from 1 to 6 carbon atoms is preferred. Examples of the alkoxy group containing from 1 to 18 carbon atoms include methoxy group, ethoxy group, propoxy group, butoxy group, pentoxy group, hexoxy group and octoxy group. An alkoxy group containing from 1 to 6 carbon atoms is preferred.

Examples of the cycloalkyl group containing from 6 to 20 carbon atoms include cyclohexyl group and cyclooctyl group. A cycloalkyl group containing horn 6 to 12 carbon atoms is preferred. Preferred examples of the cycloalkoxy group containing from 6 to 20 carbon atoms include cyclohexyloxy group and cyclooctyloxy group. A cycloalkoxy group containing from 6 to 12 carbon atoms is preferred.

Examples of the alkenyl group containing from 2 to 10 carbon atoms include methenyl group, ethenyl group, propenyl group, butenyl group and pentenyl group. An alkenyl group containing from 1 to 6 carbon atoms is preferred.

Examples of the aryl group containing from 6 to 14 carbon atoms include phenyl group and naphthyl group. Examples of the aryloxy group containing from 6 to 14 carbon atoms include phenyloxy group and naphthyloxy group. Examples of the aralkyl group containing from 7 to 20 carbon atoms include benzyl group and phenylethyl group. Examples of the aralkyloxy group containing from 7 to 20 carbon atoms include benzyloxy group and phenylethyloxy group.

Each of e and f independently represents an integer from 1 to 4.

W represents a single bond or at least one group selected from the group consisting of groups represented by the following formulae [2].

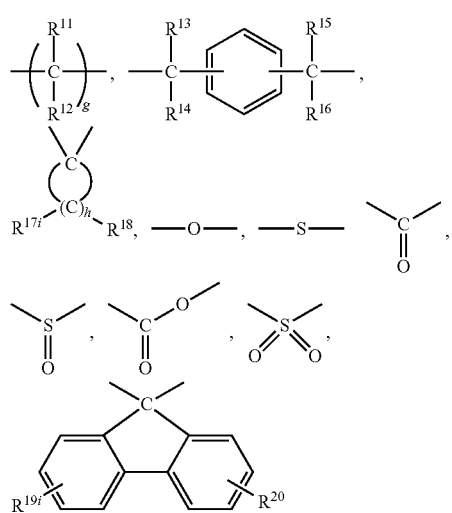

In the above described formula [2], each of $R^{11}$, $R^{12}$, $R^{13}$, $R^{14}$, $R^{15}$, $R^{16}$, $R^{17}$ and $R^{18}$ independently represents a hydrogen atom or a group selected from the group consisting of an alkyl group containing from 1 to 18 carbon atoms, an aryl group containing from 3 to 14 carbon atoms and an aralkyl group containing from 7 to 20 carbon atoms.

Examples of the alkyl group containing from 1 to 18 carbon atoms include methyl group, ethyl group, propyl group, butyl group, pentyl group, hexyl group, heptyl group, octyl group, nonyl group, decyl group and dodecyl group. An alkyl group containing from 1 to 6 carbon atoms is preferred.

Examples of the aryl group containing from 6 to 14 carbon atoms include phenyl group and naphthyl group. Each of these groups may be optionally substituted by a substituent. Examples of the substituent include alkyl groups containing from 1 to 6 carbon atoms, such as methyl group, ethyl group, propyl group and butyl group. Examples of the aralkyl group containing from 7 to 20 carbon atoms include benzyl group and phenylethyl group.

Each of $R^{19}$ and $R^{20}$ independently represents a hydrogen atom, a halogen atom or a group selected from the group consisting of an alkyl group containing from 1 to 18 carbon atoms, an alkoxy group containing from 1 to 10 carbon atoms, a cycloalkyl group containing from 6 to 20 carbon atoms, a cycloalkoxy group containing from 6 to 20 carbon atoms, an alkenyl group containing from 2 to 10 carbon atoms, an aryl group containing from 6 to 14 carbon atoms, an aryloxy group containing from 6 to 10 carbon atoms, an aralkyl group containing from 7 to 20 carbon atoms, an aralkyloxy group containing from 7 to 20 carbon atoms, a nitro group, an aldehyde group, a cyano group and a carboxyl group. When a plurality of each of these atoms and groups are present, they may be the same or different.

Examples of the halogen atom include fluorine atom, chlorine atom and bromine atom. Examples of the alkyl group containing from 1 to 18 carbon atoms include methyl group, ethyl group, propyl group, butyl group, pentyl group, hexyl group, heptyl group, octyl group, nonyl group, decyl group, dodecyl group and tetradecyl group. An alkyl group containing from 1 to 6 carbon atoms is preferred. Examples of the alkoxy group containing from 1 to 10 carbon atoms include methoxy group, ethoxy group, propoxy group, butoxy group and pentoxy group. An alkoxy group containing from 1 to 6 carbon atoms is preferred.

Examples of the cycloalkyl group containing from 6 to 20 carbon atoms include cyclohexyl group and cyclooctyl group. A cycloalkyl group containing from 6 to 12 carbon atoms is preferred. Examples of the cycloalkoxy group containing from 6 to 20 carbon atoms include cyclohexyloxy group and cyclooctyl group. A cycloalkoxy group containing from 6 to 12 carbon atoms is preferred.

Examples of the alkenyl group containing from 2 to 10 carbon atoms include methenyl group, ethenyl group, propenyl group, butenyl group and pentenyl group. An alkenyl group containing from 1 to 6 carbon atoms is preferred.

Examples of the aryl group containing from 6 to 14 carbon atoms include phenyl group and naphthyl group. Examples of the aryloxy group containing from 6 to 14 carbon atoms include phenyloxy group and naphthyloxy group. Examples of the aralkyl group containing from 7 to 20 carbon atoms include benzyl group and phenylethyl group. Examples of the aralkyloxy group containing from 7 to 20 carbon atoms include benzyloxy group and phenylethyloxy group.

g represents an integer from 1 to 10, and preferably an integer from 1 to 6. h represents an integer from 4 to 7, and preferably an integer from 4 to 5.

The polycarbonate block represented by formula [1] is preferably a block derived from 2,2-bis(4-hydroxyphenyl)propane.

The length of the polycarbonate block, as indicated by the average number of repeating units represented by formula [1], is preferably from 10 to 100, more preferably from 30 to 100, and still more preferably from 50 to 70.

The content of the polycarbonate block, particularly, the content of the polycarbonate block represented by formula [1], is preferably from 50 to 99.9% by weight, more preferably from 70 to 99.5% by weight, and still more preferably from 80 to 99.0% by weight, with respect to the total weight of the copolymer.

<PC-POS Copolymer-Polydiorganosiloxane Block (A-2)>

The copolymer according to the present invention contains a polydiorganosiloxane block, and the content of the polydiorganosiloxane block in the copolymer or the resin composition is from 2.5 to 8.0% by weight.

The polydiorganosiloxane block is represented, for example, by the following formula [3].

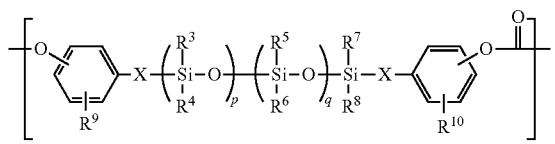

[3]

In the above described formula [3], each of $R^3$, $R^4$, $R^5$, $R^6$, $R^7$ and $R^8$ independently represents a hydrogen atom, an alkyl group containing from 1 to 12 carbon atoms, or a substituted or non-substituted aryl group containing from 6 to 12 carbon atoms.

Examples of the alkyl group containing from 1 to 12 carbon, atoms include methyl group, ethyl group, propyl group, butyl group, pentyl group, hexyl group, heptyl group, octyl group, nonyl group, decyl group and dodecyl group. An alkyl group containing from 1 to 6 carbon atoms is preferred. Examples of the substituted or non-substituted aryl group containing from 6 to 12 carbon atoms include phenyl group and naphthyl group. Examples of the substituent include alkyl groups containing from 1 to 12 carbon atoms, such as methyl group, ethyl group, propyl group, butyl group, pentyl group and hexyl group. $R^3$, $R^4$, $R^5$, $R^6$, $R^7$ and $R^8$ are preferably methyl groups.

Each of $R^9$ and $R^{10}$ independently represents a hydrogen atom, a halogen atom, an alkyl group containing from 1 to 10 carbon atoms or an alkoxy group containing from 1 to 10 carbon atoms.

Examples of the halogen atom include fluorine atom, chlorine atom and bromine atom. Examples of the alkyl group containing from 1 to 10 carbon atoms include methyl group, ethyl group, propyl group, butyl group, pentyl group, hexyl group, heptyl group, octyl group, nonyl group, decyl group and dodecyl group. An alkyl group containing from 1 to 6 carbon atoms is preferred. Examples of the alkoxy group containing from 1 to 10 carbon atoms include methoxy group, ethoxy group, propoxy group, butoxy group, pentoxy group, hexoxy group, heptoxy group and octoxy group. An alkoxy group containing from 1 to 6 carbon atoms is preferred.

p is a natural number; q is 0 or a natural number, and p+q, as the average chain length, is a natural number from 30 to 100. The average chain length p+q is preferably from 35 to 90, and more preferably from 50 to 70. p is preferably from 35 to 90, and more preferably from 50 to 70. q is preferably from 0 to 80, and more preferably from 0 to 50.

When the average chain length p+q is within the range of from 30 to 100, a sufficient low-temperature impact resistance and chemical resistance can be obtained. When the average chain length p+q is lower than the lower limit, it results in a failure to provide a sufficient impact resistance at a very low temperature, whereas when the average chain length p+q is higher than the upper limit, it leads to the deterioration of appearance (such as color unevenness and delamination failure).

X represents a divalent aliphatic group containing from 2 to 8 carbon atoms. Examples of the divalent aliphatic group include an alkylene group containing from 2 to 8 carbon atoms. Examples of the alkylene group include ethylene group, trimethylene group and tetramethylene group.

The polydiorganosiloxane block represented by the above described formula [3] is preferably a block derived from a (2-allylphenol)-terminated polydiorganosiloxane or a (2-methoxy-4-allylphenol)-terminated polydiorganosiloxane. In other words, in formula [3], it is preferred that X be a trimethylene group, and $R^9$ and $R^{10}$ be hydrogen atoms, or that X be a trimethylene group, and $R^9$ and $R^{10}$ be methoxy groups.

As described above, the content of the polydiorganosiloxane block in the copolymer or the resin composition according to the present invention is from 2.5 to 8.0% by weight. However, when the PC-POS copolymer is contained in the resin composition according to the present invention, the PC-POS copolymer can contain the polydiorganosiloxane block in a content different from the range described above. The content of the polydiorganosiloxane block, particularly the content of the polydiorganosiloxane block represented by the above described formula [3], may be, for example, from 3.0 to 30.0% by weight, from 3.5 to 20.0% by weight, or from 4.0 to 15.0% by weight, with respect to the total weight of the PC-POS copolymer. Further, when the PC-POS copolymer is contained in the resin composition according to the present invention, the resin composition may contain the PC-POS copolymer in an amount of from 4.0 to 70.0% by weight, from 8.0 to 60.0% by weight, from 10.0 to 30.0% by weight, or from 12.0 to 25.0% by weight. When the above ranges are satisfied, it provides advantages in the production, for example, that; very large domains can be formed, thereby providing low-temperature impact resistance; an emulsified state can be formed, thereby enabling to carry out a polymerization reaction; and a suitable glass transition temperature is obtained, thereby enabling to perform granulation.

The copolymer has a viscosity average molecular weight of preferably from $5.0\times10^3$ to $3.5\times10^4$, more preferably from $1.0\times10^4$ to $2.5\times10^4$, still more preferably from $1.2\times10^4$ to $2.0\times10^4$, and particularly preferably from $1.5\times10^4$ to $1.8\times10$ When the copolymer has a viscosity average molecular weight of less than the lower limit, a practical mechanical strength is less likely to be obtained in many fields, and kneadability is deteriorated due to a large difference in melt viscosity between the copolymer and the polycarbonate resin to be mixed, etc. When the copolymer has a viscosity average molecular weight exceeding the upper limit, a high molding temperature is generally needed due to high melt viscosity, and thus, it is more likely to cause a decrease in the productivity, due to a defect such as thermal degradation of the resin, or poor separation in a water washing step during the production.

<Polycarbonate Resin>

The polycarbonate resin to be optionally contained in the resin composition according to the present invention is not particularly limited, as long as advantageous effects of the present invention can be provided. For example, the polycarbonate resin may be a polycarbonate which does not contain the above described polydiorganosiloxane block (A-2) and which is composed of the polycarbonate block (A-1). Alternatively, the polycarbonate resin may be derived from a dihydric phenol (I) represented by the following general formula [4]. Examples of the dihydric phenol (I) represented by the general formula [4] include 4,4'-dihydroxybiphenyl, bis(4-hydroxyphenyl)methane, 1,1-bis(4- hydroxyphenyl)ethane, 1,1-bis(4-hydroxyphenyl)-1-phenylethane, 2,2-bis(4-hydroxyphenyl)propane, 2,2-bis(4-hydroxy-3-methylphenyl)propane, 1,1-bis(4-hydroxyphenyl)-3,3,5-trimethylcyclohexane, 2,2-bis(4-hydroxy-3,3'-biphenyl)propane, 2,2-bis(4-hydroxy-3-isopropylphenyl)propane, 2,2-bis(3-t-butyl-4-hydroxyphenyl)propane, 2,2-bis(4-hydroxyphenyl)butane, 2,2-bis(4-hydroxyphenyl)octane, 2,2-bis(3-bromo-4-hydroxyphenyl)propane, 2,2-bis(3,5-dimethyl-4-hydroxyphenyl)propane, 2,2-bis(3-cyclohexyl-4-hydroxyphenyl)propane, 1,1-bis(3-cyclohexyl-4-hydroxyphenyl)cyclohexane, bis(4-hydroxyphenyl)diphenylmethane, 9,9-bis(4-hydroxyphenyl)fluorene, 9,9-bis(4-hydroxy-3-methylphenyl)fluorene, 1,1-bis(4-hydroxyphenyl)cyclohexane, 1,1-bis(4-hydroxyphenyl)cyclopentane, 4,4'-dihydroxydiphenyl ether, 4,4'-dihydroxy-3,3'-dimethyldiphenyl ether, 4,4'-sulfonyldiphenol, 4,4'-dihydroxydiphenyl sulfoxide, 4,4'-dihydroxydiphenyl sulfide, 2,2'-dimethyl-4,4'-sulfonyldiphenol, 4,4'-dihydroxy-3,3'-dimethyldiphenylsulfoxide, 4,4'-dihydroxy-3,3'-dimethyldiphenyl sulfide, 2,2'-diphenyl-4,4'-sulfonyldiphenol, 4,4'-dihydroxy-3,3'-diphenyldiphenyl sulfoxide, 4,4'-dihydroxy-3,3'-diphenyldiphenyl sulfide, 1,3-bis{2-(4-hydroxyphenyl)propyl}benzene, 1,4-bis{2-(4-hydroxyphenyl)propyl}benzene,1,4-bis(4-hydroxyphenyl)cyclohexane, 1,3-bis(4-hydroxyphenyl)cyclohexane, 4,8-bis(4-hydroxyphenyl)tricyclo [5.2.1.02,6]decane, 4,4'-(1,3-adamantanediyl)diphenol and 1,3-bis(1-hydroxyphenyl)-5,7-dimethyladamantane.

Among these, 1,1-bis(4-hydroxyphenyl)-1-phenylethane, 2,2-bis(4-hydroxyphenyl)propane, 2,2-bis(4-hydroxy-3-methylphenyl)propane, 1,1-bis(4-hydroxyphenyl)cyclohexane, 1,1-bis(4-hydroxyphenyl)-3,3,5-trimethylcyclohexane, 4,4'-sulfonyldiphenol, 2,2'-dimethyl-4,4'-sulfonyldiphenol, 9,9-bis(4-hydroxy-3-methylphenyl)fluorene, 1,3-bis{2-(4-hydroxyphenyl)propyl}benzene and 1,4-bis{2-4-hydroxyphenyl)propyl}benzene are preferred. 2,2-bis(4-hydroxyphenyl)propane, 1,1-bis(4-hydroxyphenyl)cyclohexane (BPZ), 4,4'-sulfonyldiphenol and 9,9-bis(4-hydroxy-3-methylphenyl)fluorene are particularly preferred. In particular, 2,2-bis(4-hydroxyphenyl)propane which has an excellent strength and a good durability is most preferred. These compounds may be used singly, or in combination of two or more kinds thereof.

<Composition of Copolymer or Resin Composition>

The copolymer or the resin composition according to the present invention is composed of from 100 to 1% by weight of the PC-POS copolymer and from 0 to 99% by weight of the polycarbonate.

The content of the polydiorganosiloxane block in the present invention is from 2.5 to 8.0 wt %, preferably from 3.0 to 7.0 wt %, and more preferably from 3.5 to 6.5 wt %, with respect to the weight of the resin composition (particularly, the weight of the resin alone in the resin composition). When the content of the polydiorganosiloxane block is lower than the lower limit, it results in a failure to provide a sufficient impact resistance at a very low temperature. When the content is higher than the upper limit, it leads to the deterioration of appearance (such as color unevenness and delamination failure) and poor physical properties, such as a decrease in rigidity, a decrease in glass transition temperature and a decrease in resistance to thermal bending.

The resin composition preferably has a viscosity average molecular weight of from 11,000 to 30,000, and more preferably from 12,000 to 25,000. When the resin composition has a viscosity average molecular weight of less than 11,000, it results in a failure to provide a sufficient low-temperature impact resistance. When the resin composition has a viscosity average molecular weight higher than the upper limit value, it causes a decrease in the productivity, an insufficient molding flowability and the like, due to an increased solution viscosity.

<Domain Size of Polydiorganosiloxane>

The PC-POS copolymer in the present invention has an aggregate structure in which polydiorganosiloxane domains are dispersed in a matrix of a polycarbonate polymer.

The "polydiorganosiloxane domains" as used in the present invention refer to domains which contain a polydiorganosiloxane as a main component and which are dispersed in a polycarbonate matrix. The polydiorganosiloxane domains may contain another component. Since the structure of the polydiorganosiloxane domains is formed by the phase separation between the polydiorganosiloxane, and the polycarbonate as the matrix, as described above, the polydiorganosiloxane domains are not always composed of a single component.

In the present invention, 1 to 20 polydiorganosiloxane domains having a maximum long diameter of 80 nm or more are present in a region of 850 nm square (722,500 $nm^2$), in a cross-sectional observation image of the copolymer or the resin composition thereof obtained using an electron beam microscope (hereinafter, also referred to as TEM). Preferably, from 2 to 20, more preferably from 4 to 20, and most preferably from 5 to 20 of such polydiorganosiloxane domains are present in the cross-sectional observation image. The absence of the polydiorganosiloxane domains having a maximum long diameter of 80 nm or more results in a failure to provide a sufficient impact resistance at a very low temperature, whereas the presence of 20 or more of such polydiorganosiloxane domains leads to the deterioration of appearance (such as color unevenness and delamination failure) and a decrease in impact resistance at a very low temperature. Further, in the present invention, it is preferred that no polydiorganosiloxane domain having a maximum long diameter of 400 nm or more be present in a region of 850 nm square (722,500 $nm^2$) in the cross-sectional observation image, of any one of five pieces of sample sections. When the average size of the domains is within the range of from 30 to 100 nm, no polydiorganosiloxane domain having a maximum long diameter of 400 nm or more is present. However, the presence of one or more of such domains tends to result in both the deterioration of appearance (such as color unevenness and delamination failure) and a decrease in chemical resistance. When the average size of the domains falls outside the above described range, the flame retardancy may also be deteriorated.

Further, the average size of the polydiorganosiloxane domains in the present invention is from 30 to 100 nm, or more than 45 nm and 100 nm or less, preferably from 40 to 80 nm, and more preferably from 50 to 70 nm.

The lower limit of the average size of the polydiorganosiloxane domains is preferably 30 nm, more preferably 40 nm, and particularly preferably 50 nm. The upper limit of the average size is preferably 100 nm, more preferably 80 nm, and particularly preferably 70 nm. When the average size is less than the lower limit of the above described range, it results in an insufficient impact resistance and chemical resistance, whereas when the average size exceeds the upper limit of the range, it leads to the deterioration of the appearance (such as color unevenness and delamination failure) and a decrease in a chemical resistance.

In the present invention, the maximum long diameter of the polydiorganosiloxane domains in a copolymer molded article is evaluated in a cross-sectional observation image of the resin composition, which is obtained using an electron beam microscope and taken over a region of 850 nm square (722,500 nm²).

In the present invention, the average domain size of the polydiorganosiloxane domains in a copolymer molded article refers to the number average of the individual domain sizes.

In the present invention, the terms "maximum long diameter of domains" and "average domain size" refer to measured values obtained by: forming a molded piece having a thickness of 4.0 mm by injection molding; cutting out a thin section from the molded piece; and observing the thin section by TEM.

Specifically, a molded piece having a width of 10 mm, a length of 80 mm and a thickness of 4.0 mm was prepared by injection molding, a thin section was cut out using a microtome at room temperature, at a position 15 mm from the gate of the molded piece, and the thin section was observed using a TEM at a magnification of 20,000-fold. Thereafter, the particle analysis of the resulting TEM photograph was carried out using image processing software, Win ROOF Ver. 6.6 (manufactured by Mitani Corporation), to obtain the average size and the particle size, distribution (frequency distribution) of the polydiorganosiloxane domains in the sample section. In the measurement, the maximum long diameter (the length of each particle between arbitrarily selected two points on the outer contour of the particle, when the two points were selected so as to maximize the length therebetween) was used as the size of each domain. The same analysis was carried out for five pieces of sample sections from each sample, and the average value thereof was taken as the value of each sample.

(Polydiorganosiloxane)

In the present invention, a polydiorganosiloxane having a specific average chain length is used as a raw material. In other words, the polydiorganosiloxane to be used is a hydroxyaryl-terminated polydiorganosiloxane (II) which is represented by following general formula [5], and in which p+q, as the average chain length, is from 30 to 100, preferably from 35 to 90, and more preferably from 50 to 70.

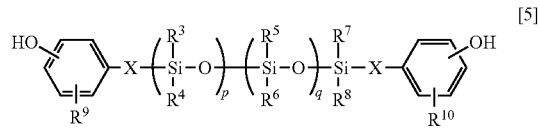

[5]

In formula [5], $R^3$, $R^4$, $R^5$, $R^6$, $R^7$, $R^8$, $R^9$, $R^{10}$, p, q and are the same as defined above.

When the average chain length p+q is lower than 30, it results in a failure to provide a sufficient impact resistance at a very low temperature, whereas when the average chain length p+q is higher than the upper limit value, it leads to the deterioration, of appearance (such as color unevenness and delamination failure). To satisfy such a specific chain length range, two or more kinds of hydroxyaryl-terminated polydiorganosiloxane (II) raw materials varying in the average chain length p+q may be used as a mixture. In this case, a polydiorganosiloxane (X-1) having an average chain length p+q of 1 or more and less than 60, and a polydiorganosiloxane (X-2) having an average chain length p+q of 60 or more and 200 and or less are used as raw materials. The polydiorganosiloxane raw materials may be mixed either by a method in which appropriate polydiorganosiloxane raw materials whose terminals have been modified with a hydroxyaryl group are mixed, or a method in which polydiorganosiloxane precursors which have appropriate average chain lengths and whose terminals are before being modified with a hydroxyaryl group are mixed, in advance, followed by modifying the terminals with a hydroxyaryl group. The average chain length p+q of the polydiorganosiloxane block in a PC-POS copolymer obtained by allowing the polydiorganosiloxane raw material(s) to react with a dihydric phenol and a polycarbonate precursor is preferably from 30 to 100, more preferably from 35 to 90, and still more preferably from 50 to 70, as described above. The average chain length p+q is calculated by Nuclear magnetic resonance (NMR) measurement.

When mixing the polydiorganosiloxane (X-1) and the polydiorganosiloxane (X-2), these polydiorganosiloxanes are preferably mixed at a mass ratio (X-1):(X-2) of from 1:99 to 99:1, and more preferably from 10:90 to 90:10.

It is more preferred to use, as the polydiorganosiloxane raw material, a polydiorganosiloxane (X) obtained by mixing the polydiorganosiloxanes (X-1) and (X-2) in advance, and the polydiorganosiloxanes (X-1) and (X-2) are preferably mixed at a mass ratio of from 1:99 to 99:1, and more preferably from 10:90 to 90:10, as with the case of the mass ratio (X-1):(X-2) described above.

When mixing the polydiorganosiloxanes (X-1) and (X-2) in advance, the lower limit of the average chain length p+q of the polydiorganosiloxane (X-1) is preferably 1 or more, more preferably 20 or more, and still more preferably 30 or more, and the upper limit thereof is preferably less than 60, more preferably less than 50, and still more preferably less than 45. The lower limit of the average chain length p+q of the polydiorganosiloxane (X-2) is preferably 60 or more, more preferably 70 or more, and still more preferably 90 or more, and the upper limit thereof is preferably 200 or less, and more preferably 100 or less. As the hydroxyaryl-terminated polydiorganosiloxane (II) represented by the general formula [5], compounds as shown below are suitably used, for example.

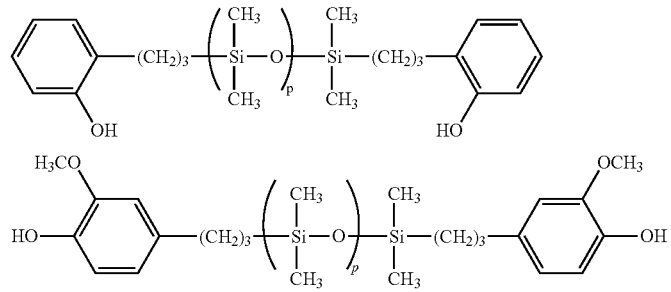

-continued

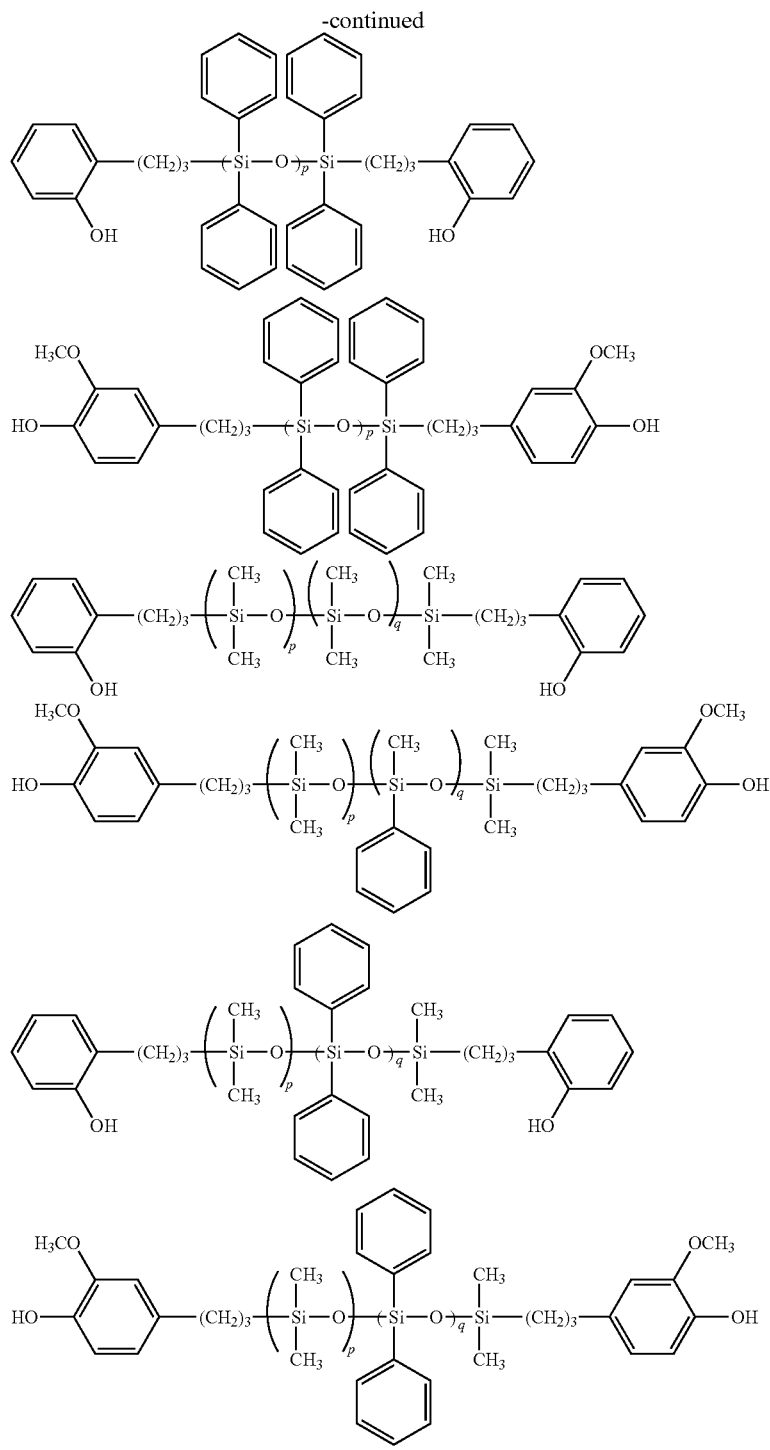

The hydroxyaryl-terminated polydiorganosiloxane (II) can be easily produced by allowing a hydrosilylation reaction to occur between a phenol containing, an olefinically unsaturated carbon-carbon bond, preferably, vinylphenol, isopropenylphenol or 2-methoxy-4-allylphenol, with a terminal of a polysiloxane chain having a predetermined degree of polymerization. In particular, a (2-allylphenol)-terminated polydiorganosiloxane or a (2-methoxy-4-allylphenol)-terminated poly diorganosiloxane is preferred, and a (2-allylphenol)-terminated polydimethylsiloxane or a (2-methoxy-4-allylphenol)-terminated polydimethylsiloxane is particularly preferred.

<<Method of Producing PC-POS Copolymer>>

The PC-POS copolymer in the present invention can be produced by steps (a) and (b).

In the present specification, the "dihydric phenol (I)" or the like is a precursor capable of providing a polycarbonate block, and the "dihydric phenol (II)" or the like is a precursor capable of providing a polydiorganosiloxane block.

<Step (A)>

The step (a) is a step of allowing a dihydric phenol (I) represented by the following formula [4] to react with phosgene in a mixed liquid of a water-insoluble organic solvent and an aqueous alkaline solution, to prepare a solution containing a carbonate oligomer containing a terminal chloroformate group.

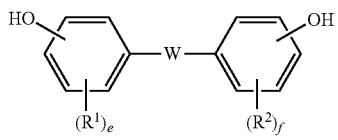

[4]

In formula [4], $R^1$, $R^2$, e, f and W are the same as defined above.

Preferred examples of the dihydric phenol (I) represented by formula [4] include 1,1-bis(4-hydroxyphenyl)-1-phenylethane, 2,2-bis(4-hydroxyphenyl)propane, 2,2-bis(4-hydroxy-3-methylphenyl)propane, 1,1-bis(4-hydroxyphenyl)cyclohexane, 1,1-bis(4-hydroxyphenyl)-3,3,5-trimethylcyclohexane, 4,4'-sulfonyldiphenol 2,2'-dimethyl-4,4'-sulfonyldiphenol, 9,9-bis(4-hydroxy-3-methylphenyl)fluorene, 1,3-bis{2-(4-hydroxyphenyl)propyl}benzene and 1,4-bis{2-(4-hydroxyphenyl)propyl}benzene.

Among these, 2,2-bis(4-hydroxyphenyl)propane, 1,1-bis(4-hydroxyphenyl)cyclohexane (BPZ), 4,4'-sulfonyldiphenol and 9,9-bis(4-hydroxy-3-methylphenyl)fluorene are particularly preferred. In particular, 2,2-bis(4-hydroxyphenyl)propane which has an excellent strength and a good durability is most preferred. These compounds may be used singly, or in combination of two or more kinds thereof.

In the method of producing the PC-POS copolymer according to the present invention, it is effective to allow a high concentration of polydiorganosiloxane to react with a carbonate oligomer containing a terminal chloroformate group, in order to form coarse domains having a maximum long diameter of 80 nm or more. This allows for achieving a hitherto unprecedented state of dispersion, in a region with a low siloxane block content.

Further, as described above, a polydiorganosiloxane having a specific average chain length is used as a raw material, and one kind alone, or two or more kinds of hydroxyaryl-terminated polydiorganosiloxane (II) raw materials may be used.

Specifically, a hydroxyaryl-terminated polydiorganosiloxane (II) which is represented by the following general formula [5] and which has an average chain length p+q of from 30 to 100 is used as a raw material. Further, in order to satisfy such a specific chain length range, two or more kinds of hydroxyaryl-terminated polydiorganosiloxane (II) raw materials varying in the average chain length p+q may be used as a mixture.

In this case, it is preferred to use a polydiorganosiloxane (X-1) having an average chain length p+q of 1 or more and less than 60 and a polydiorganosiloxane (X-2) having an average chain length p+q of 60 or more and 200 and or less, as raw materials, or alternatively, to use a raw material obtained by mixing polydiorganosiloxane precursors which have appropriate average chain lengths and whose terminals are before being modified with a hydroxyaryl group, in advance, followed by modifying the terminals with a hydroxyaryl group.

The polydiorganosiloxane (X-1) and the polydiorganosiloxane (X-2) may be mixed in advance, before being reacted with a carbonate precursor and a dihydric phenol. Alternatively, the polydiorganosiloxanes (X-1) and (X-2) may be simultaneously fed into the reaction solution without being mixed in advance, or the polydiorganosiloxanes (X-1) and (X-2) may be divided and sequentially fed into reaction solution, to be reacted with the carbonate precursor and the dihydric phenol.

More preferred is a method in which the polydiorganosiloxane (X-1) is fed into a reaction solution, and then the polydiorganosiloxane (X-2) is fed into the reaction solution, to be reacted with a carbonate precursor and a dihydric phenol. Such a method is desirable, because it is advantageous in achieving an improvement in the efficiency and cost effectiveness by simplifying the production steps and facility, as well as in the formation of domains having a maximum long diameter of 80 nm or more, which contributes to an improvement in impact resistance.

By feeding the polydiorganosiloxane (X-2) singly and at last, it is considered that the local introduction of a polydiorganosiloxane block having along average chain length into a polymer is facilitated, which works advantageously in the formation of the domains having a maximum long diameter of 80 nm or more. In any of the cases, the hydroxyaryl-terminated polydiorganosiloxane (II) is desirably fed into a reaction solution within the shortest period of time possible, and preferably fed all at once.

By allowing the hydroxyaryl-terminated polydiorganosiloxane (II) to react in a highly concentrated state, it is considered that the local introduction of a polydiorganosiloxane block having a long average chain length into a polymer is facilitated, which works advantageously in the formation of the domains having a maximum long diameter of 80 nm or more. The mass ratio of the polydiorganosiloxanes (X-1) and (X-2) to be used as raw materials are as described above, and the carbonate precursor and the dihydric phenol will be described later.

To obtain coarse domains having a maximum long diameter of 80 nm or more, the water-insoluble organic solvent is preferably used in an amount of 8 moles or more and less than 11 moles, and more preferably from 8 to 9.5 moles, per mole of the total amount of the dihydric phenols represented by formula [4] and formula [5], in the interfacial polycondensation method of obtaining the PC-POS copolymer according to the present invention.

The "total amount of the dihydric phenols" as used herein refers to the total of the amount of bisphenol as a raw material of a polycarbonate and the amount of polydiorganosiloxane monomer(s).

Further, the amount of the water-insoluble organic solvent refers to the total amount of the solvent used up to the time point at which a catalyst is added to initiate a polycondensation reaction, and is the total of: the amount of the solvent used in the production of the polycarbonate oligomer the amount of the solvent used for dissolving the polydiorganosiloxane monomer(s) and a chain terminating agent, and the amount of the solvent added for adjusting the emulsified state during, the interfacial polycondensation reaction.

In the interfacial polycondensation method of obtaining the PC-POS copolymer according to the present invention, when the amount of the water-insoluble organic solvent per mole of the total amount of the dihydric phenols represented by formulae [4] and [5] is less than the lower limit, the emulsified state during the polymerization is deteriorated to result in a decrease in polymer quality, and the solution viscosity is increased excessively to result in a decrease in the productivity. When the amount of the water-insoluble organic solvent exceeds the upper limit, it leads to an insufficient formation of domains having a maximum long diameter of 80 nm or more, resulting in a failure to provide impact resistance at a very low temperature. Further, the water-insoluble organic solvent may be added immediately after the reaction of the carbonate precursor and the dihydric phenol with the polydiorganosiloxane starts to proceed. Specifically, it is desirable to add the water-insoluble organic solvent in an amount of 2 moles or more per mole of the total amount of the dihydric phenols represented by formula [4] and formula [5], when the ratio of unreacted polydiorganosiloxane in the reaction solution, of the total polydiorganosiloxane used, reached 10% or less. This makes it possible to reduce the risk of the precipitation of the polymer component due to an increased concentration, while ensuring a sufficient reaction progress.

Further, it is possible to use a comonomer(s) other than the dihydric phenol (I) and the hydroxyaryl-terminated polydiorganosiloxane (II), in combination, within the range of 10% by weight or less with respect to the total weight of the copolymer, as long as the production method according to the present invention is not interfered with.

In the production method according to the present invention, a mixed solution containing an oligomer containing a terminal chloroformate group is prepared, in advance, by the reaction of the dihydric phenol (I) with a carbonate ester-forming compound in a mixed liquid of the water-insoluble organic solvent and an aqueous alkaline solution.

To form an oligomer of the dihydric phenol (I), the entire amount of the dihydric phenol (I) to be used in the method of the present invention may be used at a time to form the oligomer, or alternatively, a portion thereof may be added as a post-addition monomer, as a reaction raw material in the subsequent interfacial polycondensation reaction. The post-addition monomer is added to accelerate the subsequent polycondensation reaction, and does not have to be added when not needed.

The reaction method of forming the oligomer is not particularly limited. In general, a method of carrying out the reaction in a solvent, in the presence of an acid binder is preferred.

The proportion of the amount of the carbonate ester-forming compound to be used may be adjusted as appropriate, taking into account the stoichiometric ratio (equivalent) of the reaction. When a carbonate ester-forming compound in the form of a gas, such as phosgene, is used, a method of blowing phosgene into the reaction system can be suitably used.

Examples of the acid binder to be used include: alkali metal hydroxides such as sodium hydroxide and potassium hydroxide; alkali metal carbonate salts such as sodium carbonate and potassium carbonate; organic bases such as pyridine; and mixtures thereof.

The proportion of the amount of the acid binder to be used may also be adjusted as appropriate, taking into account the stoichiometric ratio (equivalent) of the reaction, in the same manner as described above. Specifically, it is preferred that 2 equivalents or a slight excess of the acid binder be used with respect to the number of moles (usually, 1 mole corresponds to 2 equivalents) of the dihydric phenol (I) to be used for forming the oligomer.

As the solvent, various solvents which are inert in the reaction, such as those used in the production of known polycarbonates, may be used singly or as a mixed solvent. Typical examples thereof include hydrocarbon solvents such as xylene, and halogenated hydrocarbon solvents such as methylene chloride and chlorobenzene. A halogenated hydrocarbon solvent such as methylene chloride is particularly suitably used.

The pressure used in the reaction for forming the oligomer is not particularly limited, and the reaction may be carried out under normal pressure, increased pressure or reduced pressure. Usually, it is advantageous to carry out the reaction under normal pressure. The reaction temperature is selected within the range of from −20 to 50° C. Since heat is generated by the polymerization, in many cases, it is desirable to carry out cooling with water or ice. The reaction time varies depending on other conditions, and thus cannot be generally defined. However, the reaction time is usually from 0.2 to 10 hours.

The pH range in the reaction for forming the oligomer is the same as that in known interface reaction conditions, and pH is always adjusted to 10 or more.

In the present invention, the PC-POS copolymer is obtained by: preparing a mixed solution containing an oligomer of the dihydric phenol (I) containing a terminal chloroformate group, as described above, and then adding the hydroxyaryl-terminated polydiorganosiloxane (II) to the dihydric phenol (I), while stirring the mixed solution, to carry out interfacial polycondensation of the hydroxyaryl-terminated polydiorganosiloxane (II) and the oligomer.

When carrying out the interfacial polycondensation reaction, an acid binder may be additionally added as appropriate, taking into account the stoichiometric ratio (equivalent) of the reaction. Examples of the acid binder to be used include: alkali metal hydroxides such as sodium hydroxide and potassium hydroxide; alkali metal carbonate salts such as sodium carbonate and potassium carbonate; organic bases such as pyridine; and mixtures thereof. Specifically, it is preferred to use 2 equivalents or an excess of an alkali with respect to the number of moles (usually 1 mole corresponds to 2 equivalents) of the hydroxyaryl-terminated polydiorganosiloxane (II) to be used; or alternatively, when a portion of the dihydric phenol (I) is added in this reaction stage as a post addition monomer, as described above, it is preferred to use such an amount of an alkali with respect to the total number of moles of the post-addition portion of the dihydric phenol (I) and the hydroxyaryl-terminated polydiorganosiloxane (II).

The polycondensation by the interfacial polycondensation reaction of the oligomer of the dihydric phenol (I) with the hydroxyaryl-terminated polydiorganosiloxane (II) is carried out by vigorously stirring the mixed liquid.

In the above described polymerization reaction, a chain terminating agent or a molecular weight regulator is usually used. The chain terminating agent may be, for example, a compound containing a monovalent phenolic hydroxyl group, and examples thereof include ordinary phenol, p-tert-butylphenol, p-cumylphenol and tribromophenol, as well as, long-chain alkyl phenols, aliphatic carboxylic acid chlorides, aliphatic carboxylic acids, hydroxybenzoic acid alkyl esters, hydroxyphenyl alkyl acid esters and alkyl ether phenols. The chain terminating agent is used in an amount of from 100 to 0.5 moles, and preferably from 50 to 2 moles, with respect to 100 moles of all the dihydric phenolic compounds used. It is, of course, possible to use two or more kinds of compounds in combination.

To facilitate the polycondensation reaction, a catalyst such as a tertiary amine exemplified by triethylamine or a quaternary ammonium salt may be added.

The polymerization needs to be carried out for a relatively long period of time, in order to reduce the amount of unreacted polydiorganosiloxane component. The reaction time is preferably 30 minutes or more, and more preferably 50 minutes or more. However, since the stirring of the reaction solution over a long period of time may cause the precipitation of the polymer, the reaction time is preferably 180 minutes or less, and more preferably 90 minutes or less.

Optionally, a small amount of an antioxidant such as sodium sulfite or hydrosulfide may be added.

The copolymer according to the present invention can be formed into a branched copolymer, by using a branching agent in combination with the above described dihydric phenolic compound. Examples of a polyfunctional aromatic compound having a trifunctional or higher functionality which is used in the branched copolymer include: phloroglucin, phloroglucide, trisphenols such as 4,6-dimethyl-2,4,6-tris(4-hydroxydiphenyl)heptene-2,2,4,6-trimethyl-2,4,6-tris(4-hydroxyphenyl)heptane, 1,3,5-tris(4-hydroxyphenyl)benzene, 1,1,1-tris(4-hydroxyphenyl)ethane, 1,1,1-tris(3,5-dimethyl-4-hydroxyphenyl)ethane, 2,6-bis(2-hydroxy-5-methylbenzyl)-4-methylphenol and 4-{4-[1,1-bis(4-hydroxyphenyl)ethyl]benzene}-α,α-dimethylbenzyl phenol, tetra(4-hydroxyphenyl)methane, bis(2,4-dihydroxyphenyl)ketone, 1,4-bis(4,4-dihydroxytriphenylmethyl)benzene, trimellitic acid, pyromellitic acid benzophenonetetracarboxylic acid and acid chlorides of these acids. Among these, 1,1,1-tris(4-hydroxyphenyl)ethane and 1,1,1-tris(3,5-dimethyl-4-hydroxyphenyl)ethane are preferred, and 1,1,1-tris(4-hydroxyphenyl)ethane is particularly preferred.

The reaction can be carried out under reduced, normal pressure or increased pressure, in general, the reaction can be suitably carried out under normal pressure, or around the pressure of the reaction system itself. The reaction temperature is selected within the range of from −20 to 50° C. Since heat is generated by the polymerization, in many cases, it is desirable to carry out cooling with water or ice. The reaction time varies depending on other conditions such as the reaction temperature, and thus cannot be generally defined. However, the reaction time is usual from 0.5 to 10 hours.

Depending on the case, it is also possible to perform a physical treatment (such as mixing or fractionation) and/or a chemical treatment (such as a polymer reaction, a cross-linking treatment or a partial decomposition treatment) on the resulting polycarbonate copolymer, as appropriate, to obtain a polycarbonate copolymer having a desired reduced viscosity [ηSP/c].

The resulting reaction product (crude product) can be recovered as a PC-POS copolymer having a desired purity (degree of purification), by performing any of various known post-treatments, such as separation and purification.

Further, the PC-POS copolymer according to the present invention can contain any of various types of flame retardants, reinforcing fillers and additives which are contained in ordinary polycarbonate resin compositions, as long as the effects of the present invention are not impaired.

<Component B: Flame Retardant>

As the flame retardant to be used as the "component B" in the present invention, it is possible to use any of various compounds conventionally known as flame retardants for thermoplastic resins, particularly, aromatic polycarbonate resins. However, the flame retardant as the component B is more preferably: (b1) an organic metal salt-based flame retardant (such as an organic sulfonic acid alkali (earth) metal salt, a metal borate-based flame retardant, or a metal stannate-based flame retardant); (b2) an organic phosphorus-based flame retardant (such as a monophosphate compound, a phosphate oligomer compound, a phosphonate oligomer compound, a phosphonitrile oligomer compound or a phosphonic acid amide compound); or (b3) a silicone-based flame retardant composed of a silicone compound. Incorporation of a compound used as a flame retardant provides not only an improvement in flame retardancy, but also improvements, for example, in antistatic properties, flowability, rigidity and thermal stability, based on the properties of each compound.

The content of the component B is from 0.001 to 20 parts by weight, preferably from 0.01 to 15 parts by weight, and more preferably from 0.05 to 10 parts by weight, with respect to 100 parts by weight of the component A. When the content of the component B is less than 0.001 parts by weight, a sufficient flame retardancy cannot be maintained, whereas when the content is more than 20 parts by weight, a sufficient impact resistance and flame retardancy cannot be obtained.

<Flame Retardant—Organic Metal Salt-Based Flame Retardant>

An organic metal salt-based flame retardant is advantageous in that the heat resistance is substantially maintained. An organic metal salt-based flame retardant which is most advantageously used in the present invention is a sulfonic acid alkali (earth) metal salt. In particular, an alkali (earth) metal salt of a fluorine-substituted organic sulfonic acid is preferred, and an alkali (earth) metal salt of a sulfonic acid containing a perfluoroalkyl group is particularly preferred. The number of carbon atoms of the perfluoroalkyl group is preferably within the range of from 1 to 18, more preferably from 1 to 10, and still more preferably from 1 to 8.

The metal forming the metal ions in the fluorine-substituted organic sulfonic acid alkali (earth) metal salt is an alkali metal or an alkaline earth metal. Examples of the alkali metal include lithium, sodium, potassium, rubidium and cesium, and examples of the alkaline earth metal include beryllium, magnesium, calcium, strontium and barium. An alkali metal is more preferred. Accordingly, a preferred organic metal salt-based flame retardant is a perfluoroalkylsulfonic acid alkali metal salt. Among the above described alkali metals, rubidium and cesium are preferred when a high transparency is needed; however, the use of these metals may be disadvantageous in terms of cost, since they are not versatile and difficult to be purified. In contrast, lithium and sodium are advantageous in terms of cost and flame retardancy, but may be disadvantageous in terms of transparency. In view of the above, the alkali metal in the perfluoroalkylsulfonic acid alkali metal salt can be selected as appropriate, depending on the case. However, a potassium salt of a perfluoroalkylsulfonic acid, which is excellent in the balance between the properties in all respects, is most preferred. It is also possible to use the potassium salt and a perfluoroalkylsulfonic acid alkali metal salt composed of another alkali metal, in combination.

Examples of the perfluoroalkylsulfonic acid alkali metal salt include potassium fluoromethanesulfonate, potassium perfluorobutanesulfonate, potassium perfluorohexanesulfonate, potassium perfluorooctanesulfonate, sodium pentafluoroethanesulfonate, sodium perfluorobutanesulfonate, sodium perfluorooctanesulfonate, lithium trifluoromethanesulfonate, lithium perfluorobutanesulfonate, lithium perfluoroheptanesulfonate, cesium trifluoromethanesulfonate, cesium perfluorobutanesulfonate, cesium perfluorooctanesulfonate, cesium perfluorohexanesulfonate, rubidium perfluorobutanesulfonate and rubidium perfluorahexanesulfonate. These salts can be used singly, or in combination of two or more kinds thereof. Among these, potassium perfluorobutanesulfonate is particularly preferred.

In the above described organic metal salt-based flame retardant, the content of fluoride ions, as measured by ion chromatography, is preferably 50 ppm or less, more preferably 20 ppm or less, and still more preferably 10 ppm or less. A lower content of fluoride ions results in a better flame retardancy and light resistance. Although the lower limit of the content of fluoride ions can be substantially 0, a practical lower limit is preferably about 0.2 ppm, in view of the balance between the number of purification steps and the effects. A perfluoroalkylsulfonic acid alkali metal salt having such a fluoride ion content can be obtained, for example, by performing purification as follows. A perfluoroalkylsulfonic acid alkali metal salt is dissolved in ion exchanged water in an amount of from 2 to 10 times the weight of the metal salt, at a temperature within the range of from 40 to 90° C. (more suitably, from 60 to 85° C.). The perfluoroalkylsulfonic acid alkali metal salt is produced by a method in which a perfluoroalkylsulfonic acid is neutralized with a carbonate salt or a hydroxide of an alkali metal, or a method in which a perfluoroalkylsulfonyl fluoride is neutralized with a carbonate salt or a hydroxide of an alkali metal (more preferably produced by the latter method). The ion exchanged water is particularly preferably water having an electric resistance value of 18 MΩcm or more. A liquid in which the metal salt is dissolved is stirred at the above described temperature for a period of from 0.1 to 3 hours, and more suitably from 0.5 to 2.5 hours. Thereafter, the resulting liquid is cooled to the range of from 0 to 40° C., more preferably from 10 to 35° C. The cooling causes crystals to precipitate. The precipitated crystals are collected by filtration. In this manner, a suitably purified perfluoroalkylsulfonic acid alkali metal salt is produced.

When a fluorine-substituted organic sulfonic acid alkali (earth) metal salt is used as the flame retardant, the blending amount thereof is preferably from 0.01 to 1.0 parts by weight, more preferably from 0.05 to 0.8 parts by weight, and still more preferably from 0.08 to 0.6 parts by weight, with respect to 100 parts by weight of the component A. When the blending amount is within a more preferred range, of the range described above, the effects (such as flame retardancy and antistatic properties) expected by the incorporation of the fluorine-substituted organic sulfonic acid alkali (earth) metal salt are more effectively exhibited.

As an organic metal salt-based flame retardant other than the fluorine-substituted organic sulfonic acid alkali (earth) metal salt, a metal salt of an organic sulfonic acid containing no fluorine atom is preferred. Examples of the metal salt include alkali metal salts of aliphatic sulfonic acids, alkaline earth metal salts of aliphatic sulfonic acids, alkali metal salts of aromatic sulfonic acids, and alkaline earth metal salts of aromatic sulfonic acids (all of these contain no fluorine atom).

Preferred examples of the aliphatic sulfonic acid metal salts include alkylsulfonic acid alkali (earth) metal salts, and these salts can be used singly, or in combination of two or more kinds thereof (the definition of the term "alkali (earth) metal salt" as used herein includes both an alkali metal salt and an alkaline earth metal salt). Preferred examples of alkanesulfonic acids to be used in the alkylsulfonic acid alkali (earth) metal salts include methanesulfonic acid, ethanesulfonic acid, propanesulfonic acid, butanesulfonic acid, methylbutanesulfonic acid, hexanesulfonic acid, heptansulfonic acid and octanesulfonic acid. These acids can be used singly, or in combination of two or more kinds thereof.

Examples of aromatic sulfonic acids to be used in the aromatic sulfonic acid alkali (earth) metal salts include at least one acid selected from the group consisting of: sulfonic acids of monomeric or polymeric aromatic sulfides, sulfonic acids of aromatic carboxylic acids and esters thereof, sulfonic acids of monomeric or polymeric aromatic ethers, sulfonic acids of aromatic sulfonates; monomeric or polymeric aromatic sulfonic acids, monomeric or polymeric aromatic sulfonic acids, sulfonic acids of aromatic ketones, heterocyclic sulfonic acids, sulfonic acids of aromatic sulfoxides, and condensates of aromatic sulfonic acids formed through methylene linkages. These acids can be used singly, or in combination of two or more kinds thereof.

Specific examples of the aromatic sulfonic acid alkali (earth) metal salts include disodium diphenylsulfide-4,4'-disulfonate, dipotassium diphenylsulfide-4,4'-disulfonate, potassium 5-sulfoisophthalate, sodium 5-sulfoisophthalate, polysodium polyethylene terephthalate polysulfonate, calcium 1-methoxynaphthalene-4-sulfonate, disodium 4-dodecylphenylether disulfonate, polysodium poly(2,6-dimethylphenyleneoxide)polysulfonate, polysodium poly(1,3-phenyleneoxide)polysulfonate, polysodium poly(1,4-phenyleneoxide)polysulfonate, polypotassium poly(2,6-diphenylphenyleneoxide)polysulfonate, lithium poly(2-fluoro-6-butylphenyleneoxide)polysulfonate, potassium sulfonate of benzenesulfonate, sodium benzenesulfonate, strontium benzenesulfonate, magnesium benzenesulfonate, dipotassium p-benzenedisulfonate, dipotassium naphthalene-2,6-disulfonate, calcium biphenyl-3,3'-disulfonate, sodium diphenylsulfone-3-sulfonate, potassium diphenylsulfone-3-sulfonate, dipotassium diphenylsulfone-3,3'-disulfonate, dipotassium diphenylsulfone-3,4'-disulfonate, sodium α,α,α-trifluoroacetophenone-4-sulfonate, dipotassium benzophenone-3,3'-disulfonate, disodium thiophene-2,5-disulfonate, dipotassium thiophene-2,5-disulfonate, calcium thiophene-2,5-disulfonate, sodium benzothiophenesulfonate, potassium diphenylsulfoxide-4-sulfonate, a formalin condensate of sodium naphthalenesulfonate, and a formalin condensate of sodium anthracenesulfonate.

Among the metal salts of organic sulfonic acids containing no fluorine atom, an aromatic sulfonic acid alkali (earth) metal salt is preferred, and a potassium salt is particularly preferred. When such an aromatic sulfonic acid alkali (earth) metal salt is used as the flame retardant, the content thereof is preferably from 0.01 to 1 part by weight, more preferably from 0.05 to 0.8 parts by weight, and still more preferably from 0.08 to 0.6 parts by weight, with respect to 100 parts by weight of the component A.

<Flame Retardant—Organic Phosphorus-Based Flame Retardant>

As the organic phosphorus-based flame retardant according to the present invention, a phosphate compound, particularly, an aryl phosphate compound is preferred. The phosphate compound is effective in improving the flame retardancy and has a plasticizing effect, and therefore, the compound is advantageous in that it allows for improving the molding processability of the resin composition according to the present invention, although it causes a decrease in heat has resistance. As the phosphate compound, any of various phosphate compounds conventionally known as flame retardants can be used. More preferably, the phosphate compound may be, for example, one or more phosphate compounds represented by the following general formula [6].

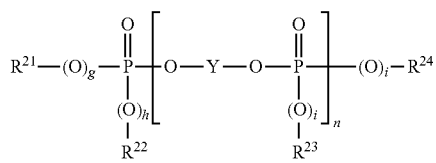
[6]

In formula [6], Y represents a dihydric phenol residue derived from a dihydroxy compound selected from the group consisting of hydroquinone, resorcinol, bis(4-hydroxydiphenyl)methane, bisphenol A, 1,1-bis(4-hydroxyphenyl)-3,3,5-trimethylcyclohexane, 1,1-bis(4-hydroxyphenyl)cyclohexane, 1,1-bis(4-hydroxyphenyl)-3-methylcyclohexane, dihydroxydiphenyl, dihydroxynaphthalene, bis(4-hydroxyphenyl)sulfone, bis(4-hydroxyphenyl)ketone, and bis(4-hydroxyphenyl)sulfide; each of g, h, i and j independently represents 0 or 1; n represents an integer from 0 to 5, or when the phosphate compound is a mixture of phosphate esters having different values of n, n is the average value of a plurality of ns; and each of $R^{21}$, $R^{22}$, $R^{23}$ and $R^{24}$ independently represents a monohydric phenol residue derived from an aryl group selected from the group consisting of phenol, cresol, xylenol, isopropylphenol, butylphenol and p-cumylphenol.

The phosphate compound represented by the above described formula [6] may be a mixture of compounds having different values of n. When the phosphate compound is such a mixture, the average number of n is preferably within the range of from 0.5 to 1.5, more preferably from 0.6 to 1.2, still more preferably from 0.95 to 1.15, and particularly preferably from 1 to 1.14.

Suitable specific examples of the dihydric phenol from which Y in the above described formula [6] is derived include resorcinol, bisphenol A and dihydroxydiphenyl. Among these, resorcinol and bisphenol A are preferred.

Suitable specific examples of the monohydric phenol from which each of $R^{21}$, $R^{22}$, $R^{23}$ and $R^{24}$ in the above described formula [6] is derived include phenol, cresol, xylenol and 2,6-dimethylphenol. Among these, phenol and 2,6-dimethylphenol are preferred.

Suitable specific examples of the phosphate compound represented by the above described formula [6] include: monophosphate compounds such as triphenyl phosphate and tri(2,6-xylyl) phosphate; and phosphate oligomers containing resorcinol bisdi(2,6-xylyl)phosphate) as a main component, phosphate oligomers containing 4,4-dihydroxydiphenylbis(diphenyl phosphate) as a main component, and phosphate oligomers containing bisphenol A bis(diphenyl phosphate) as a main component. Among these, phosphate oligomers containing resorcinol bisdi(2,6-xylyl)phosphate) as a main component, phosphate oligomers containing 4,4-dihydroxydiphenylbis(diphenyl phosphate) as a main component, and phosphate oligomers containing bisphenol A bis(diphenyl phosphate) as a main component are preferred.

Examples of other organic phosphorus-based flame retardants include phosphazenes. A phosphazene is capable of imparting flame retardancy to the resin composition, due to containing a phosphorus atom and a nitrogen atom within the molecule. The phosphazene to be used is not particularly limited, and any compound containing no halogen atom and having a phosphazene structure within the molecule can be used. The "phosphazene structure" as used herein refers to a structure represented by the formula: —P(R)═N— [wherein R represents an organic group]. A phosphazene compound is represented by the general formula [7] or [8].

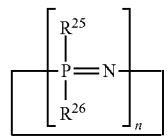
[7]

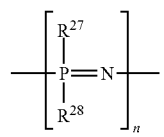
[8]

In formulae [7] and [8], each of $R^{25}$, $R^{26}$, $R^{27}$ and $R^{28}$ represents a hydrogen atom, a hydroxyl group, an amino group, or an organic group containing no halogen atom; and n represents an integer from 3 to 10.

In the above described formulae [7] and [8], examples of the organic group containing no halogen atom, represented by each of $R^{25}$, $R^{26}$, $R^{27}$ and $R^{28}$, include alkoxy groups, phenyl group, amino group and allyl group.

In particular, a cyclic phenoxyphosphazene represented by the following general formula [9] is preferred.

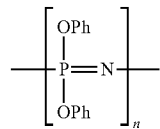
[9]

When an organic phosphorus-based flame retardant is used as the flame retardant, the blending amount thereof is preferably from 1 to 20 parts by weight, more preferably from 2 to 15 parts by weight, and still more preferably from 3 to 10 parts by weight, with respect to 100 parts by weight of the component A. When the blending amount is within a more preferred range, of the range described above, the effects (such as flame retardancy) expected by the incorporation of the organic phosphorus-based flame retardant are more effectively exhibited.

<Flame Retardant—Silicone-Based Flame Retardant>

The silicone compound according to the present invention is not particularly limited, as long as it allows for obtaining flame retardancy and transparency, which is the object of the present invention. However, the silicone compound preferably contains an aromatic group, and in addition, has a viscosity at 2.5° C. of 300 cSt or less. An increase in the viscosity may result in a decrease in the transparency of the resulting molded article. Further, in order for the silicone compound to efficiently exhibit a flame retardant effect, the state of dispersion of the compound during the combustion process is important. An important factor for determining the state of dispersion is viscosity. This is thought to be because, when the silicone compound is excessively volatile during the combustion process, i.e., when the silicone compound has too low a viscosity, the concentration of silicone remaining in the system during the combustion is reduced, making it difficult to form a uniform silicone structure during the combustion. In view of the above, the viscosity at 25° C. of the silicone compound is more preferably from 10 to 300 cSt, still more preferably from 15 to 200 cSt, and most preferably from 20 to 170 cSt.

The aromatic group contained in the silicone compound is bound to a silicone atom, and contributes to improve compatibility with the polycarbonate and to maintain transparency. Further, the aromatic group works advantageously in the formation of a carbonized film during the combustion, and thus also contributes to provide the flame retardant effect. When the silicone compound does not contain an aromatic group, there is a tendency that the transparency of the resulting molded article is less likely to be obtained, and a high flame retardancy is also difficult to be obtained.

The silicone compound according to the present invention is preferably a silicone compound containing an Si—H group. In particular, the silicone compound is more preferably a silicone compound containing an Si—H group and an aromatic group within the molecule, wherein the silicone compound is at least one selected from silicone compounds which have (1) a content amount of Si—H group (Si—H content) of from 0.1 to 1.2 mol/100 g;

(2) a content proportion of an aromatic group represented by the following general formula [10] (aromatic group content) of from 10 to 70% by weight:

[10]

(wherein, in formula [10], each X independently represents an OH group or a hydrocarbon group containing from 1 to 20 carbon atoms and optionally containing a hetero atom-containing functional group; m1 represents an integer from 0 to 5; and when m1 is 2 or more, the two or more Xs may be different from each other) and;

(3) an average degree of polymerization of from 3 to 150.

Still more preferably, the silicone compound is at least one selected from silicone compounds containing, as an Si—H group-containing unit, at least one structural unit, among the structural units represented by the following general formulae [11] and [12].

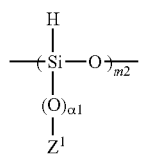

[11]

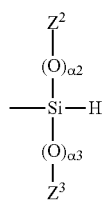

[12]

In formula [11] and formula [12], each of $Z^1$ to $Z^3$ independently represents a hydrogen atom, a hydrocarbon group containing from 1 to 20 carbon atoms and optionally containing a hetero atom-containing functional group, or a compound represented by the following general formula [13]; each of $\alpha1$ to $\alpha3$ independently represents 0 or 1; and m2 represents 0 or an integer of 1 or more. Further, when m2 in formula [11] is 2 or more, the two or more repeating units may be different from each other.

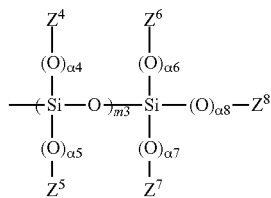

[13]

In formula [13], each of $Z^4$ to $Z^8$ independently represents a hydrogen atom or a hydrocarbon group containing from 1 to 20 carbon atoms and optionally containing a hetero atom-containing functional group; each of $\alpha4$ to $\alpha8$ independently represents 0 or 1; and m3 represents 0 or an integer of 1 or more. Further, when m3 in formula [13] is 2 or more, the two or more repeating units may be different from each other.

The silicone compound is more preferably a silicone compound composed of an MD unit or an MDT unit, when M represents a monofunctional siloxane unit, D represents a difunctional siloxane unit, and T represents a trifunctional siloxane unit.

Examples of the hydrocarbon group containing from 1 to 20 carbon atoms and optionally containing a hetero atom-containing functional group, represented by each of $Z^1$ to $Z^8$ in the structural units represented by the general formulae [11], [12] and [13] as well as X in the general formula [10], include: alkyl groups such as methyl group, ethyl group, propyl group, butyl group, hexyl group and decyl group; cycloalkyl groups such as cyclohexyl group; alkenyl groups such as vinyl group and allyl group; aryl groups such as phenyl group and tolyl group; and aralkyl groups. Further, these groups may contain any of various functional groups, such as epoxy group, carboxyl group, carboxylic anhydride group, amino group and mercapto group. More preferred is an alkyl group containing from 1 to 8 carbon atoms, an alkenyl group or an aryl group. Particularly preferred is an alkyl group containing from 1 to 4 carbon atoms such as methyl group, ethyl group or propyl group, vinyl group, or phenyl group.

When the silicone compound containing at least one structural unit, among the structural units represented by the general formulae [11] and [12], contains a plurality of repeating units containing a siloxane bond, these units can form any of a random copolymer, block copolymer and a tapered copolymer.

In the present invention, the preferred silicone compound containing an Si—H group preferably has an Si—H content within the range of from 0.1 to 2 mol/100 g. When the Si—H content is within the range of from 0.1 to 1.2 mol/100 g, the formation of a silicone structure during the combustion is facilitated. The silicone compound more preferably has an Si—H content within the range of from 0.1 to 1.0 mol/100 g, and most preferably from 0.2 to 0.6 mol/100 g. Too low an Si—H content makes the formation of the silicone structure difficult, whereas too high an Si—H content leads to a decrease in the thermal stability of the resulting composition. The "silicone structure" as used herein refers to a network structure formed by the reaction between silicone compounds, or the reaction between the resin and silicone.

Further, the "Si—H content" as used herein refers to the number of moles of the Si—H structure contained in 100 g of the silicone compound, and can be determined by measuring the volume of hydrogen gas generated per unit weight of the silicone compound, by an alkali decomposition method. For example, when 122 ml of hydrogen gas is generated per 1 g of the silicone compound at 25° C., the Si—H content calculated by the following equation is 0.5 mol/100 g.

$$122 \times 273/(273+25) \div 22400 \times 100 \approx 0.5$$

The silicone compound according to the present invention preferably has an aromatic group content of from 10 to 70% by weight. The silicone compound more preferably has an aromatic group content within the range of from 15 to 60% by weight, and most preferably from 25 to 55% by weight. When the aromatic group content in the silicone compound is lower than 10% by weight, the silicone compound may be localized and poorly dispersed, possibly resulting in the occurrence of appearance detects. When the aromatic group content is higher than 70% by weight, the rigidity of the molecules of the silicone compound itself is increased, and thus the silicone compound may also be localized and poorly dispersed, possibly resulting in the occurrence of appearance defects.

The "aromatic group content" as used herein refers to the proportion of the aromatic croup represented by the above described general formula [10] contained in the silicone compound. The aromatic group content can be determined by the following equation:

Aromatic group content=[$A/M$]×100(% by weight)

In the above equation, A and M represents the numerical values shown below.

A=total molecular weight of all aromatic groups represented by the general formula [10] contained in one molecule of silicone compound M=molecular weight of silicone compound.

Further, the silicone compound to be used in the present invention has a refractive index at 25° C. within the range of from 1.40 to 1.60. The silicone compound more preferably has a refractive index within the range of from 1.42 to 1.59, and most preferably from 1.44 to 1.59. When the refractive index is within the above described range, the silicone compound is finely dispersed in the aromatic polycarbonate, and a resin composition with less cloudiness and a good dye-affinity is provided.

Further, the silicone compound to be used in the present invention preferably has an amount of volatilization, as measured by weight loss on heating at 105° C. for 3 hours, of 18% or less. The silicone compound more preferably has an amount of volatilization of 10% or less. When the silicone compound has an amount of volatilization of higher than 18%, and when the resin composition according to the present invention is extruded and pelletized, the amount of volatilized products generated from the resin is increased, and in addition, a large number of air bubbles tend to be formed in the resulting molded article, both of which are problematic.

The silicone compound to be used may have a linear or a branched structure, as long as the compound satisfies the above described requirements, and it is possible to use various types of compounds which contain an Si—H group at any one of a side chain, a terminal and a branching point in the molecular structure, or at a plurality of sites therein.

In general, the structure of the silicone compound containing an Si—H group within the molecule is formed by an arbitrary combination of the four kinds of siloxane units shown below.

M units: monofunctional siloxane units such as $(CH_3)_3SiO_{1/2}$, $H(CH_3)_2SiO_{1/2}$, $H_2(CH_3)SiO_{1/2}$, $(CH_3)_2(CH_2=CH)SiO_{1/2}$, $(CH_3)_2(C_6H_5)SiO_{1/2}$ and $(CH_3)(C_6H_5)(CH_2=CH)SiO_{1/2}$ D units: difunctional siloxane units such as $(CH_3)_2SiO$, $H(CH_3)SiO$, $H_2SiO$, $H(C_6H_5)SiO$, $(CH_3)(CH_2=CH)SiO$ and $(C_6H_5)_2SiO$ T units: trifunctional siloxane units such as $(CH_3)SiO_{3/2}$, $(C_3H_7)SiO_{3/2}$, $HSiO_{3/2}$, $(CH_2=CH)SiO_{3/2}$ and $(C_6H_5)SiO_{3/2}$ Q unit: tetrafunctional siloxane unit represented by $SiO_2$ Specific examples of the structure of the silicone compound containing an Si—H group, which is used in the present invention, include structures represented by the following rational formulae, $D_n$, $T_p$, $M_mD_n$, $M_mT_p$, $M_mQ_q$, $M_mD_nT_p$, $M_mD_nQ_q$, $M_mT_pQ_q$, $M_mD_nT_pQ_q$, $D_nT_p$, $D_nQ_q$ and $D_nT_pQ_q$. Among these, the structure of the silicone compound is preferably $M_mD_n$, $M_mT_p$, $M_mD_nT_p$ or $M_mD_nQ_q$, and more preferably $M_mD_n$ or $M_mD_nT_p$. (In the above described rational formulae, each of the coefficients m, n, p and q is an integer indicating the degree of polymerization of each siloxane unit. When any one of m, n, p and q is a numerical value of 2 or more, the two or more siloxane units having the coefficient may differ in the hydrogen atom or the hydrocarbon group containing from 1 to 20 carbon atoms and optionally containing a hetero atom-containing functional group, bound thereto).

The total value of the coefficient(s) in each rational formula indicates the average degree of polymerization of the silicone compound. In the present invention, the average degree of polymerization is preferably adjusted within the range of from 3 to 150, more preferably from 4 to 80, and still more preferably from 5 to 60. When the degree of polymerization is lower than 3, the volatility of the silicone compound itself is increased, and thus the amount of volatilization from the resin is more likely to be increased during the processing of the resin composition containing the silicone compound, which is problematic. When the degree of polymerization is higher than 150, the resin composition containing the silicone compound is more likely to have an insufficient flame retardancy and transparency. The above described silicone compound can be used singly, or in combination of two or more kinds thereof.

Such a silicone compound containing an Si—H bond can be produced by a conventionally known method. For example, a desired silicone compound can be obtained by co-hydrolyzing corresponding organochlorosilanes based on the structure of the desired silicone compound, and removing hydrochloric acid and low-boiling point components produced as by-products. When a silicone oil, cyclic siloxane or alkoxysilane containing an Si—H bond, an aromatic group represented by the general formula [10], and a hydrocarbon group containing from 1 to 20 carbon atoms and optionally containing a hetero atom-containing functional group within the molecule, is used as a starting material, a desired silicone compound can be obtained by: carrying out a polymerization reaction using an acid catalyst such as hydrochloric acid, sulfuric acid or methanesulfonic acid, and adding water for hydrolysis depending on the case, and then removing the acid catalyst used and low-boiling point components, in the same manner.

Further, when the silicone compound containing an Si—H group contains siloxane units M, $M^H$, D, $D^H$, $D^{\varphi 2}$, T and $T^\varphi$ represented by the following structural formulae (M: $(CH_3)_3SiO_{1/2}$, $M^H$: $H(CH_3)_2SiO_{1/2}$, D: $(CH_3)_2SiO$, $H(CH_3)SiO$, $D^{\varphi 2}$: $(C_6H_5)_2Si$, T: $(CH_3)SiO_{3/2}$, $T^{\varphi}$: $(C_6H_5)SiO_{3/2}$), and the average numbers of the respective siloxane units contained within one molecule are represented by m, $m_h$, d, $d_h$, $d_{p2}$, t and $t_p$, all of the following relations are preferably satisfied.

$$2 \leq m+m_h \leq 40$$

$$0.35 \leq d+d_h+d_{p2} \leq 148$$

$$0 \leq t+t_p \leq 38$$

$$0.35 \leq m_h+d_h \leq 110$$

When these ranges are not met, it is difficult for the resin composition according to the present invention to achieve a good flame retardancy and an excellent transparency at the same time, and the production of the silicone compound containing an Si—H group may be difficult in some cases.

The content of the silicone compound to be used in the present invention is preferably from 0.1 to 7 parts by weight, more preferably from 0.1 to 4 parts by weight, still more preferably from 0.1 to 2 parts by weight, and most preferably from 0.1 to 1 part by weight, with respect to 100 parts by weight of the component A. When the content of the silicone compound is too high, the heat resistance of the resin is decreased, and gas is more likely to be generated during the processing. When the content is too low, it results in a failure to provide flame retardancy.

<Component C: Fluorine-Containing Anti-Dripping Agent>

The resin composition according to the present invention preferably contains a fluorine-containing anti-dripping agent (component C). The incorporation of the fluorine-containing anti-dripping agent enables to achieve a good flame retardancy, without impairing the physical properties of the resulting molded article.

The fluorine-containing anti-dripping agent may be, for example, a fluorine-containing polymer having a fibril forming-ability. Examples of such a polymer include polytetrafluoroethylene, a tetrafluoroethylene-based copolymer (such as a tetrafluoroethylene/hexafluoropropylene copolymer), a partially fluorinated polymer such as one disclosed in U.S. Pat. No. 4,379,910, and a polycarbonate resin produced from a fluorinated diphenol. Among these, polytetrafluoroethylene (hereinafter, also referred to as PTFE) is preferred.

A PTFE having a fibril forming-ability has a very high molecular weight, and the molecules of the PTFE tend to bind with each due to an external force such as shear force to assume a fibrous form. The PTFE has a number average molecular weight, as determined from the standard specific gravity thereof, of from 1,000,000 to 10,000,000, and more preferably from 2000,000 to 9,000,000. Such a PTFE can be used not only in the form a solid but also in the form of an aqueous dispersion. Further, the PTFE having a fibril forming-ability can also be used as a PTFE mixture, in a form mixed with another resin, so as to improve the dispersibility of the PTFE in the resin, and to obtain a better flame retardancy and mechanical properties.

Examples of commercially available products of the PTFE having a fibril forming-ability include: Teflon (registered trademark) 6J manufactured by Mitsui Dupont Fluorochemicals Co., Ltd.; and Polyflon MPA FA500 and F-201L manufactured by Daikin Industries, Ltd. Typical examples of commercially available products of an aqueous dispersion of the PTFE include: Fluon AD-1 and AD-936, manufactured by Asahi ICI Fluoropolymers Co., Ltd.; Fluon D-1 and D-2, manufactured by Daikin Industries, Ltd.; and Teflon (registered trademark) 30J manufactured by Mitsui Dupont Fluorochemicals Co., Ltd.

As the PTFE in a mixed form, it is possible to use those obtained by the following methods: (1) a method of mixing an aqueous dispersion of the PTFE with an aqueous dispersion or a solution of an organic polymer to carry out co-precipitation, to obtain a coaggregated mixture (method disclosed in Japanese Unexamined Patent Publication (Kokai) No. S60-258263, Japanese Unexamined Patent Publication (Kokai) No. S63-154744 and the like), (2) a method of mixing an aqueous dispersion of the PTFE with dried organic polymer particles (method disclosed in Japanese Unexamined Patent Publication (Kokai) No. H4-272957), (3) a method of uniformly mixing an aqueous dispersion of the PTFE with an organic polymer particle solution, and removing the respective media from the resulting mixture simultaneously (method disclosed in Japanese Unexamined Patent Publication (Kokai) No. H6-220210, Japanese Unexamined Patent Publication (Kokai) No. H08-188653 and the like), (4) a method of polymerizing a monomer which forms an organic polymer in an aqueous dispersion of the PTFE (method disclosed in Japanese Unexamined Patent Publication (Kokai) No. H9-95583), and (5) a method of uniformly mixing an aqueous dispersion of the PTFE with a dispersion of an organic polymer, and then further polymerizing a vinyl monomer in the resulting mixed dispersion, to obtain a mixture (method disclosed in Japanese Unexamined Patent Publication (Kokai) No. H11-29679 and the like). Examples of commercially available products of these PTFEs in a mixed form include: "METABLEN A3800" (trade name) manufactured by Mitsubishi Rayon Co., Ltd.; and "BLENDEX B449" (trade name) manufactured by GE Specialty Chemical Co., Ltd.

When used in a mixed form, the PTFE is preferably contained at a proportion of from 1 to 60% by weight, and more preferably from 5 to 55% by weight, in 100% by weight of the PTFE mixture. When the proportion of the PTFE is within the above described range, a good dispersibility of the PTFE can be achieved. The proportion of the component C indicates the net amount of the anti-dripping agent, and in the case of using the PTFE in a mixed form, the proportion thereof indicates the net amount of the PTFE.

The content of the component C is preferably from 0.01 to 5 parts by weight, more preferably from 0.05 to 1.5 parts by weight, and still more preferably from 0.1 to 1 part by weight, with respect to 100 parts by weight of the component A. When the content of the anti-dripping agent is too low, being below the above described range, it may result in an insufficient flame retardancy. On the other hand, when the content of anti-dripping agent is, too high, exceeding the above described range, not only the PTFE may be precipitated on the surface of the resulting molded article to cause the occurrence of appearance defects, but also the cost of the resin composition may be increased, and therefore not preferred.

<Component D: Ultraviolet Absorber>

Specific examples of the ultraviolet absorber to be used as the component D according to the present invention include benzophenone based ultraviolet absorbers such as 2,4-dihydroxybenzophenone, 2-hydroxy-4-methoxybenzophenone, 2-hydroxy-4-octoxybenzophenone, 2-hydroxy-4-benzyloxybenzophenone, 2-hydroxy-4-methoxy-5-sulfoxybenzophenone, 2,2'-dihydroxy-4-methoxybenzophenone, 2,2',4,4'-tetrahydroxybenzophenone, 2,2'-dihydroxy-4,4'-dimethoxybenzophenone, 2,2'-dihydroxy-4,4'-dimethoxy-5- sodium sulfoxybenzophenone, bis(5-benzoyl-4-hydroxy-2-methoxyphenyl)methane, 2-hydroxy-4-n-dodecyloxybenzophenone and 2-hydroxy-4-methoxy-2'-carboxybenzophenone. Specific examples of the ultraviolet absorber further include benzotriazole-based ultraviolet absorbers such as 2-(2-hydroxy-5-methylphenyl)benzotriazole, 2-(2-hydroxy-5-tert-octylphenyl)benzotriazole, 2-(2-hydroxy-3,5-dicumylphenyl)phenylbenzotriazole, 2-(2-hydroxy-3-tert-butyl-5-methylphenyl)-5-chlorobenzotriazole, 2,2'-methylenebis[4-(1,1,3,3-tetramethylbutyl)-6-(2H-benzotriazol-2-yl)phenol], 2-(2-hydroxy-3,5-di-tert-butylphenyl)benzotriazole, 2-(2-hydroxy-3,5-di-tert-butylphenyl)-5-chlorobenzotriazole, 2-(2-hydroxy-3,5-di-tert-amylphenyl)benzotriazole, 2-(2-hydroxy-5-tert-octylphenyl)benzotriazole, 2-(2-hydroxy-5-tert-butylphenyl)benzotriazole, 2-(2-hydroxy-4-octoxyphenyl)benzotriazole, 2,2'-methylenebis(4-cumyl-6-benzotriazolephenyl), 2,2'-p-phenylenebis(1,3-benzoxazin-4-one) and 2-[2-hydroxy-3-(3,4,5,6-tetrahydrophthalimidomethyl)-5-methylphenyl]benzotriazole. Examples thereof also include polymers having a 2-hydroxyphenyl-2H-benzotriazole skeleton, such as a copolymer of 2-(2'-hydroxy-5-methacryloxyethylphenyl)-2H-benzotriazole and a vinyl-based monomer copolymerizable with the monomer, and a copolymer of 2-(2'-hydroxy-5-acryloxyethylphenyl)-2H-benzotriazole and a vinyl-based monomer copolymerizable with the monomer. Specific examples of the ultraviolet absorber further include hydroxyphenyltriazine-based ultraviolet absorbers such as 2-(4,6-diphenyl-1,3,5-triazin-2-yl)-5-hexyloxyphenol, 2-(4,6-diphenyl-1,3,5-triazin-2-yl)-5-methyloxyphenol, 2-(4,6-diphenyl-1,3,5-triazin-2-yl)-5-ethyloxyphenol, 2-(4,6-diphenyl-1,3,5-triazin-2-yl)-5-propyloxyphenol and 2-(4,6-diphenyl-1,3,5-triazin-2-yl)-5-butyloxyphenol. Examples thereof also include compounds obtained by replacing the phenyl groups in the above compounds with a 2,4-dimethylphenyl group, such as 2-(4,6-bis(2,4-dimethylphenyl)-1,3,5-triazin-2-yl)-5-hexyloxyphenol. Specific examples of the ultraviolet absorber further include cyclic imino ester-based ultraviolet absorbers such as 2,2'-p-phenylenebis(3,1-benzoxazin-4-one), 2,2'-m-phenylenebis(3,1-benzoxazin-4-one) and 2,2'-p,p'-diphenylenebis(3,1-benzoxazin-4-one). Specific examples of the ultraviolet absorber further include cyanoacrylate-based ultraviolet absorbers such as 1,3-bis-[(2'-cyano-3',3'-diphenylacryloyl)oxy]-2,2-bis[(2-cyano-3,3-diphenylacryloyl)oxy]methyl)propane and 1,3-bis-[2-cyano-3,3-diphenylacryloyl)oxy]benzene. Further, the ultraviolet absorber may be a polymer type ultraviolet absorber obtained by copolymerizing an ultraviolet absorbing monomer and/or photostable monomer, which has the structure of a monomer compound capable of being radically polymerized with a monomer such as an alkyl (meth)acrylate. The ultraviolet absorbing monomer may preferably be, for example, a compound containing a benzotriazole skeleton, a benzophenone skeleton, a triazine skeleton, a cyclic imino ester skeleton on a cyanoacrylate skeleton in the ester substituent of a (meth)acrylic acid ester. Among the above described compounds, benzotriazol-based and hydroxyphenyltriazine-based ultraviolet absorbers are preferred from the viewpoint of ultraviolet absorbability, and cyclic imino ester-based and cyanoacrylate-based ultraviolet absorbers are preferred from the viewpoints of heat resistance and color. Specific examples thereof include: "Chemisorb 79" manufactured by Chemipro Kasei Kaisha Ltd.; and "TINUVIN 234" manufactured by BASF Japan Ltd. The above described ultraviolet absorbers can be used singly, or in a mixture of two or more kinds thereof.

The content of the component D is preferably from 0.01 to 3 parts by weight, more preferably from 0.01 to 1 part by weight, still more preferably from 0.05 to 1 part by weight, and particularly preferably from 0.05 to 0.5 parts by weight, with respect to 100 parts by weight of the resin component. When the content of the component D is less than 0.01 parts by weight, the weather resistance may be insufficient, whereas when the content is more than 3 parts by weight, the flame retardancy may be insufficient.

<Component Other Additives>
(e1) Phosphorus-Based Stabilizer

The phosphorus-based stabilizer may be, for example, phosphorous acid, phosphoric acid, phosphorous acid, phosphoric acid or an ester thereof; or a tertiary phosphine.

Specific examples of the phosphite compound include triphenyl phosphite, tris(nonylphenyl)phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, tris(diethylphenyl)phosphite, tris(di-isopropylphenyl)phosphite, tris(di-n-butylphenyl)phosphite, tris(2,4-di-tert-butylphenyl)phosphite, tris(2,6-di-tert-butylphenyl)phosphite, distearyl pentaerythritol diphosphite, bis(2,4-di-tert-butylphenyl)pentaerythritol diphosphite, bis(2,6-di-tert-butyl-4-methylphenyl)pentaerythritol diphosphite, bis(2,6-di-tert-butyl-4-ethylphenyl)pentaerythritol diphosphate, bis{2,4-bis(1-methyl-1-phenylethyl)phenyl}pentaerythritol diphosphite, phenyl bisphenol A pentaerythritol diphosphite, bis(nonylphenyl)pentaerythritol diphosphite, and dicyclohexyl pentaerythritol diphosphite.

Other phosphite compounds which react with a dihydric phenol and which have a cyclic structure can also be used. Examples thereof include 2,2'-methylenebis(4,6-di-tert-butylphenyl)(2,4-di-tert-butylphenyl)phosphite, 2,2'-methylenebis(4,6-di-tert-butylphenyl)(2-tert-butyl-4-methylphenyl)phosphite, and 2,2-methylenebis(4,6-di-tert-butylphenyl)octyl phosphite.

Examples of the phosphate compound include tributyl phosphate, trimethyl phosphate, tricresyl phosphate, triphenyl phosphate, trichlorophenyl phosphate, triethyl phosphate, diphenylcresyl phosphate, diphenylmonoorthoxenyl phosphate, tributoxyethyl phosphate, dibutyl phosphate, dioctyl phosphate and diisopropyl phosphate. Among these, triphenyl phosphate and trimethyl phosphate are preferred.

Examples of the phosphonite compound include tetrakis(2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, tetrakis(2,6-di-tert-butylphenyl)-4,4'-biphenylene diphosphonite, tetrakis(2,6-di-tert-butylphenyl)-4,3'-biphenylene diphosphonite, tetrakis(2,6-di-tert-butylphenyl)-3,3'-biphenylene diphosphonite, bis(2,4-di-tert-butylphenyl)-4-phenyl-phenyl phosphonite, bis(2,4-di-tert-butylphenyl)-3-phenyl-phenyl phosphonite, bis(2,6-di-n-butylphenyl)-3-phenyl-phenyl phosphorite, bis(2,6-di-tert-butylphenyl)-4-phenyl-phenyl phosphonite and bis(2,6-di-tert-butylphenyl)-3-phenyl-phenyl phosphonite. Among these, tetrakis(di-tert-butylphenyl)-biphenylene diphosphonites and bis(di-tert-butylphenyl)-phenyl-phenyl phosphonites are preferred, and tetrakis(2,4-di-tert-butylphenyl)-biphenylene diphosphonites and bis(2,4-di-tert-butylphenyl)-phenyl-phenyl phosphonites are more preferred. The phosphonite compound can be preferably used in combination with the above described phosphite compound having an aryl group substituted with two or more alkyl groups.

Examples of the phosphonate compound include dimethyl benzenephosphonate, diethyl benzenephosphonate, and dipropyl benzenephosphonate.

Examples of the tertiary phosphine include triethylphosphine, tripropylphosphine, tributylphosphine, trioctylphosphine, triamylphosphine, dimethylphenylphosphine, dibutylphenylphosphine, diphenylmethylphosphine, diphenyloctylphosphine, triphenylphosphine, tri-p-tolylphosphine, trinaphthylphosphine, and diphenylbenzylphosphine. A particularly preferred tertiary phosphine is triphenylphosphine.

The above described phosphorus-based stabilizers can be used not only singly, but also as a mixture of two or more kinds thereof. Among the phosphorus-basal stabilizers, phosphonite compounds, and phosphite compounds represented by the following general formula [14] are preferred.

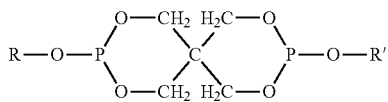

[14]

In formula [14], each of R and R' represents an alkyl group containing from 6 to 30 carbon atoms or an aryl group containing from 6 to 30 carbon atoms, and R and R' may be the same as, or different from, each other.

As described above, tetrakis(2,4-di-tert-butylphenyl)-biphenylene diphosphonites are preferred as the phosphonite compound, and stabilizers containing the phosphonite as a main component are commercially available as Sandostab P-EPQ (trademark, manufactured by Clariant AG) and Irgafos P-EPQ (trademark, manufactured by CIBA SPECIALTY CHEMICALS), both of which can be used.

Among the phosphite compounds represented by the above described formula [14], more preferred are distearyl pentaerythritol diphosphate, bis(2,4-di-tert-butylphenyl) pentaerythritol diphosphite, bis(2,6-di-tert-butyl-4-methylphenyl)pentaelythritol diphosphite and bis{2,4-bis(1-methyl-1-phenylethyl)phenyl}pentaerythritol diphosphite.

Distearyl pentaerythritol diphosphite is commercially available as Adekastab PEP-8 (trademark, manufactured by Asahi Denka Kogyo K.K.) and JPP 681S (trademark, manufactured by Johoku Chemical Co., Ltd.), both of which can be used. Bis(2,4-di-tert-butylphenyl)pentaerythritol diphosphite is commercially available as Adekastab PEP-24G (trademark, manufactured by Asahi Denka Kogyo K.K.), Alkanox P-24 (trademark, manufactured by Great Lakes), Ultranox P626 (trademark, manufactured by GE Specialty Chemicals), Doverphos S-9432 (trademark, manufactured by Dover Chemical Corporation), as well as Irgaofos 126 and 126FF (trademark, manufactured by CIBA SPECIALTY CHEMICALS) and the like, all of which can be used. Bis(2,6-di-tert-butyl-4-methylphenyl)pentaerythritol diphosphite is commercially available as Adekastab PEP-36 (trademark, manufactured by Asahi Denka Kogyo K.K.), and can be easily used. Further, bis{2,4-bis(1-methyl-1-phenylethyl)phenyl}pentaerythritol diphosphite is commercially available as Adekastab PEP-45 (trademark, manufactured by Asahi Denka Kogyo K.K.), and Doverphos S-9228 (trademark, manufactured by Dover Chemical Corporation), both of which can be used.

(e2) Hindered Phenolic Antioxidant

Various types of compounds commonly incorporated into resins can be used as the hindered phenol compound. Examples of the hindered phenol compound include α-tocopherol, butylhydroxytoluene, sinapyl alcohol, vitamin E, octadecyl-3-(3,5-di-tert-butyl-4-hydroxyphenyl)propionate, 2-tert-butyl-6-(3'-tert-butyl-5'-methyl-2'-hydroxybenzyl)-4-methylphenyl acrylate, 2,6-di-tert-butyl-4-(N,N-dimethylaminomethyl)phenol, 3,5-di-tert-butyl-4-hydroxybenzylphosphonate diethyl ester, 2,2'-methylenebis(4-methyl-6-tert-butylphenol), 2,2'-methylenebis(4-ethyl-6-tert-butylphenol), 4,4'-methylenebis(2,6-di-tert-butylphenol), 2,2'-methylenebis(4-methyl-6-cyclohexylphenol), 2,2'-dimethylene-bis(6-α-methyl-benzyl-p-cresol), 2,2'-ethylidene-bis(4,6-di-tert-butylphenol), 2,2'-butylidene-bis(4-methyl-6-tert-butylphenol), 4,4'-butylidene-bis(3-methyl-6-tert-butylphenol), triethylene glycol-N-bis-3-(3-tert-butyl-4-hydroxy-5-methylphenyl)propionate, 1,6-hexanediol-bis[3-(3,5-di-tert-butyl-4-hydroxyphenyl)propionate], bis[2-tert-butyl-4-methyl-6-(3-tert-butyl-5-methyl-2-hydroxybenzyl) phenyl]terephthalate, 3,9-bis{2-[3-(3-tert-butyl-4-hydroxy-5-methylphenyl)propionyloxy]-1,1-dimethylethyl}-2,4,8,10-tetraoxaspiro[5,5]undecane, 4,4'-thiobis(6-tert-butyl-m-cresol), 4,4'-thiobis(3-methyl-6-tert-butylphenol), 2,2'-thiobis(4-methyl-6-tert-butylphenol), bis(3,5-di-tert-butyl-4-hydroxybenzyl)sulfide, 4,4'-di-thiobis(2,6-di-tert-butylphenol), 4,4'-tri-thiobis(2,6-di-tert-butylphenol), 2,2-thiodiethylenebis-[3-(3,5-di-tert-butyl-4-hydroxyphenyl) propionate], 2,4-bis(n-octylthio)-6-(4-hydroxy-3,5-di-tert-butylanilino)-1,3,5-triazine, N,N'-hexamethylenebis-(3,5-di-tert-butyl-4-hydroxyhydrocinnamide), N,N'-bis[3-(3,5-di-tert-butyl-4-hydroxyphenyl)propionyl]hydrazine, 1,1,3-tris(2-methyl-4-hydroxy-5-tert-butylphenyl)butane, 1,3,5-trimethyl-2,4,6-tris(3,5-di-tert-butyl-4-hydroxybenzyl) benzene, tris(3,5-di-tert-butyl-4-hydroxyphenyl) isocyanurate, tris(3,5-di-tert-butyl-4-hydroxybenzyl) isocyanurate, 1,3,5-tris(4-tert-butyl-3-hydroxy-2,6-dimethylbenzyl)isocyanurate, 1,3,5-tris-2[3(3,5-di-tert-butyl-4-hydroxyphenyl)propionyloxy]ethylisocyanurate, tetrakis[methylene-3-(3,5-di-tert-butyl-4-hydroxyphenyl)propionate]methane, triethylene glycol-N-bis-3-(3-tert-butyl-4-hydroxy-5-methylphenyl)propionate, triethylene glycol-N-bis-3-(3-tert-butyl-4-hydroxy-5-methylphenyl)acetate, 3,9-bis[2-{3-(3-tert-butyl-4-hydroxy-5-methylphenyl) acetyloxy}-1,1-dimethylethyl]-2,4,8,10-tetraoxaspiro[5,5] undecane, tetrakis[methylene-3-(3-tert-butyl-4-hydroxy-5-methylphenyl)propionate]methane, 1,3,5-trimethyl-2,4,6-tris(3-tert-butyl-4-hydroxy-5-methylbenzyl)benzene, and tris(3-tert-butyl-4-hydroxy-5-methylbenzyl)isocyanurate.

Among the above mentioned compounds, tetrakis[methylene-3-(3-tert-butyl-4-hydroxy-5-methylphenyl)propionate]methane, octadecyl-3-(3,5-di-tert-butyl-4-hydroxyphenyl)propionate, and 3,9-bis[2-{3-(3-t-butyl-4-hydroxy-5-methylphenyl)propionyloxy}-1,1-dimethylethyl]-2,4,8, 10-tetraoxaspiro[5,5]undecane are preferably used in the present invention. 3,9-bis[2-{3-(3-t-butyl-4-hydroxy-5-methylphenyl)propionyloxy}-1,1-dimethylethyl]-2,4,8,10-tetraoxaspiro[5,5]undecane is particularly preferred. The hindered phenolic antioxidant may be used singly, or in combination of two or more kinds thereof.

The resin composition according to the present invention preferably contains either the phosphorus-based stabilizer or the hindered phenolic antioxidant, and more preferably contains both of these in combination. The content of the phosphorus-based stabilizer or the hindered phenolic antioxidant is preferably from 0.001 to 3 parts by weight, more preferably from 0.005 to 2 parts by weight, and still more preferably from 0.01 to 1 part by weight, with respect to 100 parts by weight of the component A. When used in combination, it is more preferred that from 0.01 to 0.3 parts by weight of the phosphorus-based stabilizer and from 0.01 to 0.3 parts by weight of the hindered phenolic antioxidant be contained with respect to 100 parts by weight of the component A.

(e3) Mold Release Agent

For the purpose of improving the productivity during the molding of the resin composition according to the present invention, or reducing the deformation of the resulting molded article, it is preferred that the resin composition further contain a mold release agent. As the mold release agent, any known mold release agent can be used. Examples thereof include saturated fatty acid esters, unsaturated fatty acid esters, polyolefin waxes such as polyethylene waxes and 1-alkene polymers. Those modified with a functional group-containing compound, such as acid-modified waxes, can also be used), silicone compounds, fluorine compounds (such as fluorine oils typified by polyfluoroalkyl ethers), paraffin waxes and beeswax. Among these, a preferred mold release agent may be, for example, a fatty acid ester. The fatty acid ester is an ester of an aliphatic alcohol and an aliphatic carboxylic acid. The aliphatic alcohol may be a monohydric alcohol, or may be a polyhydric alcohol having 2 or more hydroxyl groups. Further, the number of carbon atoms of the alcohol is within the range of from 3 to 32, and preferably within the range of from 5 to 30. Examples of the monohydric alcohol include dodecanol, tetradecanol, hexadecanol, octadecanol, eicosanol, tetracosanol, ceryl alcohol and triacontanol. Examples of the polyhydric alcohol include pentaerythritol, dipentaerythritol, tripentaerythritol, polyglycerol (triglycerol to hexaglycerol), ditrimethylolpropane, xylitol, sorbitol and mannitol. In the fatty acid ester according to the present invention, a polyhydric alcohol is more preferred.

The aliphatic carboxylic acid preferably has from 3 to 32 carbon atoms, and an aliphatic carboxylic acid containing from 10 to 22 carbon atoms is particularly preferred. Examples of the aliphatic carboxylic acid include: saturated aliphatic carboxylic acids such as decanoic acid, undecanoic acid, dodecanoic acid, tridecanoic acid, tetradecanoic acid, pentadecanoic acid, hexadecanoic acid (palmitic acid), heptadecanoic acid, octadecanoic acid (stearic acid), nonadecanoic acid, behenic acid, icosanoic acid and docosanoic acid; and unsaturated aliphatic carboxylic acids such as palmitoleic acid, oleic acid, linoleic acid, linolenic acid, eicosenoic acid, eicosapentaenoic acid, and cetoleic acid. Among those described above, aliphatic carboxylic acids containing from 14 to 20 carbon atoms are preferred. Above all, saturated aliphatic carboxylic acids are preferred. Stearic acid and palmitic acid are particularly preferred.

Since aliphatic carboxylic acids such as stearic acid and palmitic acid are usually produced from natural fats and oils, such as animal fats and oils typified by beef tallow and lard as well as vegetable fats and oils typified by palm oil and sunflower oil, these aliphatic carboxylic acids are usually mixtures containing other carboxylic acid components having different numbers of carbon atoms. Therefore, aliphatic carboxylic acids in the form of a mixture containing other carboxylic acid components, which are produced from such natural fats and oils, particularly, stearic acid and palmitic acid, are preferably used also in the production of the fatty acid ester according to the present invention.

The fatty acid ester according to the present invention may be either a partial ester or a full ester. However, a full ester is more preferred, since a partial ester usually has a high hydroxyl value and is more likely to cause the decomposition of a resin at a high temperature, and the like. The fatty acid ester according to the present invention preferably has an acid value of 20 or less, more preferably within the range of from 4 to 20, and still more preferably from 4 to 12, from the viewpoint of improving the thermal stability. The acid value can be substantially 0. The fatty acid ester more preferably has a hydroxyl value within the range of from 0.1 to 30. Further, the fatty acid ester preferably has an iodine value of 10 or less. The iodine value can be substantially 0. These properties can be determined in accordance with the methods defined in JIS K 0070.

The content of the mold release agent is preferably from 0.005 to 2 parts by weight, more preferably from 0.01 to 1 part by weight, and still more preferably from 0.05 to 0.5 parts by weight, with respect to 100 parts by weight of the component A. When the content of the mold release agent is within the above described range, the resin composition has a good mold releasability and roll releasability. In particular, such an amount of the fatty acid ester provides a resin composition having a good mold releasability and roll releasability, without impairing a food color.

(e4) Other Thermal Stabilizers

The resin composition according to the present invention can also contain another thermal stabilizer other than the above described phosphorus-based stabilizer and hindered phenolic antioxidant. The other thermal stabilizer is preferably used in combination with either the phosphorus-based stabilizer or the hindered phenolic antioxidant, and particularly preferably used in combination with both of these. A preferred example of the other thermal stabilizer is a lactone-based stabilizer (details of the stabilizer are described in Japanese Unexamined Patent Publication (Kokai) No. H7-233160) typified by a reaction product of 3-hydroxy-5,7-di-tert-butyl-furan-2-one with o-xylene. This compound is commercially available as Irganox HP-136 (trademark, manufactured by CIBA SPECIALTY CHEMICALS), and can be used. Further, stabilizers prepared by mixing the above compound with any of various kinds of phosphite compounds and hindered phenol compounds are commercially available. Preferred examples thereof include Irganox HP-2921 manufactured by CIBA SPECIALTY CHEMICALS. Such a pre-mixed stabilizer can also be used in the present invention. The blending amount of the lactone-based stabilizer is preferably from 0.0005 to 0.05 parts by weight, and more preferably from 0.001 to 0.03 parts by weight, with respect to 100 parts by weight of the component A.

Examples of other stabilizers include sulfur-containing stabilizers, such as pentaerythritol tetrakis(3-mercaptopropionate), pentaerythritol tetrakis(3-laurylthiopropionate), and glycerol-3-stearylthiopropionate. Such a stabilizer is particularly effective when the resin composition is used in rotational molding. The blending amount of the sulfur-containing stabilizer is preferably from 0.001 to 0.1 part by weight, and more preferably from 0.01 to 0.08 parts by weight, with respect to 100 parts by weight of the component A.

(e5) Dyes and Pigments

The resin composition according to the present invention can further contain any of various types of dyes and pigments to provide molded articles having a variety of designs. Examples of the dyes and pigments to be used in the present invention include perylene-based dyes, coumarin-based dyes, thioindigo-based dyes, anthraquinone-based dyes, thioxanthone-based dyes, ferrocyanides such as Prussian Blue, perinone-based dyes, quinoline-based dyes, quinacridone-based dyes, dioxazine-based dyes, isoindolinone-based dyes, and phthalocyanine-based dyes. Further, the resin composition according to the present invention can also contain a metallic pigment so as to obtain a better metallic color. An aluminum powder is preferably used as the metallic pigment. The resin composition can also contain a fluorescent whitening agent, or a fluorescent dye having a luminescent property other than that, so as to provide a further improved design effect taking advantage of the luminescent color obtained therefrom.

(e6) Fluorescent Whitening Agent

In the resin composition according to the present invention, the fluorescent whitening agent is not particularly limited, as long as the agent is used for improving the color of the resin or the like, by adjusting to white or bluish white. Examples of the fluorescent whitening agent include stilbene-based compounds, benzimidazole-based compounds, benzoxazole-based compounds, naphthalimide-based compounds, rhodamine-based compounds, coumarin-based compounds and oxazine-based compounds. Specific examples thereof include Cl Fluorescent Brightener 219:1; EASTOBRITE OB-1, manufactured by Eastman Chemical Company; and "HAKKOL PSR" manufactured by Showa Kagaku Co., Ltd. The "fluorescent whitening agent" as used herein refers to one having a function of absorbing the energy of the ultraviolet portion of a light ray, and emitting the energy to the visible portion. The content of the fluorescent whitening agent is preferably from 0.001 to 0.1 parts by weight, and more preferably from 0.001 to 0.05 parts by weight, with respect to 100 parts by weight of the resin component A content thereof exceeding 0.1 parts by weight provides only a small effect of improving the color of the resin composition.

(e7) Compound Having Heat Ray Absorbability

The resin composition according to the present invention can contain a compound having a heat ray absorbability. Suitable examples of such a compound include: phthalocyanine-based near-infrared absorbers; various metal compounds having an excellent near-infrared absorbability, for example, metal oxide-based near-infrared absorbers such as ATO, ITO, iridium oxide, ruthenium oxide, immonium oxide and titanium oxide, as well as metal boride-based and tungsten oxide-based near-infrared absorbers such as lanthanum boride, cerium boride and tungsten boride; and carbon fillers. The phthalocyanine-based near-infrared absorber is commercially available, for example, as MIR-362, manufactured by Mitsui Chemicals, Inc., which is easily available. Examples of the carbon filler include carbon black, graphite (including both natural and synthetic graphite) and fullerene. Among these, carbon black and graphite are preferred. These can be used singly, or in combination of two or more kinds thereof. The content of the phthalocyanine-based near-infrared absorber is preferably from 0.0005 to 0.2 parts by weight, more preferably from 0.0008 to 0.1 part by weight, and still more preferably from 0.001 to 0.07 parts by weight, with respect to 100 parts by weight of the resin component. The content of the metal oxide-based near-infrared absorber, metal boride-based near-infrared absorber or the carbon filler in the resin composition according to the present invention is preferably within the range of from 0.1 to 200 ppm (based on weight), and more preferably within the range of from 0.5 to 100 ppm.

(e8) Light Diffusing Agent

The resin composition according to the present invention can contain a light diffusing agent so as to provide a light diffusing effect. Examples of the light diffusing agent include: fine polymer particles; inorganic fine particles having a low refractive index, such as fine particles of calcium carbonate and composites thereof. The fine polymer particles are fine particles already known as a light diffusing agent for polycarbonate resins. More preferred examples of the light diffusing agent include acrylic cross-linked particles and silicone cross-linked particles typified by polyorganosilsesquioxane, having a particle size of several micrometers. The light diffusing agent may have, for example, a spherical, disk-like or column-like shape, or an amorphous shape. The spherical shape need not be a complete sphere, and the definition of the spherical shape includes a deformed spherical shape. The definition of the column-like shape includes the shape of a cube. The light diffusing agent preferably has a spherical shape, and a more uniform particle size is more preferred. The content of the light diffusing agent is preferably from 0.005 to 20 parts by weight, more preferably from 0.01 to 10 parts by weight, and still more preferably from 0.01 to 3 parts by weight, with respect to 100 parts by weight of the resin component. The light diffusing agent can be used in combination of two or more kinds thereof.

(e9) White Pigment for High Light Reflection

The resin composition according to the present invention can contain a white pigment for high light reflection, so as to provide a light reflection effect. The white pigment is particularly preferably titanium dioxide (in particular, titanium dioxide treated with an organic surface treatment agent, such as silicone) pigment. The content of the white pigment for high light reflection is preferably from 3 to 30 parts by weight, and more preferably from 8 to 25 parts by weight, with respect to 100 parts by weight of the resin component. The white pigment for high light reflection can be used in combination of two or more kinds thereof.

(e10) Antistatic Agent

The resin composition according to the present invention may sometimes be needed to have antistatic ability, and in such a case, the resin composition preferably contains an antistatic agent. Examples of the antistatic agent include (1) organic sulfonic acid phosphonium salts such as arylsulfonic acid phosphonium salts typified by dodecylbenzenesulfonic acid phosphonium salt, and alkylsulfonic acid phosphonium salts; and boric acid phosphonium salts such as tetrafluoroboric acid phosphonium salt. The content of the phosphonium salt is suitably 5 parts by weight or less, preferably within the range of from 0.05 to 5 parts by weight, more preferably from 1 to 3.5 parts by weight, and still more preferably from 1.5 to 3 parts by weight, with respect to 100 parts by weight of the resin component. Examples of the antistatic agent further include (2) organic sulfonic acid alkali (earth) metal salts such as organic lithium sulfonates, organic sodium sulfonates, organic potassium sulfonates, organic cesium sulfonates, organic rubidium sulfonates, organic calcium sulfonates, organic magnesium sulfonates, and organic barium sulfonates. As described above, such a metal salt is also used as a flame retardant. More specific examples of the metal salt include metal salts of dodecylbenzenesulfonic acid and metal salts of perfluoroalkanesulfonic acid. The content of the organic sulfonic acid alkali (earth) metal salt is suitably 0.5 parts by weight or less, preferably from 0.001 to 0.3 parts by weight, and more preferably from 0.005 to 0.2 parts by weight, with respect to 100 parts by weight of the resin component. In particular, salts of alkali metals such as potassium, cesium and rubidium are preferred.

Examples of the antistatic agent further include (3) organic sulfonic acid ammonium salts such as alkylsulfonic acid ammonium salts and arylsulfonic acid ammonium salts. The content of the ammonium salt is suitably 0.05 parts by weight or less with respect to 100 parts by weight of the resin component. The examples of the antistatic agent further include (4) polymers containing a poly(oxyalkylene)glycol component such as a polyether ester amide, as a constituent component thereof. The content of the polymer is suitably 5 parts by weight or less, with respect to 100 parts by weight of the resin component.

(e11) Filler

The resin composition according to the present invention can contain any of various types of fillers known as reinforcing fillers. Various types of fibrous fillers, plate-like fillers and granular fillers can be used as the filler. The "fibrous filler" as used herein refers to a filler in the form of fibers (the definition of the fibrous filler includes one having any of a rod-like shape, a needle-like shape, and a shape having axes extending in a plurality of directions). The "plate-like filler" refers to a filler having a plate-like shape (the definition of the plate-like filler includes one having irregularities on the surface thereof, and one having a plate-like shape with a curve). The "granular filler" refers to a filler other than those described above, including one having an amorphous shape. In many cases, the shape of the fibrous filler or the plate-like filler is clearly identified by observing the filler. For example, one having an aspect ratio of 3 or more can be distinguished from a so-called amorphous filler, as a fibrous or plate-like filler.

Preferred examples of the plate-like filler include: glass flakes, talc, mica, kaolin, metal flakes, carbon flakes and graphite; and plate-like fillers obtained by surface treating these fillers with a dissimilar material such as a metal or a metal oxide. The plate-like filler preferably has a particle size within the range of from 0.1 to 300 µm. In the particle size range of up to about 10 µm, the particle size of the filler refers to the value of the median size (D50) of the particle size distribution, as measured by an X-ray transmission method, which is one kind of liquid phase sedimentation methods. In the particle size range of from 10 to 50 µm, the particle size of the filler refers to the value of the median size (D50) of the particle size distribution, as measured by a laser diffraction/scattering method, in the particle size range of from 50 to 300 µm, the particle size of the filler refers to the value obtained by a vibration sieving method. The above described particle size is the particle size in the resin composition. The plate-like filler may be surface-treated with any of various coupling agents, such as silane-based, titanate-based, aluminate-based and zirconate-based coupling agents. Alternatively, the plate-like filler may be sized with any of various resins such as olefin resins, styrene resins, acrylic resins, polyester resins, epoxy resins and urethane resins or with a higher fatty acid ester, or may be granulated by compression.

The fibrous filler preferably has a fiber diameter within the range of from 0.1 to 20 µm. The upper limit of the fiber diameter is more preferably 13 µm, and still more preferably 10 µm. The lower limit of the fiber diameter is preferably 1 µm. The fiber diameter as used herein refers to the number average fiber diameter. The number average fiber diameter is a value calculated from an image of the residue collected after dissolving a molded article in a solvent, or after decomposing the resin with a basic compound, or an image of the ashed residue collected after ashing in a crucible, obtained by observation using a scanning electron microscope. Examples of the fibrous filler include: fibrous inorganic fillers such as glass fibers, glass fibers having a flat cross-section, milled glass fibers, carbon fibers, milled carbon fibers, metal fibers, asbestos, rock wool, ceramic fibers, slag fibers, potassium titanate whiskers, boron whiskers, aluminum borate whiskers, calcium carbonate whiskers, titanium oxide whiskers, wollastonite, xonotlite, palygorskite (attapulgite), and sepiolite; heat-resistant fibrous organic fillers typified by heat-resistant organic fibers, such as aramid fibers, polyimide fibers and polybenzthiazole fibers; and fibrous fillers obtained by surface coating these fillers with a dissimilar material such as a metal or a metal oxide. Examples of the filler surface coated with a dissimilar material include metal-coated glass fibers, metal-coated glass flakes, titanium oxide-coated glass flakes and metal-coated carbon fibers. The method of surface coating a filler with a dissimilar material is not particularly limited, and examples thereof include various types of known plating methods (such as electrolytic plating, electroless plating and melt plating), vacuum vapor-deposition methods, ion plating methods, CVD methods (such as thermal CVD, MOCVD and plasma CVD), PVD methods, and sputtering methods. The fibrous filler as used herein refers to a fibrous filler having an aspect ratio of 3 or more, preferably 5 or more, and more preferably 10 or more. The upper limit of the aspect ratio is about 10,000, and preferably 200. The aspect ratio of the filler is a value in the resin composition. The glass fibers having a flat cross-section refer to glass fibers having an average long diameter in fiber cross section of from 10 to 50 µm, preferably from 15 to 40 µm, and more preferably from 20 to 35 µm, and having an average ratio (long diameter/short diameter) of the long diameter to the short diameter of from 1.5 to 8, preferably from 2 to 6, and more preferably from 2.5 to 5. The fibrous filler may also be surface-treated with any of various coupling agents, sized with any of various resins, or granulated by compression, in the same manner as the above described plate-like fillers. The content of such a filler is preferably 200 parts by weight or less, more preferably 100 parts by weight or less, still more preferably 50 parts by weight or less, and particularly preferably 30 parts by weight or less with respect to 100 parts by weight of the resin component.

(e12) Other Resin and/or Elastomer

The resin composition according to the present invention can also contain, instead of a part of the resin component of the component A, a small proportion of another resin and/or an elastomer, as long as the effects of the present invention can be obtained. The total blending amount of the other resin and/or the elastomer is preferably 20% by weight or less, more preferably 10% by weight or less, and still more preferably 5% by weight or less, in 100% by weight of the total amount of the component A and the other resin and/or the elastomer. Examples of the other resin include: polyester resins such as polyethylene terephthalate and polybutylene terephthalate, polyamide resins, polyimide resins, polyetherimide resins, polyurethane resins, silicone resins, polyphenylene ether resins, polyphenylene sulfide resins, polysulfone resins, polymethacrylate resins, phenol resins and epoxy resins. Examples of the elastomer include isobutylene/isoprene rubber, styrene/butadiene rubber, ethylene/propylene rubber, acrylic elastomers, polyester elastomers, polyamide elastomers, and core-shell type elastomers such as MBS (methyl methacrylate/styrene/butadiene) rubber, MB (methyl methacrylate/butadiene) rubber and MAS (methyl methacrylate/acrylonitrile/styrene) rubber.

(e13) Other Additives

The resin composition according to the present invention can contain any other additives such as a flow modifier, an antibacterial agent, a dispersant such as liquid paraffin, a photo catalyst-based anti-fouling agent and/or a photochromic agent.

<Production of Resin Composition>

To produce the resin composition according to the present invention, an arbitrary method can be used. For example, the resin composition can be produced by a method in which:

the component A, the component B and any other optional components are sufficiently mixed using a pre-mixing means such as a V-shaped blender, a Henschel mixer, a mechano-chemical apparatus or an extrusion mixer; the resulting mixture is granulated using an extrusion granulator, a briquetting machine or the like, if needed; the resultant is then melt-kneaded using a melt-kneader typified by a bent-type twin-screw extruder; and pelletized using an apparatus such as a pelletizer.

The PC-POS copolymer in the present invention can be pelletized by melt-kneading using an extruder such as a single-screw extruder or a twin-screw extruder. In the preparation of the pellets, any of the above described flame retardants, reinforcing fillers and additives can be incorporated.

<Production of Molded Article>

A molded article of the resin composition according to the present invention can be obtained usually by injection molding of the above described pellets. The injection molding of the molded article can be carried out not only an ordinary cold runner system, but also by a hot runner system which enables runnerless molding. Further, in the injection molding, it is possible to use not only an ordinary injection molding method, but also an injection molding method such as gas-assisted injection molding, injection compression molding, ultra-high-speed injection molding, injection press molding, two-color molding, sandwich molding, in-mold coating molding, insert molding, foaming molding (including one using a supercritical fluid), rapid heating and cooling molding, insulation molding or in-mold re-melting molding, or a combination of any of these methods. Further, any of various types of surface treatments can be carried out on a molded article formed from the resin composition. Examples of the surface treatment which can be performed include various types of surface treatments such as decorative coating, hard coating, water-repellent and oil-repellent coating, hydrophilic coating, ultraviolet absorbing coating, infrared absorbing coating, electromagnetic wave absorbing coating, exothermic coating, antistatic coating, static control coating, electrically-conductive coating, and metallizing (such as plating, chemical vapor deposition (CVD), physical vapor deposition (PVD) and thermal spraying).

The PC-POS copolymer in the present invention can be formed into various types of products, usually by injection molding of the pellets produced as described above. Further, the resin melt-kneaded by an extruder can be directly formed into a sheet, a film, a profile extrusion molded article, a direct blow molded article or an injection molded article, without being formed into pellets, in advance.

In the injection molding, a molded article can be obtained not only by an ordinary molding method, but also by an injection molding method such as injection compression molding, injection press molding, gas-assisted injection molding, foaming molding (including one in which a supercritical fluid is injected), insert molding, in-mold coating molding, insulation molding, rapid heating and cooling molding, two-color molding, sandwich molding or ultra-high-speed injection molding, which method can be selected as appropriate depending on the purpose. The advantages of these various molding methods are already known. Further, the molding can be carried out either by a cold runner system or a hot runner system.

Further, the PC-POS copolymer in the present invention can be extrusion molded so as to be used in the form of various types of profile extrusion molded articles, sheets, films and the like. In the molding of a sheet or a film, an inflation method, a calender method, a casting method or the like can also be used. Further, a specific stretching can be carried out to form a beat shrunk tube. The PC-POS copolymer according to the present invention can be formed into a molded article also by rotational molding, blow molding or the like.

Further, in the present invention, various types of surface treatments can be carried out on a molded article composed of the PC-POS copolymer. The surface treatment as used herein refers to a treatment to form a new layer on a surface layer of a resin molded article, such as vapor-deposition (physical vapor deposition, chemical vapor deposition or the like), plating (electric plating, electroless plating, melt plating or the like), painting, coating or printing, and a method used for an ordinary polycarbonate resin can be used. Specific examples of the surface treatment include various types of surface treatments such as hard coating, water-repellent and oil-repellent coating, ultraviolet absorbing coating, infrared absorbing coating and metallizing (such as vapor-deposition).

<<Characteristic Values of PC-POS Copolymer or Resin Composition Thereof>>

<Impact Strength at Very Low Temperature>

In the copolymer or the resin composition thereof according to the present invention, the measured value of the notched Charpy impact strength of a test piece cooled to $-30°$ C., as measured in accordance with ISO 179, is preferably 30 kJ/m$^2$ or more, 40 kJ/m$^2$ or more, 50 kJ/m$^2$ or more, or 60 kJ/m$^2$ or more.

Further, the measured value of the notched Charpy impact strength of a test piece cooled to $-50°$ C. is preferably 40 kJ/m$^2$ or more, and more preferably 50 kJ/m$^2$ or more. The measured value of the notched Charpy impact strength of a test piece cooled to $-60°$ C. is preferably 30 kJ/m$^2$ or more, and more preferably 35 kJ/m$^2$ or more. The measured value of the notched Charpy impact strength of a test piece cooled to $-75°$ C. is preferably 22 kJ/m$^2$ or more, and more preferably 30 kJ/m$^2$.

When the measured value of the notched Charpy impact strength at each temperature is less than each suitable range, it is difficult to use the copolymer or the resin composition thereof in outdoor structural members and various casing members for use in very cold regions, and automobile-related parts.

<Impact Strength after Coating>

In the copolymer or the resin composition thereof according to the present invention, the measured value of the notched Charpy impact strength of a test piece cooled to $-30°$ C., as measured in accordance with ISO 179 after coating the test piece in a predetermined manner, is preferably 40 kJ/m$^2$ or more, and more preferably 45 kJ/m$^2$ or more. Further, the measured value of the notched Charpy impact strength of a test piece cooled to $-50°$ C., as measured in accordance with ISO 179 after coating the test piece in a predetermined manner, is preferably 10 kJ/m$^2$ or more, more preferably 20 kJ/m$^2$ or more, and still more preferably 30 kJ/m$^2$ or more.

When the measured value of the notched Charpy impact strength at each temperature is less than the above described range, it is difficult to use the copolymer or the resin composition thereof in outdoor structural members and various easing, members for use in very cold regions, and automobile-related parts.

<Transparency and Appearance>

The copolymer or the resin composition thereof according to the present invention has a total light transmittance of preferably 80% or less, and mare preferably 55% or less, when the total light transmittance and the haze of the copolymer or the resin composition are determined by measuring a 2.0 mm-thick portion of a three-step plate formed therefrom, in accordance with ASTM D1003 and using Haze Meter NDH 2000 manufactured by Nippon Denshoka Industries Co., Ltd. Further, the appearance of the thus formed three-step plate is characterized in that the defects such as a streak-like appearance defect, a marble-like appearance defect, an appearance defect due to yellowing or blackening, surface delamination as well as unevenness in color and light transmittance are not markedly observed. Preferably, the above described appearance defects are observed only slightly, or the defect rate is less than 50%, in the three-step plate, and more preferably, no particularly noticeable appearance defect is observed. When the transparency and the appearance are equal to or higher than the above described ranges, in particular, the defect rate of appearance is increased to cause in a decrease in the productivity or to make the resulting product unusable as an exterior material.

<Chemical Resistance>

Figure 3:
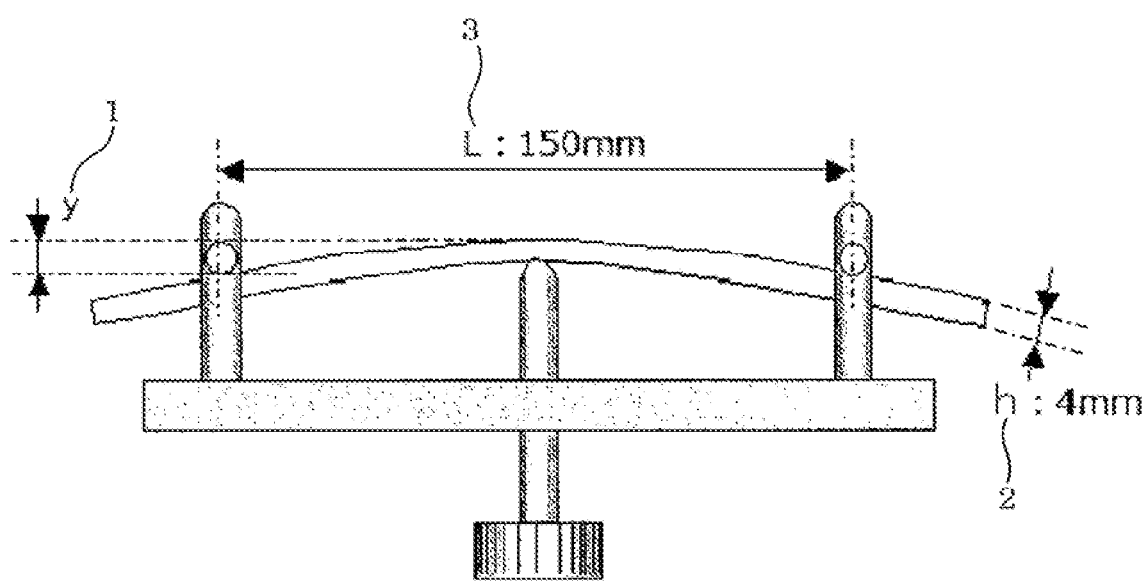
FIG. 3 is a diagram of a 3-point bending jig for evaluation of chemical resistance.

In the copolymer or the resin composition thereof according to the present invention, it is preferred that only a slight crack of about from 1 to 3 mm be observed on a test piece, and more preferably, no change in the visual appearance be observed thereon, in the following chemical resistance test. An ISO dumbbell tensile test piece having a width of 10 mm, a length of 80 mm, a total length of 150 mm and a thickness of 4 mm was obtained by injection molding, using the resin composition containing the polycarbonate-polydiorganosiloxane copolymer according to the present invention. The resulting molded piece was heat-treated at 120° C. for 90 minutes, and then fixed to a 3-point bending jig illustrated as FIG. 3, and a strain of 0.4% was applied to the center of the molded piece. The strain-applied portion of the molded piece was covered with a piece of bleached cloth, 0.5 mL of a stock solution of an alkaline detergent. Non-phosphorus Forward (manufactured by CxS Corporation) was applied thereon, and the molded piece was then kept in a thermostatic chamber maintained at 40° C. for 24 hours. Thereafter, the molded piece was taken out of the chamber, and the appearance of the portion thereof exposed to the chemical solution was evaluated.

When the chemical resistance does not satisfy the above described range, in particular, it is difficult to use the resin composition in an application in which the exposure to an alkali or a detergent, or washing is expected.

<Shear Viscosity>

The copolymer or the resin composition thereof according to the present invention has a shear viscosity at a shear rate of $1.22 \times 10^3$ sec$^{-1}$ of from 50 to 400 Pas, more preferably from 150 to 350 Pas, and particularly preferably from 200 to 300 Pas. The shear viscosity is measured in accordance with ISO 11443 (JIS K 7199), using a capillary-type rheometer (Capillograph 1D, manufactured by Toyo Seiki Co., Ltd), and using a type EF capillary (diameter: 1.0 mm, length: 10.01 mm, L/D: 10) manufactured by Toyo Seiki Co., Ltd. as the capillary, at a furnace temperature of 300° C. When the shear viscosity is equal to or higher than the lower limit of the above described preferred range, a mechanical strength practically sufficient in many fields can be obtained; and when the shear viscosity is equal to or lower than the upper limit of the range, a resin flowability sufficient in the injection molding can be ensured. Thus, the copolymer or the composition having such a shear viscosity can be adapted to a wide range of product design specifications.

<Applications>

The copolymer or the resin composition thereof according to the present invention has a good low-temperature impact resistance and thin-wall flame retardancy, and thus is suitably used as a material for outdoor structural members and various casing members for use in very cold regions, and for automobile-related parts. The copolymer or the resin composition thereof is useful in a variety of applications, such as various electric and electronic equipment parts, camera parts, parts for office and automation equipment, precision machine parts, machine parts and vehicle parts, as well as agricultural materials, transport containers, play equipment and miscellaneous goods, and provides exceptional industrial effects.

EXAMPLES

The present invention will now be described in further detail with reference to Examples. It is noted, however, that the present invention is in no way limited by the following Examples. In Examples, the term "part(s)" represents "part(s) by weight" and "%" represents "% by weight", unless otherwise specified. The evaluation was carried out in accordance with the following methods.

<<Evaluation Methods>>

(1) Viscosity Average Molecular Weight (Mv)

The specific viscosity ($\eta$SP) was determined in accordance with the following equation, from a solution prepared by dissolving 0.7 g of polycarbonate resin pellets in 100 ml of methylene chloride at 20° C., using an Ostwald viscometer.

Specific viscosity=$(\eta SP)=(t-t_0)/t_0$

[wherein $t_0$ represents the number of seconds taken for methylene chloride to fall; and t represents the number of seconds taken for the sample solution to fall]

Subsequently, the viscosity average molecular weight Mv was calculated from the thus determined specific viscosity ($\eta$SP), in accordance with the following equation.

$\eta SP/c=[\eta]+0.45\times[\eta]^2 c$ (wherein $[\eta]$ represents the intrinsic viscosity)

$[\eta]=1.23\times10^{-4} Mv^{0.83}$ $c=0.7$ (2) Content of Polydiorganosiloxane Component and Average Number of Repetitions (p+q) of Polydiorganosiloxane Using an NMR apparatus, JNM-AL400, manufactured by JEOL Ltd., the $^1$H-NMR spectrum of the PC-POS copolymer was measured, and the content of the polydiorganosiloxane component was calculated by comparing the integral ratio of a peak derived from the dihydric phenol (I) and the integral ratio of a peak derived from the hydroxyaryl-terminated polydiorganosiloxane (II). In the same manner, the average chain length p+q was calculated by comparing the integral ratio of a peak derived from the hydroxyaryl terminals and the integral ratio of a peak derived from polydiorganosiloxane.

(3) Total Light Transmittance and Haze

The pellets were dried by hot blast at 120° C. for 5 hours, and then molded using an injection molding machine (JSW J-75EIII, manufactured by The Japan Steel Works, Ltd.) at a molding temperature of 290° C., a mold temperature of 80° C. and a molding cycle of 50 seconds, to form a three-step plate having a width of 50 mm, a length of 90 mm, thicknesses of 3.0 mm (at a length of 20 mm), 2.0 mm (at a length of 45 mm) and 1.0 mm (at a length of 25 mm) in the order from the gate side, and an arithmetic average roughness (Ra) of 0.03 μm.

The total light transmittance and the haze of a 2.0 mm-thick portion of the resulting three-step plate were measured in accordance with ASTM D 1003, using Haze Meter NDH 2000, manufactured by Nippon Denshoku Industries Co., Ltd.

(4) Visual Appearance of Molded Piece

The appearance of the three-step plate obtained in the above section (3) was evaluated by visual observation. Examples of abnormal appearances include a streak-like appearance defect, a marble-like appearance defect, an appearance defect due to yellowing or blackening, surface delamination, and unevenness in color and light transmittance. The evaluation of the visual appearance was carried out based on the presence or absence and the degree of the respective appearance defects.

A: No particularly noticeable appearance defect is observed.

B: The above described appearance defects are observed, but only slightly or at a defect rate of less than 50%.

F: The above described appearance defects are markedly observed, and it is at a level difficult to be used.

(5) Evaluation of Low Temperature Impact Resistance (Notched Charpy Impact Strength)

The pellets were dried with hot blast at 120° C. for 5 hours, and then molded using an injection molding machine (JSW J-75EIII, manufactured by The Japan Steel Works, Ltd.) at a molding temperature of 290° C., a mold temperature of 80° C. and a molding cycle of 40 seconds, to form a molded piece having a width of 10 mm, a length of 80 mm, and a thickness 4.0 mm. The notched Charpy impact strength of the thus prepared a 4 mm-thick test piece, which had been cooled to −30° C., −50° C., −60° C., or −75° C. was measured in accordance with ISO 179.

(6) Evaluation of Impact Resistance After Coating (Notched Charpy Impact Strength)

A notch was provided to the molded piece obtained in the above section (5) in accordance with ISO 179, and the notched face was spray-coated with Aspen Lacquer Spray (clear) (manufactured by Asahipen Corporation). In order to achieve an even coating, the spraying was carried out for one second in such a state that the molded piece and the injection nozzle of the spray were spaced apart by 20 cm, the molded piece was left to stand for one minute, and this procedure was repeated for the total of three times to apply coatings in layers. The molded piece after coating was dried at room temperature for 24 hours. The resulting test piece was cooled to −30° C. or −50° C., and the notched Charpy impact strength thereof was measured in accordance with ISO 179.

(7) Shear Viscosity

The shear viscosity at a shear rate of $1.22 \times 10^3$ sec$^{-1}$ was measured in accordance with ISO 11443 (JIS K 7199), using a capillary-type rheometer (Capillograph 1D, manufactured by Toyo Seiki Co., Ltd), and using a type EF capillary (diameter: 1.0 mm, length: 10.01 mm, L/D: 10) manufactured by Toyo Seiki Co, Ltd. as the capillary, at a furnace temperature of 300° C. The obtained pellets which had been dried with hot blast at 120° C. for five hours were used as a sample.

(8) Average Size and Particle Size Distribution of Polydiorganosiloxane Domains

Using a microtome (EM UC6, manufactured by Leica Microsystems Inc.), the portion of the molded piece obtained in the above section (5) was cut at the intersection 15 mm from the gate and 5 mm from a side edge, and at a depth of 2 mm, in the direction vertical to the direction of flow of the resin, to prepare an ultra-thin section. The thus prepared section was allowed to adhere to a grid (EM FINE GRID No. 2632 F-200-CU 100 PC/CA, manufactured by JEOL Ltd.), and observed using TEM JEM-2100, manufactured by JEOL Ltd., at an acceleration voltage of 200 kV. The observation was carried out at a magnification of 20,000-fold.

The particle analysis of the thus obtained microscope image was carried out using image processing software, Win ROOF Ver., 6.6 (manufactured by Mitani Corporation), and the average size and the particle size distribution (frequency distribution) of the polydiorganosiloxane domains in the sample section were obtained. In the measurement, the maximum long diameter (the length of each particle between arbitrarily selected two points on the outer contour of the particle, when the two points were selected so as to maximise the length therebetween) was used as the size of each domain. The same analysis was carried out for five pieces of sample sections, and the average value thereof was taken as the value of each sample.

(9) Evaluation of Chemical Resistance (3-Point Bending Flexural Test)

The obtained pellets were dried with hot blast at 120° C. for 5 hours, and then molded using an injection molding machine (JSW J-75EIII, manufactured by The Japan Steel Works, Ltd.) at a molding temperature of 290° C., a mold temperature of 80° C. and a molding cycle of 50 seconds, to form an ISO dumbbell tensile test piece (Type A) having a width of the central portion of 10 mm and a length thereof of 80 mm, a total length of 150 and a thickness of 4.0 mm. The resulting molded piece was heat-treated at 120° C. for 90 minutes, and then fixed to a 3-point bending jig illustrated as FIG. 3, and a strain of 0.4% was applied to the center of the molded piece. The strain-applied portion of the molded piece was covered with a piece of bleached cloth, 0.5 mL of a stock solution of an alkaline detergent. Non-phosphorus Forward (manufactured by CxS Corporation) was applied thereon, and the molded piece was then kept in a thermostatic chamber maintained at 40° C. for 24 hours. Thereafter, the molded piece was taken out of the chamber, and the appearance of the portion thereof exposed to the chemical solution was evaluated.

A: No change in the visual appearance is observed.

B: Only a slight crack (having a length of 1 mm or more and less than 3 mm) is observed.

C: A crack(s) (having a length of 3 mm or more and less than 7 mm) is/are observed.

F: A plurality of large cracks (having a length of 7 mm or more), or cracks leading to fracture, are observed.

(10) Flame Retardancy

The pellets were dried with hot blast at 120° C. for 5 hours, and then molded using an injection molding machine at a molding temperature of 300° C., a mold temperature of 80° C. and a molding cycle of 40 seconds, to prepare an UL test piece (width: 13 mm×length: 125 mm×thickness: 1.0 or 1.5 mm). Using the resulting UL test piece, the V test was carried out in accordance with UL94.

<<Raw Materials>>

[Polydiorganosiloxane Modified with Phenol at Both Terminals]

In Examples and Comparative Examples, polydiorganosiloxane compounds having the following structures were used as the dihydric phenol (II) having a polydiorganosiloxane structure.

(II)-1: p+q=35 (KF-2201, manufactured by Shin-Etsu Chemical Co., Ltd.);

(II)-2: p+q=65 (X-22-1822, manufactured by Shin-Etsu Chemical Co., Ltd.);
(II)-3: p+q=87 (KF-2102, manufactured by Shin-Etsu Chemical Co., Ltd.);
(II)-4: A 2-allylphenol terminal-modified polydimethylsiloxane in which p+q=200, which had been synthesized in accordance with the method of producing a 2-allylphenol terminal-modified polydiorganosiloxane disclosed in Japanese Patent No. 2662310; and
(II)-5: A 2-allylphenol terminal-modified polydimethylsiloxane in which p+q=800, which had been synthesized in accordance with the method of producing a 2-allylphenol terminal-modified polydiorganosiloxane disclosed in Japanese Patent No. 2662310.

In the above described compounds, the value of the average number of repetitions of the dimethylsiloxane units, p+q, was evaluated by $^1$H-NMR measurement.

Experiment A: Evaluation of PC-POS Copolymers

Production Examples

[Production of PC-POS Copolymers]
(Method of Producing PC-POS-1)

Into reactor equipped with a thermometer, a stirrer and a reflux condenser, 17,590 parts of ion exchanged water and 6,883 parts of a 25% aqueous solution of sodium hydroxide were introduced, and 3,748 parts (16.41 moles) of 2,2-bis(4-hydroxyphenyl)propane (bisphenol A) as the dihydric phenol (1) represented by the general formula [4], and 7.5 parts of hydrosulfide were dissolved. Thereafter, 11,246 parts (8 molar equivalents with respect to the total amount of the dihydric phenols) of methylene chloride was added, and 1,900 parts of phosgene was blown into the reactor over 70 minutes, while stirring at a temperature of from 16 to 24° C. Subsequently, 1,324 parts of a 25% aqueous solution of sodium hydroxide, and a solution prepared by dissolving 149 parts of p-tert-butylphenol in 1,342 parts (0.96 molar equivalents with respect to the total amount of the dihydric phenols) of methylene chloride were added. While stirring the resulting mixture, a solution prepared by dissolving 198 parts (0.064 moles) of the KF-2201 as the dihydric phenol (II) represented by the general formula [5] in 100 parts (0.07 molar equivalents with respect to the total amount of the dihydric phenols) of methylene chloride was added. Thereafter, a solution prepared by dissolving 463 parts (0.064 moles) of the KF-2102 in 230 parts (0.16 molar equivalents with respect to the total amount of the dihydric phenols) of methylene chloride was added to form an emulsified state, and the resulting mixture was vigorously stirring again. While stirring as described above, 4.2 parts of triethylamine was added in a state where the reaction liquid was at a temperature of 26° C., and 15 minutes later, 2,795 parts (2 molar equivalents with respect to the total amount of the dihydric phenols) of methylene chloride was added. The stirring was kept at a temperature of from 26 to 31° C. for one hour, after the addition of triethylamine, and the reaction was terminated. After the completion of the reaction, the organic phase was separated, diluted with methylene chloride and washed with water, and then acidified with hydrochloric acid and washed with water. When the conductivity of the aqueous phase reached almost the same level as that of ion exchanged water, the resultant was fed into a kneader filled with warm water, and methylene chloride was allowed to evaporate, while stirring, to obtain a powder of a PC-POS copolymer. After dehydration, the resulting powder was dried in a hot air circulation type drying furnace at 120° C. for 12 hours. The thus obtained PC-POS copolymer had a viscosity average molecular weight of 16,100, and a content of the polydiorganosiloxane component (POS content) of 12.5 wt %.

(Method of Producing PC-POS-2)
The same procedure as in the production method of PC-POS-1 was repeated, except that 13,354 parts (9.5 molar equivalents with respect to the total amount of the dihydric phenols) of methylene chloride was added, and that the addition of methylene chloride 15 minutes after the addition of 4.2 pans of triethylamine was omitted. The thus obtained PC-POS copolymer had a viscosity average molecular weight of 15,900, and a content of the polydiorganosiloxane component of 12.5 wt %.

(Method of Producing PC-POS-3)
The same procedure as in the production method of PC-POS-1 was repeated, except that a solution prepared by dissolving 661 parts (0.128 moles) of the X-22-1822 as the dihydric phenol (II) represented by the general formula [5] in 356 parts (0.25 molar equivalents with respect to the total amount of the dihydric phenols) of methylene chloride was added. The thus obtained PC-POS copolymer had a viscosity average molecular weight of 16,000, and a content of the polydiorganosiloxane component of 12.5 wt %.

(Method of Producing PC-POS-4)
The same procedure as in the production method of PC-POS-1 was repeated, except that a solution prepared by dissolving 66 parts (0.021 moles) of the KF-2201 as the dihydric phenol (II) represented by the general formula [5] in 33 parts (0.02 molar equivalents with respect to the total amount of the dihydric phenols) of methylene chloride was added, and then a solution prepared by dissolving 154 parts (0.021 moles) of the KF-2102 in 77 parts (0.06 molar equivalents with respect to the total amount of the dihydric phenols) of methylene chloride was added, and that a solution prepared by dissolving 99 parts of p-tert-butylphenol in 891 parts (0.64 molar equivalents with respect to the total amount of the dihydric phenols) of methylene chloride was added. The thus obtained PC-POS copolymer had a viscosity average molecular weight of 20,000, and a content of the polydiorganosiloxane component of 4.4 wt %.

(Method of Producing PC-POS-5)
The same procedure as in the production method of PC-POS-1 was repeated, except that a solution prepared by dissolving 661 parts (0.091 moles) of the KF-2102 as the dihydric phenol (II) represented by the general formula [5] in 356 parts (0.25 molar equivalents with respect to the total amount of the dihydric phenols) of methylene chloride was added. The thus obtained PC-POS copolymer had a viscosity average molecular weight of 16,000, and a content of the polydiorganosiloxane component of 12.6 wt %.

(Method of Producing PC-POS-6)
The same procedure as in the production method of PC-POS-4 was repeated, except that a solution prepared by dissolving 220 parts (0.030 moles) of the KF-2102 the dihydric phenol (II) represented by the general formula [5] in 119 parts (0.09 molar equivalents with respect to the total amount of the dihydric phenols) of methylene chloride was added. The thus obtained PC-POS copolymer had a viscosity average molecular weight of 19,500, and a content of the polydiorganosiloxane component of 4.5 wt %.

(Method of Producing PC-POS-7)
The same procedure as in the production method of PC-POS-2 was repeated, except that a solution prepared by dissolving 397 parts (0.128 moles) of the KF-2201 as the dihydric phenol (II) represented by the general formula [5] in 214 parts (0.15 molar equivalents with respect to the total amount of the dihydric phenols) of methylene chloride was added, and then a solution prepared by dissolving 264 pans (0.037 moles) of the KF-2102 in 142 parts (0.10 molar equivalents with respect to the total amount of the dihydric phenols) of methylene chloride was added. The thus obtained PC-POS copolymer had a viscosity average molecular weight of 16,000, and a content of the polydiorganosiloxane component of 12.5 wt %.

(Method of Producing PC-POS-8)

The same procedure as in the production method of PC-POS-2 was repeated, except that a solution prepared by dissolving 529 parts (0.171 moles) of the KF-2201 as the dihydric phenol (II) represented by the general formula [5] in 285 parts (0.20 molar equivalents with respect to the total amount of the dihydric phenols) of methylene chloride was added, and then a solution prepared by dissolving 132 parts (0.018 moles) of the KF-2102 in 71 parts (0.05 molar equivalents with respect to the total amount of the dihydric phenols) of methylene chloride was added. The thus obtained PC-POS copolymer had a viscosity average molecular weight of 16,000, and a content of the polydiorganosiloxane component of 12.4 wt %.

(Method of Producing PC-POS-9)

The same procedure as in the production method of PC-POS-2 was repeated, except that a solution prepared by dissolving 661 parts (0.213 moles) of the KF-2201 as the dihydric phenol (II) represented by the general formula [5] in 356 parts (0.25 molar equivalents with respect to the total amount of the dihydric phenols) of methylene chloride was added. The thus obtained PC-POS copolymer had a viscosity average molecular weight of 16,000, and a content of the polydiorganosiloxane component of 12.5 wt %.

(Method of Producing PC-POS-10)

The same procedure as in the production method of PC-POS-1 was repeated, except that 19,680 parts (14 molar equivalents with respect to the total amount of the dihydric phenols) of methylene chloride was added, and that the addition of methylene chloride 15 minutes after the addition of 4.2 parts of triethylamine was omitted. The thus obtained PC-POS copolymer had a viscosity average molecular weight of 15,800, and a content of the polydiorganosiloxane component of 12.5 wt %.

(Method of Producing PC-POS-11)

The same procedure as in the production method of PC-POS-9 was repeated, except that a solution prepared by dissolving 440 parts (0.142 moles) of the KF-2201 as the dihydric phenol (II) represented by the general formula [5] in 237 parts (0.17 molar equivalents with respect to the total amount of the dihydric phenols) of methylene chloride was added. The thus obtained PC-POS copolymer had a viscosity average molecular weight of 16,000, and a content of the polydiorganosiloxane component of 8.4 wt %.

(Method of Producing PC-POS-12)

The same procedure as in the production method of PC-POS-6 was repeated, except that: 220 parts (0.015 moles) of the above described dihydric phenol in which the number of repetitions of the siloxane units, p+q, is 200 was used as the dihydric phenol (II) represented by the general formula [5]; 19,546 parts (14 molar equivalents with respect to the total amount of the dihydric phenols) of methylene chloride was added; and the addition of methylene chloride 15 minutes after the addition of 4.2 parts of triethylamine was omitted. The thus obtained PC-POS copolymer had a viscosity average molecular weight of 20,100, and a content of the polydiorganosiloxane component of 4.6 wt %.

(Method of Producing PC-POS-13)

The same procedure as in the production method of PC-POS-1 was repeated, except that a solution prepared by dissolving 661 parts (0.011 moles) of the above described dihydric phenol in which the number of repetitions of the siloxane units, p+q, is 800, as the dihydric phenol (II) represented by the general formula [5], in 356 parts (0.26 molar equivalents with respect to the total amount of the dihydric phenols) of methylene chloride was added. The thus obtained PC-POS copolymer had a viscosity average molecular weight of 15,700, and a content of the polydiorganosiloxane component of 12.8 wt %.

(Method of Producing PC-POS-14)

PC-POS Copolymer Produced Based on Production Conditions Described in Example 7 of WO 2011/013846

Into reactor equipped with a thermometer, a stirrer and a reflux condenser, 21,592 parts of ion exchanged water, and 3,675 parts of a 48.5% aqueous solution of sodium hydroxide were introduced, and 3,880 parts (17.00 moles) of 2,2-bis(4-hydroxyphenyl)propane (bisphenol A) as the dihydric phenol (I) represented by the general formula [4], and 7.6 parts of hydrosulfide were dissolved. Thereafter, 14,565 parts (10 molar equivalents with respect to the total amount of the dihydric phenols) of methylene chloride was added, and 1,900 parts of phosgene was blown into the reactor over 60 minutes while stirring at a temperature of from 22 to 30° C. Subsequently, 7,283 parts (5 molar equivalents with respect to the total amount of the dihydric phenols) of methylene chloride, 1,131 parts of a 48.5% aqueous solution of sodium hydroxide, and a solution prepared by dissolving 108 parts of p-tert-butylphenol in 800 parts (0.55 molar equivalents with respect to the total amount of the dihydric phenols) of methylene chloride were added. While stirring the resulting mixture, a solution prepared by dissolving 205 parts (0.067 moles) of the KF-2201 as the dihydric phenol (II) represented by the general formula [5] in 800 parts (0.55 molar equivalents with respect to the total amount of the dihydric phenols) of methylene chloride was added in such a rate that the amount of the dihydric phenol (II) was 0.0004 molar equivalents/min with respect to the amount of dihydric phenol (I), to form an emulsified state, and the resulting mixture was vigorously stirring again. While stirring as described above, 4.3 parts of triethylamine was added in a state where the reaction liquid was at a temperature of 26° C. The stirring was kept at a temperature of from 26 to 31° C. for one hour, and then the reaction was terminated. After the completion of the reaction, the organic phase was separated, diluted with methylene chloride and washed with water, and then acidified with hydrochloric acid and washed with water. When the conductivity of the aqueous phase reached almost the same level as that of ion exchanged water, the resultant was fed into a kneader filled with warm water, and methylene chloride was allowed to evaporate, while stirring, to obtain a powder of a PC-POS copolymer. After dehydration, the resulting powder was dried in a hot air circulation type drying furnace at 120° C. for 12 hours. The thus obtained PC-POS copolymer had a viscosity average molecular weight of 19,400, and a content of the polydiorganosiloxane component of 4.2 wt %.

(PC-POS-15)

The physical properties of a commercially available siloxane-containing polycarbonate (LEXAN 1414, siloxane content: 3.5% by weight, manufactured by SABIC Innovative Plastics) were measured, and the results are shown in the following Tables 1 and 2.

(PC-POS-16)

The physical properties of a commercially available siloxane-containing polycarbonate (TARFLON NEO AG1950, siloxane content: 5.0% by weight, manufactured by Idemitsu Kosan Co., Ltd.) were measured, and the results are shown in the following Tables 1 and 2.

TABLE I

| | Weight ratio of POS used in PC-POS copolymer (II) | | | | | Average number of repetitions p + q | POS Content [wt %] | Amount of organic solvent per mole of the total amount of dihydric phenols (at the start of interfacial polycondensation reaction) | Viscosity average molecular weight Mv | State of domains | | |
|---|---|---|---|---|---|---|---|---|---|---|---|---|
| | (II)-1 POS1 p + q = 35 | (II)-2 POS2 p + q = 65 | (II)-3 POS2 p + q = 87 | (II)-4 POS2 p + q = 200 | (II)-5 POS2 p + q = 800 | | | | | Average domain size [nm] | Number of domains having a maximum length of 80 nm or more [Number] | Presence or absence of domains having a maximum length of 400 nm or more |
| PC-POS-1 | 30 | — | 70 | — | — | 65 | 12.5 | 9.2 | 16,100 | 59 | 16.8 | Absent |
| PC-POS-2 | 30 | — | 70 | — | — | 65 | 12.5 | 10.7 | 15,900 | 47 | 13.1 | Absent |
| PC-POS-3 | — | 100 | — | — | — | 65 | 12.5 | 9.2 | 16,000 | 49 | 13.4 | Absent |
| PC-PO5-4 | 30 | — | 70 | — | — | 65 | 4.4 | 8.8 | 20,000 | 31 | 3.6 | Absent |
| PC-POS-5 | — | — | 100 | — | — | 87 | 12.6 | 9.2 | 16,000 | 69 | 32.3 | Absent |
| PC-POS-6 | — | — | 100 | — | — | 87 | 4.5 | 8.8 | 19,500 | 52 | 8.0 | Absent |
| PC-POS-7 | 60 | — | 40 | — | — | 50 | 12.5 | 10.7 | 16,000 | 32 | 10.0 | Absent |
| PC-POS-8 | 80 | — | 20 | — | — | 40 | 12.4 | 10.7 | 16,000 | 29 | 2.9 | Absent |
| PC-POS-9 | 100 | — | — | — | — | 35 | 12.5 | 10.7 | 16,000 | 25 | 1.0 | Absent |
| PC-POS-10 | 30 | — | 70 | — | — | 65 | 12.5 | 15.2 | 15,800 | 12 | 0 | Absent |
| PC-POS-11 | 100 | — | — | — | — | 35 | 8.4 | 10.6 | 16,000 | 20 | 0 | Absent |
| PC-POS-12 | — | — | — | 100 | — | 200 | 4.6 | 14.7 | 20,100 | 33 | 0 | Absent |
| PC-POS-13 | — | — | — | — | 100 | 800 | 12.8 | 9.3 | 15,700 | 313 | 64.3 | Present |
| PC-POS-14 | 100 | — | — | — | — | 35 | 4.2 | 16.2 | 19,400 | 10 | 0 | Absent |
| PC POS-15 | — | — | — | — | — | 50 | 3.5 | — | — | 28 | 0 | Absent |
| PC PCS-16 | — | — | — | — | — | 90 | 5 | — | — | 15 | 0 | Absent |

(PC-1)

A linear aromatic polycarbonate resin powder (Panlite L-1250WP, manufactured by Teijin Limited) containing 2,2-bis(4-hydroxyphenyl)propane as a repeating skeleton, and having a solution viscosity molecular weight of 23,900.

[Production of Resin Compositions Containing PC-POS Copolymer]

Example 1

A quantity of 33% by weight of the PC-POS-1 obtained in Production Example, 67% by weight of PC-1, and tris(2,4-di-tert-butylphenyl)phosphite (Irgafos 168, manufactured by BASF Japan Ltd.) in an amount of 300 ppm with respect to 100 parts by weights of the polycarbonate resins PC-POS-1 and PC-1 were mixed. Thereafter, the resulting mixture was melt-kneaded and extracted using a vent-type twin-screw extruder (KZW15-25MG, manufactured by Technovel Corporation), at a discharge amount of 2.5 kg/h, a screw rotation speed of 200 rpm, and an extrusion temperature of the portion from the first feed port to the die portion of 270° C., to produce pellets. The thus obtained pellets were dried with hot blast at 120° C. for 5 hours, and then molded using an injection molding machine (JSW J-75EIII, manufactured by The Japan Steel Works, Ltd) at a molding temperature of 290° C., a mold temperature of 80° C. and a molding, cycle of 40 seconds, to obtain an injection-molded piece having a width of 10 mm, a length of 80 mm and a thickness of 4.0 mm. The thus obtained test piece had a siloxane content of 4.2% by weight, an average number of repetitions of the siloxane units (p+q) of 65, and a viscosity average molecular weight Mv of 21,200. Further, using the resulting test piece, the size of polydiorganosiloxane domains, the particle size distribution, the notched Charpy impact values at −30° C., −50° C., −60° C. and −75° C., the impact resistance after coating, the visual appearance the transmittance and haze, and the chemical resistance as measured by the 3-point bending test were evaluated. The evaluation results are shown in Table 2.

Examples 2 to 10 and Comparative Examples 1 to 8 and 11

The resin compositions of Examples 2 to 10 and Comparative Examples 1 to 8 were produced in the same manner as in Example 1, except for changing the type and/or the weight ratio of the PC-POS copolymers to be blended, and evaluated in the same manner as in Example 1. The results thereof are shown in Table 2.

Comparative Example 9

The PC-POS-15 was dried with hot blast at 120° C. for 5 hours, and then molded using an injection molding machine (JSW J-75EIII, manufactured by The Japan Steel Works, Ltd.) at a molding temperature of 90° C., a mold temperature of 80° C. and a molding cycle of 40 seconds, to obtain an injection-molded piece having a width of 10 mm, a length of 80 mm and a thickness of 4.0 mm. Using the thus obtained test piece, the size of polydiorganosiloxane domains, the particle size distribution, the notched Charpy impact values at −30° C., −50° C., 60° C. and −75° C. the impact resistance after coating, the visual appearance, the transmittance and haze, and the chemical resistance as measured by the 3-point bending test were evaluated. The evaluation results are shown in Table 2.

Comparative Example 10

The same procedure as in Comparative Example 9 was repeated except that the PC-POS-16 was used instead of the PC-POS-15, and the same evaluations were carried out. The results thereof are shown in Table 2.

TABLE 2

|  |  | Examples | | | | | | | | | |
| --- | --- | --- | --- | --- | --- | --- | --- | --- | --- | --- | --- |
|  |  | 1 | 2 | 3 | 4 | 5 | 6 | 7 | 8 | 9 | 10 |
| Polymer composition | PC-POS-1 | 33 | 50 | — | — | — | — | — | — | — | — |
|  | PC-POS-2 | — | — | 33 | — | — | — | — | — | — | — |
|  | PC-POS-3 | — | — | — | 33 | — | — | — | — | — | — |
|  | PC-POS-4 | — | — | — | — | 100 | — | — | — | — | — |
|  | PC-POS-5 | — | — | — | — | — | 33 | — | — | — | — |
|  | PC-POS-6 | — | — | — | — | — | — | 100 | — | — | — |
|  | PC-POS-7 | — | — | — | — | — | — | — | 33 | — | — |
|  | PC-POS-8 | — | — | — | — | — | — | — | — | 33 | — |
|  | PC-POS-9 | — | — | — | — | — | — | — | — | — | 33 |
|  | PC-1 | 67 | 50 | 67 | 67 | — | 67 | — | 67 | 67 | 67 |
| POS structure | POS content in resin composition [% by weight] | 4.2 | 6.3 | 4.2 | 4.2 | 4.2 | 4.2 | 4.2 | 4.2 | 4.2 | 4.2 |
|  | Average number of repetitions of siloxane units (p + q) | 65 | 65 | 65 | 65 | 65 | 87 | 87 | 50 | 40 | 35 |
| Domains | Average domain size | 56 | 56 | 45 | 42 | 31 | 74 | 52 | 35 | 33 | 30 |
|  | Number of domains having a maximum length of 80 nm or more | 7.0 | 11.8 | 6.3 | 4.5 | 3.6 | 18.0 | 8.0 | 2.9 | 1.9 | 1.2 |
|  | Presence or absence of domains having a maximum length of 400 nm or more | Absent | Absent | Absent | Absent | Absent | Absent | Absent | Absent | Absent | Absent |
| Physical properties | Viscosity average molecular weight Mv | 21,000 | 20,000 | 21,300 | 21,000 | 20,000 | 21,100 | 19,500 | 21,200 | 21,100 | 21,000 |
|  | Shear viscosity | 215 | 244 | 233 | 241 | 257 | 220 | 260 | 255 | 261 | 286 |
|  | Charpy impact strength −30° C. | 55 | 54 | 53 | 57 | 56 | 55 | 54 | 57 | 56 | 59 |
|  | −50° C. | 46 | 51 | 49 | 47 | 43 | 40 | 50 | 44 | 43 | 43 |
|  | −60° C. | 34 | 43 | 35 | 35 | 31 | 32 | 37 | 31 | 30 | 31 |
|  | −75° C. | 30 | 40 | 28 | 30 | 26 | 27 | 33 | 22 | 24 | 24 |
|  | Charpy impact strength after coating −30° C. | 44 | 49 | 42 | 44 | 42 | 42 | 44 | 42 | 41 | 40 |
|  | −50° C. | 30 | 40 | 27 | 23 | 15 | 21 | 30 | 14 | 11 | 10 |
|  | Total light transmittance | 24 | 25 | 25 | 26 | 41 | 23 | 25 | 46 | 55 | 77 |
|  | Haze | 94 | 95 | 94 | 95 | 65 | 95 | 94 | 75.0 | 42 | 10.0 |
|  | Appearance | B | B | B | B | B | B | B | B | B | B |
|  | Chemical resistance | A | B | A | A | A | B | A | A | A | A |

|  |  | Comparative Examples | | | | | | | | | | |
| --- | --- | --- | --- | --- | --- | --- | --- | --- | --- | --- | --- | --- |
|  |  | 1 | 2 | 3 | 4 | 5 | 6 | 7 | 8 | 9 | 10 | 11 |
| Polymer composition | PC-POS-1 | 5 | 10 | 17 | — | — | — | — | — | — | — | — |
|  | PC-POS-10 | — | — | — | 33 | — | — | — | — | — | — | — |
|  | PC-POS-11 | — | — | — | — | 50 | — | — | — | — | — | — |
|  | PC-POS-12 | — | — | — | — | — | 100 | — | — | — | — | — |
|  | PC-POS-13 | — | — | — | — | — | — | 33 | — | — | — | — |
|  | PC-POS-14 | — | — | — | — | — | — | — | 100 | — | — | — |
|  | PC-POS-15 | — | — | — | — | — | — | — | — | 100 | — | — |
|  | PC-POS-16 | — | — | — | — | — | — | — | — | — | 100 | — |
|  | PC-1 | 95 | 90 | 83 | 67 | 50 | — | 67 | — | — | — | 100 |
| POS structure | POS content in resin composition [% by weight] | 0.6 | 1.2 | 2.1 | 4.2 | 4.2 | 4.6 | 4.2 | 4.2 | 3.5 | 5.0 | 0 |
|  | Average number of repetitions of siloxane units (p + q) | 65 | 65 | 65 | 65 | 65 | 200 | 800 | 35 | 50 | 90 | — |
| Domains | Average domain size | 60 | 55 | 54 | 13 | 22 | 33 | 304 | 9 | 28 | 15 | — |
|  | Number of domains having a maximum length of 80 nm or more | 1.2 | 2.0 | 3.8 | 0.0 | 0.0 | 0.0 | 26.1 | 0.0 | 0.0 | 0.0 | — |
|  | Presence or absence of domains having a maximum length of 400 nm or more | Absent | Absent | Absent | Absent | Absent | Absent | Absent | Absent | Absent | Absent | — |
| Physical properties | Viscosity average molecular weight Mv | 23,500 | 23,100 | 22,500 | 21,300 | 20,000 | 20,100 | 20,900 | 19,400 | 21,300 | 19,500 | 23,900 |
|  | Shear viscosity | 430 | 399 | 373 | 272 | 257 | 282 | 186 | 256 | 304 | 240 | 464 |
|  | Charpy impact strength −30° C. | 22 | 29 | 45 | 55 | 60 | 57 | 48 | 20 | 54 | 55 | 16 |
|  | −50° C. | 19 | 23 | 25 | 26 | 28 | 38 | 45 | 18 | 35 | 33 | 15 |
|  | −60° C. | 16 | 17 | 22 | 19 | 22 | 28 | 28 | 16 | 24 | 24 | 12 |
|  | −75° C. | 16 | 16 | 19 | 18 | 20 | 25 | 24 | 16 | 22 | 21 | 10 |
|  | Charpy impact strength after coating −30° C. | 10 | 11 | 25 | 26 | 25 | 38 | 24 | 10 | 38 | 43 | 5 |
|  | −50° C. | 5 | 5 | 8 | 5 | 8 | 7 | 8 | 5 | 6 | 5 | 5 |
|  | total light transmittance | 73 | 68 | 29 | 87 | 78 | 28 | 18 | 89 | — | 82 | 89 |
|  | Haze | 16 | 50 | 94 | 2 | 8 | 90 | 95 | 0.7 | <65 | 5 | 0.3 |
|  | Appearance | B | B | B | A | B | F | B | B | A | A | A |
|  | Chemical resistance | C | C | B | B | B | B | C | A | B | C | F |

Experiment B: Evaluation of Resin Compositions Containing Flame Retardant (Component A: PC-POS Copolymer)

The PC-POS copolymers used in Experiment A were used as the PC-POS copolymer.

(Component: B: Flame Retardant)

B-1: potassium salt of perfluorobutanesulfonic acid (manufactured by DIC Corporation MEGAFACE F-114P (trade name))

B-2: a phosphate ester containing bisphenol A bis(diphenyl phosphate) as a main component (CR-741 (trade name) manufactured by Daihachi Chemical Industry Co., Ltd.)

B-3: a cyclic phenoxyphosphazene (SPB-100 (trade name, manufactured by Otsuka Chemical Co., Ltd.)

(Component C: Anti-Dripping Agent)

C-1: a polytetrafluoroethylene-based mixture composed of a polytetrafluoroethylene acrylic copolymer produced by an emulsion polymerization method (polytetrafluoroethylene content: 50% by weight) (METABLEN A3750 (trade name), manufactured by Mitsubishi Rayon Co., Ltd.)

(Component D: Ultraviolet Absorber)

D-1: an ultraviolet absorber (TINUVIN 234 (trade name), manufactured by BASF Japan Ltd.)

(Other Components)

SL 900: a fatty acid ester-based mold release agent (Rikemal SL900 (trade name), manufactured by Riken Vitamin Co., Ltd.)

Irg 1076: a phenolic thermal stabilizer (IRGANOX 1076 (trade name), manufactured by Ciba Specialty Chemicals K.K.)

Irg 168: a phosphorus-based thermal stabilizer (IRGANOX 1076 trade name), manufactured by Ciba Specialty Chemicals K.K.)

[Production of Resin Compositions]

Examples 11 to 20, Reference Example 1, and Comparative Examples 12 to 18

In each of Examples, Reference Example, and Comparative Examples, the components A to D and the respective additives were weighed according to the compositions shown in Table 3 and Table 4, uniformly mixed using a blender, and melt-kneaded using a vent-type twin-screw extruder to obtain pellets. Each of the additives to be used was prepared as a premix with the polycarbonate resin in a concentration of about from 10 to 100 times the blending amount of each additive, in advance, and then all the premixes were mixed using a blender. As the vent-type twin-screw extruder, KTX-30 (diameter: 30 mm) manufactured by Kobe Steel, Ltd. was used. The mixture was extruded in the form of strands under the conditions of a cylinder-temperature and die temperature of 280° C. a screw rotation speed of 150 rpm, a discharge amount of 20 kg/h and a vent suction degree of 3 kPa, cooled in a water bath, and then cut with a pelletizer to form pellets. The respective evaluation results are shown in Table 3 and Table 4.

TABLE 3

| | | Examples | | | | | | | | | |
|---|---|---|---|---|---|---|---|---|---|---|---|
| | | 11 | 12 | 13 | 14 | 15 | 16 | 17 | 18 | 19 | 20 |
| Composition of Component A | PC-POS-1 | 33 | 33 | 50 | — | — | — | — | — | — | — |
| | PC-POS-3 | — | — | — | 33 | — | — | — | — | — | — |
| | PC-POS-4 | — | — | — | — | 100 | — | — | — | — | — |
| | PC-POS-5 | — | — | — | — | — | 33 | — | — | — | — |
| | PC-POS-6 | — | — | — | — | — | — | 100 | — | — | — |
| | PC-POS-7 | — | — | — | — | — | — | — | 33 | — | — |
| | PC-POS-8 | — | — | — | — | — | — | — | — | 33 | — |
| | PC-POS-9 | — | — | — | — | — | — | — | — | — | 33 |
| | PC-1 | 67 | 67 | 50 | 67 | — | 67 | — | 67 | 67 | 67 |
| POS structure | POS content in Component A [% by weight] | 4.2 | 4.2 | 6.3 | 4.2 | 4.4 | 4.2 | 4.5 | 4.2 | 4.2 | 4.2 |
| | Average number of repetitions of siloxane units (p + q) | 65 | 65 | 65 | 65 | 65 | 87 | 87 | 50 | 40 | 35 |
| Domains | Average domain size | 56 | 56 | 56 | 42 | 31 | 74 | 52 | 35 | 33 | 30 |
| | Number of domains having a maximum length of 80 nm or more | 7.0 | 7.0 | 11.8 | 4.5 | 3.6 | 18.0 | 8.0 | 2.9 | 1.9 | 1.2 |
| | Presence or absence of domains having a maximum length of 400 nm or more | Absent | Absent | Absent | Absent | Absent | Absent | Absent | Absent | Absent | Absent |
| Physical properties of Component A | Viscosity average molecular weight Mv | 21,200 | 21,200 | 20,000 | 21,000 | 20,000 | 21,000 | 19,5000 | 21,200 | 21,100 | 21,000 |
| | Total light transmittance | 24 | 24 | 25 | 26 | 41 | 23 | 25 | 46 | 55 | 77 |
| | Haze | 94 | 94 | 95 | 95 | 65 | 95 | 94 | 75 | 42 | 10 |
| Component B | Flame retardant (B-1) | 0.05 | 0.05 | 0.05 | 0.05 | 0.05 | 0.05 | 0.05 | 0.05 | 0.05 | 0.05 |
| Component C | Anti-dripping agent (C-1) | — | 0.4 | 0.4 | 0.4 | 0.4 | 0.4 | 0.4 | 0.4 | 0.4 | 0.4 |
| Component D | Ultraviolet absorber (D-1) | — | 0.3 | 0.3 | 0.3 | 0.3 | 0.3 | 0.3 | 0.3 | 0.3 | 0.3 |
| Other components | Mold release agent (SL900) | 0.2 | 0.2 | 0.2 | 0.2 | 0.2 | 0.2 | 0.2 | 0.2 | 0.2 | 0.2 |
| | Phenolic thermal stabilizer (Irg 1076) | 0.1 | 0.1 | 0.1 | 0.1 | 0.1 | 0.1 | 0.1 | 0.1 | 0.1 | 0.1 |
| | Phosphorus-based thermal stabilizer (Irg 168) | 0.1 | 0.1 | 0.1 | 0.1 | 0.1 | 0.1 | 0.1 | 0.1 | 0.1 | 0.1 |
| Physical properties | Charpy impact strength (notched) at −30° C. | 55 | 54 | 53 | 51 | 48 | 52 | 49 | 49 | 47 | 50 |
| | Appearance | B | B | B | B | B | B | B | B | B | B |
| | Flame retardancy at 1.5 mm thickness | V-2 | V-0 | V-0 | V-0 | V-0 | V-0 | V-0 | V-0 | V-0 | V-0 |

TABLE 4

|  |  | Reference Example | Comparative Examples | | | | | | |
|---|---|---|---|---|---|---|---|---|---|
|  |  | 1 | 12 | 13 | 14 | 15 | 16 | 17 | 18 |
| Composition of Component A | PC-POS-1 | 33 | 5 | 80 | — | — | — | — | — |
|  | PC-POS-11 | — | — | — | 50 | — | — | — | — |
|  | PC-POS-12 | — | — | — | — | 100 | — | — | — |
|  | PC-POS-13 | — | — | — | — | — | 33 | — | — |
|  | PC-POS-14 | — | — | — | — | — | — | 100 | — |
|  | PC-1 | 67 | 95 | 20 | 50 | — | 67 | — | 100 |
| POS structure | POS content in Component A [% by weight] | 4.2 | 0.6 | 10 | 4.2 | 4.6 | 4.2 | 4.2 | 0 |
|  | Average number of repetitions of siloxane units (p + q) | 65 | 65 | 65 | 65 | 200 | 800 | 35 | — |
| Domains | Average domain size | 56 | 60 | 55 | 22 | 33 | 304 | 9 | — |
|  | Number of domains having a maximum length of 80 nm or more | 7.0 | 1.2 | 13.2 | 0.0 | 0.0 | 26.1 | 0.0 | — |
|  | Presence or absence of domains having a maximum length of 400 nm or more | Absent | Absent | Absent | Absent | Absent | Present | Absent | — |
| Physical properties of Component A | Viscosity average molecular weight Mv | 21,200 | 23,500 | 18,000 | 20,000 | 20,100 | 20,900 | 19,400 | 23,900 |
|  | Total light transmittance | 24 | 73 | 20 | 78 | 28 | 18 | 89 | 89 |
|  | Haze | 94 | 16 | 91 | 8 | 90 | 95 | 1 | 0 |
| Component B | Flame retardant (B-1) | — | 0.05 | 0.05 | 0.05 | 0.05 | 0.05 | 0.05 | 0.05 |
| Component C | Anti-dripping agent (C-1) | — | 0.4 | 0.4 | 0.4 | 0.4 | 0.4 | 0.4 | 0.4 |
| Component D | Ultraviolet absorber (D-1) | — | 0.3 | 0.3 | 0.3 | 0.3 | 0.3 | 0.3 | 0.3 |
| Other components | Mold release agent (SL900) | 0.2 | 0.2 | 0.2 | 0.2 | 0.2 | 0.2 | 0.2 | 0.2 |
|  | Phenolic thermal stabilizer (Irg 1076) | 0.1 | 0.1 | 0.1 | 0.1 | 0.1 | 0.1 | 0.1 | 0.1 |
|  | Phosphorus-based thermal stabilizer (Irg 168) | 0.1 | 0.1 | 0.1 | 0.1 | 0.1 | 0.1 | 0.1 | 0.1 |
| Physical properties | Charpy impact strength (notched) at −30° C. | 60 | 17 | 41 | 26 | 27 | 48 | 18 | 10 |
|  | Appearance | B | A | F | A | B | F | B | A |
|  | Flame retardancy at 1.5 mm thickness | not V | V-0 | not V | V-0 | V-0 | not V | V-0 | V-0 |

As is evident from the Tables described above, the resin compositions of Examples 11 to 20 have a good low-temperature impact resistance of more than 40 kJ/m² and a thin-wall flame retardancy at 1.5 mm of V-2 or V-0. In contrast, the resin composition of Reference Example 1 containing no component B has an insufficient flame retardancy. The resin composition of Comparative Example 12 in which the content of the polyorganosiloxane block in the component A is less than 2.5% by weight has a poor low-temperature impact resistance. The resin composition of Comparative Example 13 in which the content of the polyorganosiloxane block in the component A is more than 8.0% by weight, and the resin composition of Comparative Example 7 in which the number of domains having a maximum length of 80 nm or more is 20 or more, have appearance defects and a poor flame retardancy. The resin compositions of Comparative Examples 14, 15 and 17 in which domains having a maximum length of 80 nm or more are absent have a poor low-temperature impact resistance. The resin composition of Comparative Example 18 containing no polycarbonate-polydiorganosiloxane copolymer has a poor low-temperature impact resistance.

Examples 21 to 22 and Comparative Examples 19 to 23

In each of Examples and Comparative Examples, the components A to D, excluding B-2 as the component B, and the respective additives were weighed according to the compositions shown in Table 5, and uniformly mixed using a blender. The resulting mixture was fed from the first feed port of a vent-type twin-screw extruder, and melt-kneaded to obtain pellets. Each of the additives to be used was prepared as a premix with the polycarbonate resin in a concentration of about from 10 to 100 times the blending amount of each additive, in advance, and then all the premixes were mixed using a blender. B-2 as the component B was fed to the extruder in a state heated to 80° C., from the third feed port provided midway in the cylinder (at a position between the first feed port and the vent outlet) using a liquid injection apparatus (HYM-JS-08, manufactured by Fuji techno Industries Corporation) so as to achieve the proportion predetermined in each Example. As the vent-type twin-screw extruder, TEX 30α-38.5BW-3V (diameter: 30 mm), manufactured by The Japan Steel Works, Ltd. was used. The mixture was extruded in the form of strands under the conditions of a cylinder-temperature and die temperature of 280° C., a screw rotation speed of 150 rpm, a discharge amount of 20 kg/h and a vent vacuum degree of 3 kPa, cooled in a water bath, and then cut with a pelletizer to form pellets. The respective evaluation results are shown in Table 5.

TABLE 5

|  |  | Examples | | Comparative Examples | | | | |
|---|---|---|---|---|---|---|---|---|
|  |  | 21 | 22 | 19 | 20 | 21 | 22 | 22 |
| Composition of Component A | PC-POS-1 | 33 | 33 | 15 | 33 | — | — | — |
|  | PC-POS-7 | — | — | — | — | — | — | — |
|  | PC-POS-14 | — | — | — | — | 100 | 100 | — |
|  | PC-1 | 67 | 67 | — | — | — | — | 100 |

TABLE 5-continued

|  |  | Examples | | Comparative Examples | | | | |
|---|---|---|---|---|---|---|---|---|
|  |  | 21 | 22 | 19 | 20 | 21 | 22 | 22 |
| POS structure | POS content in Component A [% by weight] | 4.2 | 4.2 | 1.9 | 4.2 | 4.2 | 4.2 | 0 |
|  | Average number of repetitions of siloxane units (p + q) | 65 | 65 | 65 | 65 | 35 | 35 | — |
| Domains | Average domain size | 56 | 56 | 59 | 56 | 9 | 9 | — |
|  | Number of domains having a maximum length of 80 nm or more | 7.0 | 7.0 | 3.6 | 3.6 | 0.0 | 0.0 | — |
|  | Presence or absence of domains having a maximum length of 400 nm or more | Absent | Absent | Absent | Absent | Absent | Absent | — |
| Physical properties of Component A | Viscosity average molecular weight Mv | 21,200 | 21,200 | 22,700 | 21,200 | 19,400 | 19,400 | 23,900 |
|  | Total light transmittance | 24 | 24 | 56 | 24 | 89 | 89 | 89 |
|  | Haze | 94 | 94 | 58 | 94 | 1 | 1 | 0 |
| Component B | Flame retardant (B-2) | 3.0 | 6.0 | 3.0 | 23.0 | 3.0 | 13.0 | 3.0 |
| Component C | Anti-dripping agent (C-1) | 0.4 | 0.4 | 0.4 | 0.4 | 0.4 | 0.4 | 0.4 |
| Component D | Ultraviolet absorber (D-1) | 0.3 | 0.3 | 0.3 | 0.3 | 0.3 | 0.3 | 0.3 |
| Other components | Mold release agent (SL900) | 0.2 | 0.2 | 0.2 | 0.2 | 0.2 | 0.2 | 0.2 |
|  | Phenolic thermal stabilizer (Irg 1076) | 0.1 | 0.1 | 0.1 | 0.1 | 0.1 | 0.1 | 0.1 |
|  | Phosphorus-based thermal stabilizer (Irg 168) | 0.1 | 0.1 | 0.1 | 0.1 | 0.1 | 0.1 | 0.1 |
| Physical properties | Charpy impact strength (notched) at −30° C. | 36 | 31 | 18 | 4 | 18 | 3 | 3 |
|  | Appearance | B | B | B | B | A | A | A |
|  | Flame retardancy at 1.5 mm thickness | V-0 | V-0 | V-0 | not V | V-0 | V-0 | V-0 |

As is evident from the Tables described above, the resin compositions of Examples 21 and 22 have a good low-temperature impact resistance and a thin-wall flame retardancy at 1.5 mm of V-0. The resin composition of Comparative Example 19 in which the content of the polyorganosiloxane block in the component A is less than 2.5% by weight, and the resin compositions of Comparative Examples 21 and 22 having an average domain size of less than 30 nm, have a poor low-temperature impact resistance. The resin composition of Comparative Example 20 containing an excessive amount of the component B has a poor low-temperature impact resistance and flame retardancy. The resin composition of Comparative Example 23 containing no polycarbonate-polydiorganosiloxane copolymer has a poor low-temperature impact resistance.

Examples 23 to 25 and Comparative Examples 24 to 26

In each of Examples and Comparative Examples, the components A to D and the respective additives were weighed according to the compositions shown in Table 6, uniformly mixed using a blender, and melt-kneaded using a vent-type twin-screw extruder to obtain pellets. Each of the additives to be used was prepared as a premix with the polycarbonate resin in a concentration of about from 10 to 100 times the blending amount of each additive, in advance, and then all the premixes were mixed using a blender. As the vent-type twin-screw extruder, KTX-30 (diameter: 30 mm) manufactured by Kobe Steel, Ltd. was used. The mixture was extruded in the form of strands under the conditions of a cylinder-temperature and die temperature of 280° C., a screw rotation speed of 150 rpm, a discharge amount of 20 kg/h and a vent suction degree of 3 kPa, cooled in a water bath, and then cut with a pelletizer to form pellets. The respective evaluation results are shown in Table 6.

TABLE 6

|  |  | Examples | | | Comparative Examples | | |
|---|---|---|---|---|---|---|---|
|  |  | 23 | 24 | 25 | 24 | 25 | 26 |
| Composition of Component A | PC-POS-1 | 33 | 33 | — | 15 | — |  |
|  | PC-POS-7 | — | — | 33 | — | — |  |
|  | PC-POS-14 | — | — | — | — | 100 |  |
|  | PC-1 | 67 | 67 | 67 | — | — | 100 |
| POS structure | POS content in Component A [% by weight] | 4.2 | 4.2 | 4.2 | 1.9 | 4.2 | 0 |
|  | Average number of repetitions of siloxane units (p + q) | 65 | 65 | 50 | 65 | 35 | — |
| Domains | Average domain size | 56 | 56 | 35 | 59 | 9 | — |
|  | Number of domains having a maximum length of 80 nm or more | 7.0 | 7.0 | 2.9 | 3.6 | 0.0 | — |
|  | Presence or absence of domains having a maximum length of 400 nm or more | Absent | Absent | Absent | Absent | Absent | — |
| Physical properties of Component A | Viscosity average molecular weight Mv | 21,200 | 21,200 | 21,200 | 22,700 | 19,400 | 23,900 |
|  | Total light transmittance | 24 | 24 | 46 | 56 | 89 | 89 |
|  | Haze | 94 | 94 | 75 | 58 | 1 | 0 |
| Component B | Flame retardant (B-3) | 3.0 | 5.0 | 3.0 | 3.0 | 3.0 | 3.0 |
| Component C | Anti-dripping agent (C-1) | 0.4 | 0.4 | 0.4 | 0.4 | 0.4 | 0.4 |
| Component D | Ultraviolet absorber (D-1) | 0.3 | 0.3 | 0.3 | 0.3 | 0.3 | 0.3 |
| Other components | Mold release agent (SL900) | 0.2 | 0.2 | 0.2 | 0.2 | 0.2 | 0.2 |
|  | Phenolic thermal stabilizer (Irg 1076) | 0.1 | 0.1 | 0.1 | 0.1 | 0.1 | 0.1 |
|  | Phosphorus-based thermal stabilizer (Irg 168) | 0.1 | 0.1 | 0.1 | 0.1 | 0.1 | 0.1 |

TABLE 6-continued

| | Examples | | | Comparative Examples | | |
|---|---|---|---|---|---|---|
| | 23 | 24 | 25 | 24 | 25 | 26 |
| Physical properties Charpy impact strength (notched) at −30° C. | 50 | 36 | 45 | 18 | 13 | 5 |
| Appearance | B | B | B | B | A | A |
| Flame retardancy at 1.5 mm thickness | V-0 | V-0 | V-0 | V-0 | V-0 | V-0 |

As is evident from the Table described above, the resin compositions of Examples 23 to 25 have a good low-temperature impact resistance and a thin-wall flame retardancy at 1.0 mm of V-0. The resin composition of Comparative Example 24 in which the content of the polyorganosiloxane block in the component A is less than 2.5% by weight, the resin composition of Comparative Example 25 having an average domain size of 30 nm or less, and the resin composition of Comparative Example 26 containing no polycarbonate-polydiorganosiloxane copolymer, have a poor low-temperature impact resistance.

The above results confirm that the use of the copolymer or the resin composition thereof according to the present invention enables to achieve both an excellent impact durability after coating and an excellent chemical resistance, while providing a high impact resistance performance even at a very low temperature.

INDUSTRIAL APPLICABILITY

The copolymer or the resin composition thereof obtained in the present invention has an excellent impact resistance at a very low temperature and an excellent chemical resistance as well as a high coating durability, and thus can be widely used in the fields of optical components and electric/electronic devices, as well as the field of transportation and mobility such as automobiles and aircrafts. Among these, the copolymer or the resin composition is highly practical for producing various types of molded articles for use in housing applications, which are expected to be exposed to harsh environments, such as very cold environments including high-latitude areas, mountain areas and the upper air, or exposed to high-temperature heat treatments and chemical treatments.

REFERENCE SIGNS LIST

1 y: amount of deflection (mm)
2 h: test piece thickness (4 mm)
3 L: measured width (150 mm)

The invention claimed is:

1. A polycarbonate-polydiorganosiloxane copolymer, or a resin composition thereof comprising the copolymer and an optional polycarbonate resin;
   wherein the copolymer contains a polycarbonate block (A-1) and a polydiorganosiloxane block (A-2);
   wherein the polydiorganosiloxane block (A-2) is contained in the copolymer or the resin composition thereof in an amount of from 2.5 to 8.0% by weight; and
   wherein the copolymer or the resin composition thereof satisfies the following (i) and (ii):
   (i) 1 to 20 domains having a maximum long diameter of 80 nm or more are present in a region of 850 nm square (722,500 nm$^2$), in a cross-sectional observation image of the copolymer or the resin composition thereof obtained using an electron beam microscope; and
   (ii) the average domain size is from 30 to 100 nm.

2. The copolymer or the resin composition thereof according to claim 1, wherein the polycarbonate block (A-1) is represented by the following general formula [1]:

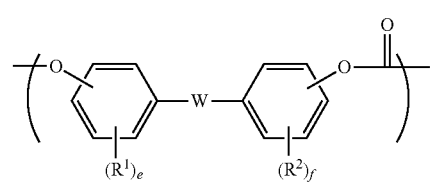

[1]

wherein, in the general formula [1], each of $R^1$ and $R^2$ independently represents a hydrogen atom, a halogen atom or a group selected from the group consisting of an alkyl group containing from 1 to 18 carbon atoms, an alkoxy group containing from 1 to 18 carbon atoms, a cycloalkyl group containing from 6 to 20 carbon atoms, a cycloalkoxy group containing from 6 to 20 carbon atoms, an alkenyl group containing from 2 to 10 carbon atoms, an aryl group containing from 3 to 14 carbon atoms, an aryloxy group containing from 3 to 14 carbon atoms, an aralkyl group containing from 7 to 20 carbon atoms, an aralkyloxy group containing from 7 to 20 carbon atoms, a nitro group, an aldehyde group, a cyano group and a carboxyl group; when a plurality of $R^1$s and $R^2$s are present, they may be the same or different; each of e and f independently represents an integer from 1 to 4; and W represents a single bond or at least one group selected from the group consisting of groups represented by the following general formulae PI

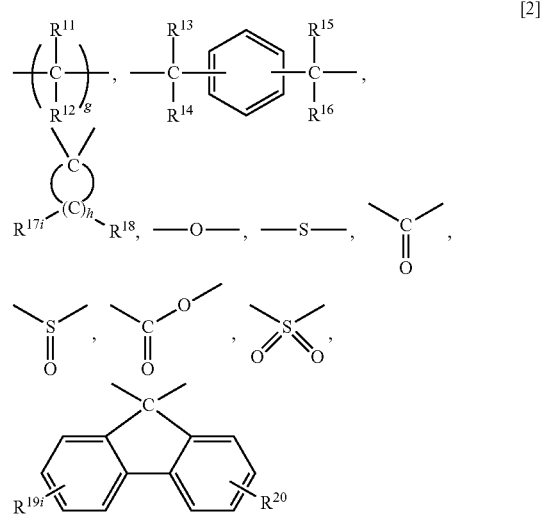

[2]

wherein, in the general formula [2], each of $R^{11}$, $R^{12}$, $R^{13}$, $R^{14}$, $R^{15}$, $R^{16}$, $R^{17}$ and $R^{18}$ independently represents a hydrogen atom or a group selected from the group consisting of an alkyl group containing from 1 to 18 carbon atoms, an aryl group containing from 3 to 14 carbon atoms and an aralkyl group containing from 7 to 20 carbon atoms; each of $R^{19}$ and $R^{20}$ independently represents a hydrogen atom, a halogen atom or a group selected from the group consisting of an alkyl group containing from 1 to 18 carbon atoms, an alkoxy group containing from 1 to 10 carbon atoms, a cycloalkyl group containing from 6 to 20 carbon atoms, a cycloalkoxy group containing from 6 to 20 carbon atoms, an alkenyl group containing from 2 to 10 carbon atoms, an aryl group containing from 3 to 14 carbon atoms, an aryloxy group containing from 6 to 10 carbon atoms, an aralkyl group containing from 7 to 20 carbon atoms, an aralkyloxy group containing from 7 to 20 carbon atoms, a nitro group, an aldehyde group, a cyano group and a carboxyl group; when a plurality of each of these atoms and groups are present, they may be the same or different; g represents an integer from 1 to 10; and h represents an integer from 4 to 7.

3. The copolymer or the resin composition thereof according to claim 2, wherein the polydiorganosiloxane block (A-2) is represented by the following general formula [3]:

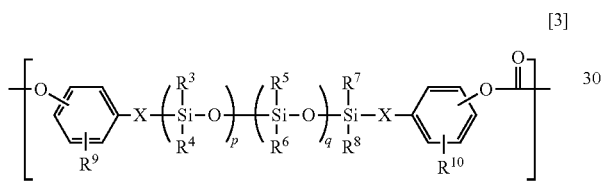

wherein, in the general formula [3], each of $R^3$, $R^4$, $R^5$, $R^6$, $R^7$ and $R^8$ independently represents a hydrogen atom, an alkyl group containing from 1 to 12 carbon atoms, or a substituted or non-substituted aryl group containing from 6 to 12 carbon atoms; each of $R^9$ and $R^{10}$ independently represents a hydrogen atom, a halogen atom, an alkyl group containing from 1 to 10 carbon atoms or an alkoxy group containing from 1 to 10 carbon atoms; p is a natural number; q is 0 or a natural number; p+q, as the average chain length, is a natural number from 30 to 100; and X represents a divalent aliphatic group containing from 2 to 8 carbon atoms.

4. The copolymer or the resin composition thereof according to claim 1, further satisfying the following (iii):
(iii) no domain having a maximum long diameter of 400 nm or more is present in a region of 850 nm square (722,500 nm$^2$), in a cross-sectional observation image of the copolymer or the resin composition thereof obtained using an electron beam microscope, of any one of five pieces of sample sections.

5. The copolymer or the resin composition thereof according to claim 1, which has a viscosity average molecular weight of from 11,000 to 30,000.

6. The copolymer or the resin composition thereof according to claim 1,
wherein the polycarbonate block (A-1) is derived from 2,2-bis(4-hydroxyphenyl)propane; and
wherein the polydiorganosiloxane block (A-2) is derived from a (2-allylphenol)-terminated polydiorganosiloxane or a (2-methoxy-4-allylphenol)-terminated polydiorganosiloxane.

7. The copolymer or the resin composition thereof according to claim 1, comprising: from 100 to 1% by weight of the copolymer; and from 0 to 99% by weight of the polycarbonate resin.

8. The resin composition according to claim 7, wherein the polycarbonate resin is represented by the following general formula [1]:

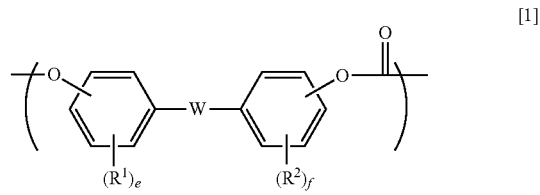

wherein, in the general formula [1], each of $R^1$ and $R^2$ independently represents a hydrogen atom, a halogen atom or a group selected from the group consisting of an alkyl group containing from 1 to 18 carbon atoms, an alkoxy group containing from 1 to 18 carbon atoms, a cycloalkyl group containing from 6 to 20 carbon atoms, a cycloalkoxy group containing from 6 to 20 carbon atoms, an alkenyl group containing from 2 to 10 carbon atoms, an aryl group containing from 3 to 14 carbon atoms, an aryloxy group containing from 3 to 14 carbon atoms, an aralkyl group containing from 7 to 20 carbon atoms, an aralkyloxy group containing from 7 to 20 carbon atoms, a nitro group, an aldehyde group, a cyano group and a carboxyl group; when a plurality of $R^1$s and $R^2$s are present, they may be the same or different; each of e and f independently represents an integer from 1 to 4; and W represents a single bond or at least one group selected from the group consisting of groups represented by the following general formulae [2]:

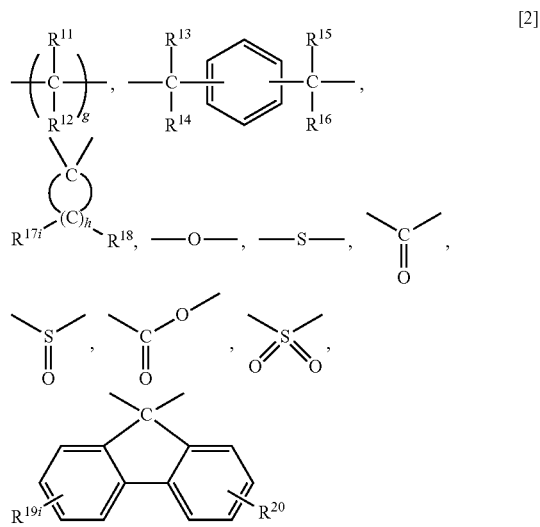

wherein, in the general formula [2], each of $R^{11}$, $R^{12}$, $R^{13}$, $R^{14}$, $R^{15}$, $R^{16}$, $R^{17}$ and $R^{18}$ independently represents a hydrogen atom or a group selected from the group consisting of an alkyl group containing from 1 to 18 carbon atoms, an aryl group containing from 3 to 14 carbon atoms and an aralkyl group containing from 7 to 20 carbon atoms; each of $R^{19}$ and $R^{20}$ independently represents a hydrogen atom, a halogen atom or a group selected from the group consisting of an alkyl group containing from 1 to 18 carbon atoms, an alkoxy group containing from 1 to 10 carbon atoms, a cycloalkyl group containing from 6 to 20 carbon atoms, a cycloalkoxy group containing from 6 to 20 carbon atoms, an alkenyl group containing from 2 to 10 carbon atoms, an aryl group containing from 3 to 14 carbon atoms, an aryloxy group containing from 6 to 10 carbon atoms, an aralkyl group containing from 7 to 20 carbon atoms, an aralkyloxy group containing from 7 to 20 carbon atoms, a nitro group, an aldehyde group, a cyano group and a carboxyl group; when a plurality of each of these atoms and groups are present, they may be the same or different; g represents an integer from 1 to 10; and h represents an integer from 4 to 7.

9. A resin composition comprising:
the copolymer or the resin composition thereof according to claim 1; and
a flame retardant (B) in an amount of from 0.001 to 20 parts by weight with respect to 100 parts by mass of the copolymer or the resin composition thereof.

10. The resin composition according to claim 9, wherein the flame retardant (B) is a metal salt-based flame retardant and/or an organic phosphorus-based flame retardant.

11. The resin composition according to claim 9, further comprising a fluorine-containing anti-dripping agent (C) and/or an ultraviolet absorber (D).

12. A molded article formed from the copolymer or the resin composition thereof according to claim 1.

13. The molded article according to claim 12, wherein the molded article having a thickness of 2 mm has a total light transmittance, as measured in accordance with ASTM D 1003 (ISO 13468), of 80% or less.

14. A method of producing the copolymer or the resin composition thereof according to claim 3, the method comprising the following steps (a) and (b):
(a) allowing a dihydric phenol (I) represented by the following formula [4]:

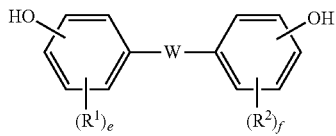

[4]

(wherein $R^1$, $R^2$, e, f and W are the same as defined above)

to react with phosgene in a mixed liquid of a water-insoluble organic solvent and an aqueous alkaline solution, to prepare a solution containing a carbonate oligomer containing a terminal chloroformate group; and (b) adding a hydroxyaryl-terminated polydiorganosiloxane (II) represented by the following formula [5]:

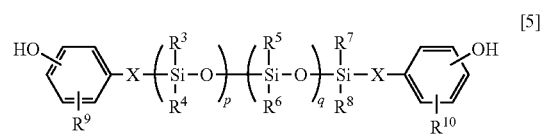

[5]

(wherein $R^3$, $R^4$, $R^5$, $R^6$, $R^7$, $R^8$, $R^9$, $R^{10}$, p, q and X are the same as defined above)

to the resulting solution, while stirring, to carry out interfacial polymerization of the hydroxyaryl-terminated polydiorganosiloxane (II) and the carbonate oligomer;

wherein the water-insoluble organic solvent is used in an amount of 8 moles or more and less than 11 moles per mole of the total amount of the dihydric phenols represented by formula [4] and formula [5].

15. The method according to claim 14, wherein the water-insoluble organic solvent is used in an amount of 8 moles or more and less than 9.5 moles per mole of the total amount of the dihydric phenols represented by formula [4] and formula [5] to initiate an interfacial polycondensation reaction, and then the water-insoluble organic solvent is further added in an amount of 2 moles or more per mole of the total amount of the dihydric phenols represented by formula [4] and formula [5].

16. A molded article formed from the resin composition according to claim 8.

17. The molded article according to claim 16, wherein the molded article having a thickness of 2 mm has a total light transmittance, as measured in accordance with ASTM D 1003 (ISO 13468), of 80% or less.

\* \* \* \* \*